United States Patent [19]
Horikiri

[11] Patent Number: 6,016,516
[45] Date of Patent: Jan. 18, 2000

[54] REMOTE PROCEDURE PROCESSING DEVICE USED BY AT LEAST TWO LINKED COMPUTER SYSTEMS

[75] Inventor: Kazunori Horikiri, Nakai-machi, Japan

[73] Assignee: Fuji Xerox Co. Ltd., Tokyo, Japan

[21] Appl. No.: 08/902,235

[22] Filed: Jul. 30, 1997

[30] Foreign Application Priority Data

Aug. 7, 1996 [JP] Japan .................................. 8-208014
Aug. 7, 1996 [JP] Japan .................................. 8-208015

[51] Int. Cl.[7] ................................................ G06F 15/163
[52] U.S. Cl. .......................... 709/304; 709/203; 709/219
[58] Field of Search .................................. 709/203, 304, 709/302, 217, 218, 219, 300, 101

[56] References Cited

U.S. PATENT DOCUMENTS

| | | | |
|---|---|---|---|
| 5,146,593 | 9/1992 | Brandle et al. | 709/302 |
| 5,218,699 | 6/1993 | Brandle et al. | 709/304 |
| 5,247,676 | 9/1993 | Ozur et al. | 709/304 |
| 5,404,523 | 4/1995 | DellaFera et al. | 709/101 |
| 5,430,876 | 7/1995 | Schreiber et al. | 709/304 |
| 5,659,701 | 8/1997 | Amit et al. | 709/304 |
| 5,787,281 | 7/1998 | Schreiber et al. | 709/304 |

FOREIGN PATENT DOCUMENTS

| | | |
|---|---|---|
| 667575A2 | 8/1995 | European Pat. Off. . |
| 6-75892 | 3/1994 | Japan . |
| 7-282017 | 10/1995 | Japan . |

OTHER PUBLICATIONS

Multipurpose Protocol Meditation System: DeleGate; Y. Sato; pp. 1–17.

Digital Equipment Corporation Hewlett–Packard Co. Sunsoft, Inc., OMG RFP Submission; Nov. 16, 1994, pp. 1–15.

A Web of Distributed objects; Owen Rees, Nigel Edwards, Mark Madsen, Mike Beasley, Ashley McClenaghan, pp. 11–26.

The Common Gateway Interface, How do I get information from the server? pp. 1–3, author unknown.

*Primary Examiner*—Zarni Maung
*Assistant Examiner*—Patrice Winder
*Attorney, Agent, or Firm*—Oliff & Berridge, PLC

[57] ABSTRACT

To provide a device for processing remote procedures that makes it possible to easily obtain a desired service by combining multiple remote procedures, and that allows a user of a client application to know the parameters provided to each remote procedure and the execution results from each procedure. A message entered by a user is sent to a remote procedure server, and a first procedure execution component is selected from a first remote procedure holding component and executed. If a parameter contains a hyperlink, a corresponding message is generated by a message generating component and the message is sent to a second remote procedure holding component. The second remote procedure holding component receives the hypertext and analyzes it with a hypertext analysis component. After the first procedure execution component is executed, the parameters and execution results are sent back as hypertext by a hypertext generating component to the client. This message is then analyzed by a hypertext analysis component, and the results are displayed on a hypertext display component.

21 Claims, 30 Drawing Sheets

ADDITION RESULT
FIRST PARAMETER: 1
SECOND PARAMETER: 162
(http://host1/times?v1=2&v2=(http://host1/power?v1=3&v2=4))
RESULT: 163

FIG. 2

MULTIPLICATION RESULT
FIRST PARAMETER: 2
SECOND PARAMETER: 81
(http://host1/power?v1=3&v2=4)
RESULT: 162

FIG. 3 http://host1/htbin/plus?v1=1&v2=http%3A%2F%2Fhost1%2Fhtbin%2Ftimes%3Fv1%3D2%26v2%3D3

FIG. 12A

```
<HEAD>
<TITLE>MULTIPLICATION PAGE</TITLE>
</HEAD>
<H1>PAGE FOR PERFORMING MULTIPLICATION</H1>
10 THIS PAGE CALCULATES THE PRODUCT OF PARAMETERS ASSIGNED WITH
    DECIMAL INTEGERS OR HYPERLINKS
        <P>
<HR>
<FORM METHOD="GET"
       ACTION="http://host1/htbin/times">
FIRST PARAMETER:<INPUT NAME="v1"TYPE="ENTRY"><P>
SECOND PARAMETER:<INPUT NAME="v2"TYPE="entry"><P>
<INPUT TYPE="submit"VALUE="Invoke Function">
</FORM>
```

FIG. 12B

```
<HEAD>
<TITLE>ADDITION PAGE</TITLE>
</HEAD>
<H1>PAGE FOR PERFORMING ADDITION<H1>
10 THIS PAGE CALCULATES THE SUM OF PARAMETERS ASSIGNED WITH
    DECIMAL INTEGERS OR HYPERLINKS
        <P>
<HR>
<FORM METHOD="GET"
       ACTION="http://host1/htbin/plus">
FIRST PARAMETER:<INPUT NAME="v1"TYPE="entry"><P>
SECOND PARAMETER:<INPUT NAME="v2"TYPE="entry"><P>
<INPUT TYPE="submit"VALUE="Invoke Function">
</FORM>
```

FIG. 12C

```
<H2>RESULT OF MULTIPLICATION</H2>
FIRST PARAMETER:2<P>
SECOND PARAMETER:3<P>
            :6<P>
```

FIG. 13A

```
<H2> RESULT OF ADDITION</H2>
FIRST PARAMETER:1<P>
SECOND PARAMETER:6<P>(<A HREF="http://host1/htbin/
        times?v1=2&v2=3">
        http://host1/htbin/times?v1=2&v2=3
        </A>)<P>
RESULT:7<P>
```

FIG. 13B

ADDITION PAGE

THIS PAGE CALCULATES THE SUM OF PARAMETERS ASSIGNED WITH DECIMAL INTEGERS OR HYPERLINKS http://host1/htbin/plus

FIRST PARAMETER: 1

SECOND PARAMETER: http%3A%2F%2Fhost1>2Fhbin%2Ftimes%3Fv1%3D2%26v2%3D3

INVOKE FUNCTION

FIG. 14

```
<HEAD>
<TITLE>A PAGE IN ORDER TO PERFORM ADDITION</TITLE>
</HEAD>
<H1>A PAGE IN ORDER TO PERFORM ADDITION</H1>
THIS PAGE CALCULATES THE SUM OF THE GIVEN ARGUMENTS<P>
<HR>
<FORM METHOD="GET"
      ACTION="http://host1/bin/plus">
FIRST ARGUMENT:<INPUT NAME="v1" TYPE="entry"><P>
SECOND ARGUMENT:<INPUT NAME="v2" TYPE="entry" VALUE=1><P>
<INPUT TYPE="submit" VALUE="Start Function">
</FORM>
```

FIG. 22

```
<HEAD>
<TITLE>A PAGE IN ORDER TO PERFORM ADDITION</TITLE>
</HEAD>
<H1>A PAGE IN ORDER TO PERFORM ADDITION</H1>
THIS IS A PAGE IN ORDER TO CALCULATE THE SUM OF THE GIVEN ARGUMENTS<P>
<HR>
<FORM METHOD="GET"
    ACTION="http://host1/bin/plus">
FIRST ARGUMENT:<INPUT NAME="v1" TYPE="entry"><P>
SECOND ARGUMENT:<INPUT NAME="v2" TYPE="entry" ><P>
<INPUT TYPE="submit" VALUE="Start Function">
</FORM>
```

FIG. 26 http://host1/bin/plus?v1=&v2=http%3A%2F%2F
host1%2Fbin%2Ftimes%3Fv1%3D2%26v2%3D

FIG. 27A

```
<HEAD>
<TITLE>A PAGE TO PERFORM ADDITION</TITLE>
</HEAD>
<H1>A PAGE TO PERFORM ADDITION</H1>
THIS IS A PAGE TO CALCULATE THE SUM OF THE GIVEN ARGUMENTS<P>
<HR>
<FORM METHOD="GET"
      ACTION="http://host1/bin/plus">
FIRST ARGUMENT:<INPUT NAME="v1"TYPE="entry"><P>
SECOND ARGUMENT:<INPUT NAME="v2"TYPE="entry"
   VALUE="http://host1/bin/times?v1=2&v2="><P>
<INPUT TYPE="submit" VALUE="start function">
</FORM>
```

FIG. 27B http://host1/bin/plus?v1=1&v2=http%3A%2F%2F
host1%2Fbin%2Ftimes%3Fv1%3D2%26v2%3D

FIG. 27C

```
<HEAD>
<TITLE>A PAGE IN ORDER TO PERFORM MULTIPLICATION</TITLE>
</HEAD>
<H1>A PAGE TO PERFORM MULTIPLICATION</H1>
THIS IS A PAGE TO CALCULATE THE PRODUCT OF THE GIVEN ARGUMENTS<P>
<HR>
<FORM METHOD="GET"
      ACTION="http://host1/bin/times">
FIRST ARGUMENT:<INPUT NAME="v1"TYPE="entry" VALUE=2><P>
SECOND ARGUMENT:<INPUT NAME="v2"TYPE="entry"><P>
<INPUT TYPE="submit" VALUE="Start Function">
</FORM>
```

FIG. 27D

```
<HEAD>
<TITLE>A PAGE IN ORDER TO PERFORM MULTIPLICATION</TITLE>
</HEAD>
<H1>A PAGE TO IN ORDER TO PERFORM MULTIPLICATION</H1>
THIS IS THE PAGE TO CALCULATE THE PRODUCT OF THE GIVEN ARGUMENTS<P>
<HR>
<FORM METHOD="GET"
ACTION="http://host1/bin/bind/http%3A%2F%2F
host1%2Fbin%2Fplus%3Fv1%3D1%26v2%3D
http%253A%252F%252Fhost1%252Fbin%252F
times%253Fv1%253Dv1%2526v2%253Dv2"
FIRST ARGUMENT:<INPUT NAME="v1"TYPE="entry" VALUE=2><P>
SECOND ARGUMENT:<INPUT NAME="v2"TYPE="entry"><P>
<INPUT TYPE="submit" VALUE="start function">
</FORM>
```

FIG. 28A http://host1/bin/bind/http%3A%2F%2F
host1%2Fbin%2Fplus%3Fv1%3D1%26v2%3D
http%253A%252F%252Fhost1%252Fbin%252F
times%253Fv1%253Dv1%2526v2%253Dv2

FIG. 28B http://host1/bin/bind/http%3A%2F%2F
host1%2Fbin%2Fplus%3Fv1%3D1%26v2%3D
http%253A%252F%252Fhost1%252Fbin%252F
times%253Fv1%253Dv1%2526v2%253Dv2?v1=20&v2=3

FIG. 28C http%3A%2F%2F
host1%2Fbin%2Fplus%3Fv1%3D1%26v2%3D
http%253A%252F%252Fhost1%252Fbin%252F
times%253Fv1%253Dv1%2526v2%253Dv2

FIG. 28D http://host1/bin/bin/plus?v1=&v2=http%3A%2F%2Fhost1%2Fbin%2Ftimes%3Fv1%3Dv1%26v2%3Dv2

FIG. 29A http://host1/bin/plus?v1=1&v2=http%3A%2F%2Fhost1%2Fbin%2Ftimes%3Fv1%3D20%26v2%3D3

FIG. 29B

<H2>RESULT OF THE MULTIPLICATION</H2>
FIRST ARGUMENT:20<P>
SECOND ARGUMENT:3<P>
RESULT:60<P>

FIG. 29C

<H2>RESULT OF THE ADDITION</H2>
FIRST ARGUMENT:1<P>
SECOND ARGUMENT:60
    (<A HREF="http://host1/bin/times?v1=20&v2=3">
    http://host1/bin/times?v1=20&v2=3</A>)<p>
RESULT:61<P>

FIG. 29D

REMOTE PROCEDURE PROCESSING DEVICE USED BY AT LEAST TWO LINKED COMPUTER SYSTEMS

BACKGROUND OF THE INVENTION

1. Field of Invention

The present invention relates to a remote procedure processing device, and more particularly to the processing of procedures used by computer systems that are connected through a network into a network information system.

2. Description of Related Art

Recently, there has been an expansion in the use of networked information systems, where computer systems are connected via a network. In a networked information system, a user can request services from another computer (e.g., a server) in order to perform procedures and obtain data. The Common Gateway Interface (CGI) is a standard that allows an application program to run by defining environment variables, command lines, standard input, and standard output to be used between an information server and an application program. Thus, the information server, such as an HTTP server, can generate data dynamically. However, the Common Gateway Interface does not provide any mechanism for services that allow an application program to perform remote procedures available on other information servers, such as HTTP servers. Thus, it has not been possible to freely combine information clients (e.g., Word Wide Web clients) with application programs which are activated by information servers such as HTTP servers.

Japanese Laid-Open Publication Number 6-75892 discloses a "device for managing remote procedures". This invention comprises: a remote procedure requesting component, a system remote procedure processing component, and a system procedure. pre-processor. The remote procedure requesting component requests a remote procedure for the service provided by the system. The system remote procedure execution component executes a remote procedure for the service provided by the system. The system remote procedure processing component manages remote procedures by linking the system remote procedure execution component with a plurality of remote procedures for the service provided by the system based on a remote procedure identifier that is unique within the network system. The system procedure pre-processor is called from a stub, which executes a remote procedure call, queries the system remote procedure processing component, determines the system's remote procedure to be called, and calls the corresponding system remote procedures execution component. This configuration allows a remote procedure provided by a system to be called even if the remote procedure on the system is not defined in the interface of the application service.

The ANSA Information Services Framework from Architecture Projects Processing Limited Corp. (U.K.) is a distributed system based on Common Object Request Broker Architecture and Specification (CORBA) and the World Wide Web. The ANSA Information Services Framework is described, for example in Rees, O., Edwards, N., Madsen, M., Beasley, M. and McClenaghan, A., in "A Web of Distributed Object", The ANSA Project Architecture Projects Processing Ltd. (1995). This system uses the Internet Inter-ORB Protocol (IIOP) in order to transfer the General Inter-ORB Protocol via the IP protocol. This technology makes it possible to access CORBA objects from the WWW by preparing a gateway for converting HTTP to IIOP and a gateway for converting IIOP to HTTP.

DeleGate is a multi-object protocol broadcasting systerr developed by the Denshi Gijutsu Sogou Kenkyuujo. DeleGate is described, for example, in "Tamenteki Purotocol Chuukei System DeleGate (DeleGate: A Multi-Object Protocol Broadcasting System)" (Denshi Gijutsu Sogou Kenkyuujo Ihou, Vol. 59, No. 6 (1995)). DeleGate provides features relating to path control, access control, protocol conversion, character code conversion, MIME code conversion, data caching, connection caching, broadcasting for existing applications, mounting features, and the like.

However, with both of these devices, it is difficult for the user of a remote procedure client application to combine a plurality of remote procedure servers to obtain a desired service. Also, when services are provided through a combination of remote procedure calls, it is difficult for the user of the client application to know the execution results from each of the remote procedures and the parameters provided to these procedures.

Another problem exists when using this type of service if the user is not thoroughly familiar with the specifications of the server that executes the remote procedure. The user will be unable to use the server because a complete request for the remote procedure must be made from the beginning of the communication.

For example, CORBA is the standard specification relating to the dispersed object developed by the standardization group Object Management Group (OMG) in regards to object direction. The Interface Repository is one component of the Object Request Broker (ORB) designated by CORBA, and which has the function of perpetuating the interface definition which corresponds to the object.

ORB makes possible the use of the interface definition of the object that is managed by the Interface Repository, including:

a check of the type of request a check of the suitability of the interface, inheritance, and graph the supply of the inter-operability between the realization of differing ORBs the installation and distribution of the interface definition the support of the interface and browser environment the supply of the interface information for the language system the supply of the component(s) for the end user However, the Interface Repository stipulated by the OMG does not mnake the stipulations for an object to return the interface information directly to the object of the source of the message transmission when an error exists in the, message for the object, or to return the interface information to the source of the message transmission in multiple stages when a multistage connection of the object is being performed. Thus, a meaningful execution cannot be performed even when executing a remote procedure with the argument in an unconfirmed state to a remote procedure management system. Additionally, unconfirmed arguments are unable to be asked to the called client with the execution process, and hence the user is unable to change the argument interactively.

Another example is the interface definition file generation device disclosed in Japanese Laid-Open Patent Publication No. 7-282017. A device is provided from a source program defined by the process supplied to the client by the server, creating the interface definition file describing the process specification by the language stipulated by the compiler for stub creation to provide a dispersed processing environment.

In this way, the interface information can be passed to the client from the server. However, even with this device, it is not supposed that a remote procedure call with the argument in an unconfirmed state can be executed to a remote procedure management system, nor can this device inform the called client with the execution process that it is undefined. For this reason, it is not possible to change the argument interactively.

SUMMARY OF THE INVENTION

It is accordingly one object of the present invention to overcome the problems described above and to provide a device for processing remote procedures that makes it possible to easily obtain a desired service by combining a plurality of remote procedures, and that allows a user of a client application to know the parameters provided to each remote procedure and the execution results from each procedure.

Another object of this invention is a remote procedure processing device which has the ability to re-execute remote procedures by the user interactively providing an argument in the case where the remote procedure is executed by an unconfirmed argument or in the case where a remote procedure is executed due to an improper argument being provided.

The invention is a device for processing remote procedures comprising: communication means for receiving remote procedure execution requests and sending execution results; one or more means for executing remote procedures in response to the execution requests; message analyzing means for analyzing the execution requests received by the communication means and extracting a retrieval expression and a parameter to be used in the execution of the requested procedures; and means for retrieving remote procedures corresponding to the retrieval expression extracted by the message analyzing means and sending the parameter to the means for executing remote procedures. The means for executing remote procedures executes a procedure using the parameters received from the remote procedure retrieving means. Messages containing a retrieval expression and a parameter for another remote procedure means are generated during execution of the procedure if needed. These messages are sent to the remote procedure retrieving means. A reply to the message is received, and the execution of the procedure is continued.

In another embodiment of the device for processing remote procedures the communicating means sends a message generated by the remote procedure means to another device for processing remote procedures. The communicating means is also capable of receiving replies to the message sent from the other device for processing remote procedures.

In still another embodiment of the device for processing remote procedures, the remote procedures means has a means for storing attributes added to the remote procedures means; a means for executing procedures and obtaining results from the execution; a means for generating messages requesting another remote procedure means to execute a procedure if the other remote procedures means is to be used during the execution of the remote procedure means, the message containing a parameter needed for the execution for the procedure of the other remote procedure means; a means for analyzing received hypertext containing execution results from the other remote procedure means sent as a reply to a message generated by the message generating means, and extracting parameters needed for the execution of the original procedure from the hypertext; and a means for generating hypertext containing execution results from the procedure executing means.

In another embodiment of the device for processing remote procedures, a remote procedure holding means also has means for disclosing stored specifications. The specification disclosing means also generates a hypertext in response to a request containing the specifications of the remote procedures. The specifications contain one or more of the following list: a formal language description relating to a parameter for the remote procedure, a natural language description relating to the parameter, a formal language description relating to a reply sent back from the remote procedure, a natural language description relating to the reply, a formal language description of the procedures of the remote procedure, a natural language description of the procedures, a hyperlink for executing the remote procedure; and means for controlling remote procedures activating either the specification disclosing means or the procedure executing means based on the parameter sent from the remote procedure retrieving means.

In yet another embodiment of the device for processing remote procedures, the message generating means generates a message containing a hyperlink if the parameter includes a hyperlink indicating execution of another remote procedure.

In still another embodiment of the device for processing remote procedures the hypertext generating means generates hypertext containing a parameter extracted from the message analyzing means in the form of a hyperlink.

A still further embodiment of the device for processing remote procedures has one or more means for holding procedure specifications. The procedure specification holding means has a means for storing attributes attached to the procedure specifications holding means; and a means for disclosing stored specifications for remote procedures containing one or more of the following and generating a hypertext in response to a request for the specifications of the remote procedures: a formal language description relating to a parameter for the remote procedure, a natural language description relating to the parameter, a formal language description relating to a reply sent back from the remote procedure, a natural language description relating to the reply, a formal language description of the remote procedure, a natural language description of the procedures, and a hyperlink for executing the remote procedure.

In another embodiment of the device for processing remote procedures, the network includes one or more remote procedure servers and one or more remote procedure clients. The remote procedure server has one or more means for disclosing specifications of a remote procedure, including parameter data referred to during execution by a remote procedure that can be specified remotely via a network, generating hypertext containing the specifications of the remote procedure in response to a request, and linked to an attribute. The remote procedure server also has a first means for communicating a received message containing a retrieval expression and sending hypertext generated by the specification disclosing the first means; a second means for analyzing messages received from the first communicating means and extracting a retrieval expression; and a means for retrieving the specification disclosing means that matches the retrieval expression extracted by the message analyzing means and requesting the retrieved specification disclosing means to generate hypertext. The remote procedure client has a means for requesting specification disclosure receiving a retrieval expression for specifying the specification disclosing means; a means for generating messages, generating a first message containing the retrieval expression received by the specification disclosure requesting means, generating a second message for requesting a procedure call, and generating a third message in which the second message is substituted for the parameter value; a second means for communicating sending of the first message generated by the message generating means and receiving hypertext sent from the first communication, means of the remote procedure server in response to the message; a means for analyzing hypertext, analyzing the hypertext received from the second communicating means and extracting parameter data contained in the specifications of the remote procedure; and a means for storing the second message generated by the message means.

In another embodiment of the device for processing remote procedures, the remote procedures are performed by a network information system having a plurality of computer systems performing information processing linked via a network. The device has a communication means for accepting a first procedure call expression, the first procedure call expression having a first bind expression, and the first bind expression having a first argument value and a first argument assignment. The device also has a second procedure call expression having a second bind expression, with the second bind expression having a second argument value and a second argument assignment. A bind replacement means is also part of the device, where the second argument value and the second argument assignment are replaced by the first argument value from the first procedure call expression, resulting in the generation of a revised second procedure call expression, indicating the replacement of the second argument assignment. Also part of the device is a procedure call expression analysis means for accepting the second procedure call expression and deriving from said second procedure call expression the values assigned to the second argument and generating a remote procedure retrieval expression. At least one remote procedure holding means is available, along with a remote procedure search means for searching the remote procedure holding means, the remote procedure search means inputting the value assigned to the second argument based on the remote procedure retrieval expression created by the procedure call expression analysis means, whereby the remote holding means accepts the value assigned to the second argument by the procedure call expression analysis means. The remote procedure holding means also has a procedure specification disclosure means, a procedure execution means, and a bind request processing means, whereby the procedure execution means inputs an assigned argument from the procedure call expression analysis means and executes the procedure according to the assigned argument and outputs a specification, disclosure request when the argument is unassigned. The procedure specification disclosure means stores at least one specification of the remote procedures, each specification including information of arguments required for the remote procedure, and the procedure specification disclosure means outputting a specification after accepting the specification disclosure request from the procedure execution means. Lastly, the bind request processing means outputs a new specification which includes the assignment of any unassigned argument. In this manner, for example, the necessary binding rules for a client and server are exchanged between a client and a server, and the network handshaking completed.

A still further embodiment of the device for processing remote procedures comprises a means for displaying hypertext containing a parameter substitution component that allows a user to substitute values for parameters based on the parameter data extracted by the hypertext analyzing means.

In yet another embodiment of the device for processing remote procedures, the remote procedure server sends and receives messages via the Internet, and the message storing means stores a URL. The message generating means substitutes the URL stored by the message storing means for the value of a parameter extracted by the hypertext analyzing means, and generates a second URL containing the substituted URL, in a nested manner, in the parameter.

In a still further embodiment of this invention for processing remote procedures, the remote procedure server sends and receives messages via the Internet, and the message storing means stores a protocol message in an HTTP. The message generating means substitutes the protocol message stored by the message storing means for the value of a parameter extracted by the hypertext analyzing means, and generates a second protocol message containing the protocol message substituted, in a nested manner, in the parameter.

BRIEF DESCRIPTION OF THE DRAWINGS

FIG. 2 depicts a sample display on hypertext display component 13 of the first embodiment of the device for processing remote procedures.

FIG. 3 depicts another display on hypertext display component 13 of the first embodiment of the device for processing remote procedures.

FIG. 12(A), FIG. 12(B), and FIG. 12(C) depict a sample of a portion of data used in a sample procedure of the third embodiment of the device for processing remote procedures.

FIG. 13(A) and FIG. 13(B) depict sample of a portion of data used in a sample procedure of the third embodiment of the device for processing remote procedures.

FIG. 14 depicts a sample display on hypertext display component 13 of the third embodiment of the device for processing remote procedures.

FIG. 22 shows one of the illustrations of the hyper-text which is output by the procedure specification disclosure component which occurs in the fifth embodiment of the remote procedure processing device.

FIG. 26 is an illustration of one example of the hyper-text which is maintained by the procedure specification disclosure component in the fifth embodiment of the remote procedure processing device.

FIG. 27(A), FIG. 27(B), FIG. 27(C) and FIG. 27(D) is an illustration of one example of a portion of the data which exchanges in an example of the specific operations which occur in the fifth embodiment of the remote procedure processing device.

FIG. 28(A), FIG. 28(B), FIG. 28(C) and FIG. 28(D) is an illustration (cont.) of one example of a portion of the data which exchanges in an example of the specific operations which occur in the fifth embodiment of the remote procedure processing device.

FIG. 29(A), FIG. 29(B), FIG. 29(C) and FIG. 29(D) is an illustration (cont.) of one example of a portion of the data which exchanges in an example of the specific operations which occur in the fifth embodiment of the remote procedure processing device.

DETAILED DISCLOSURE OF PREFERRED EMBODIMENTS

Figure 1:
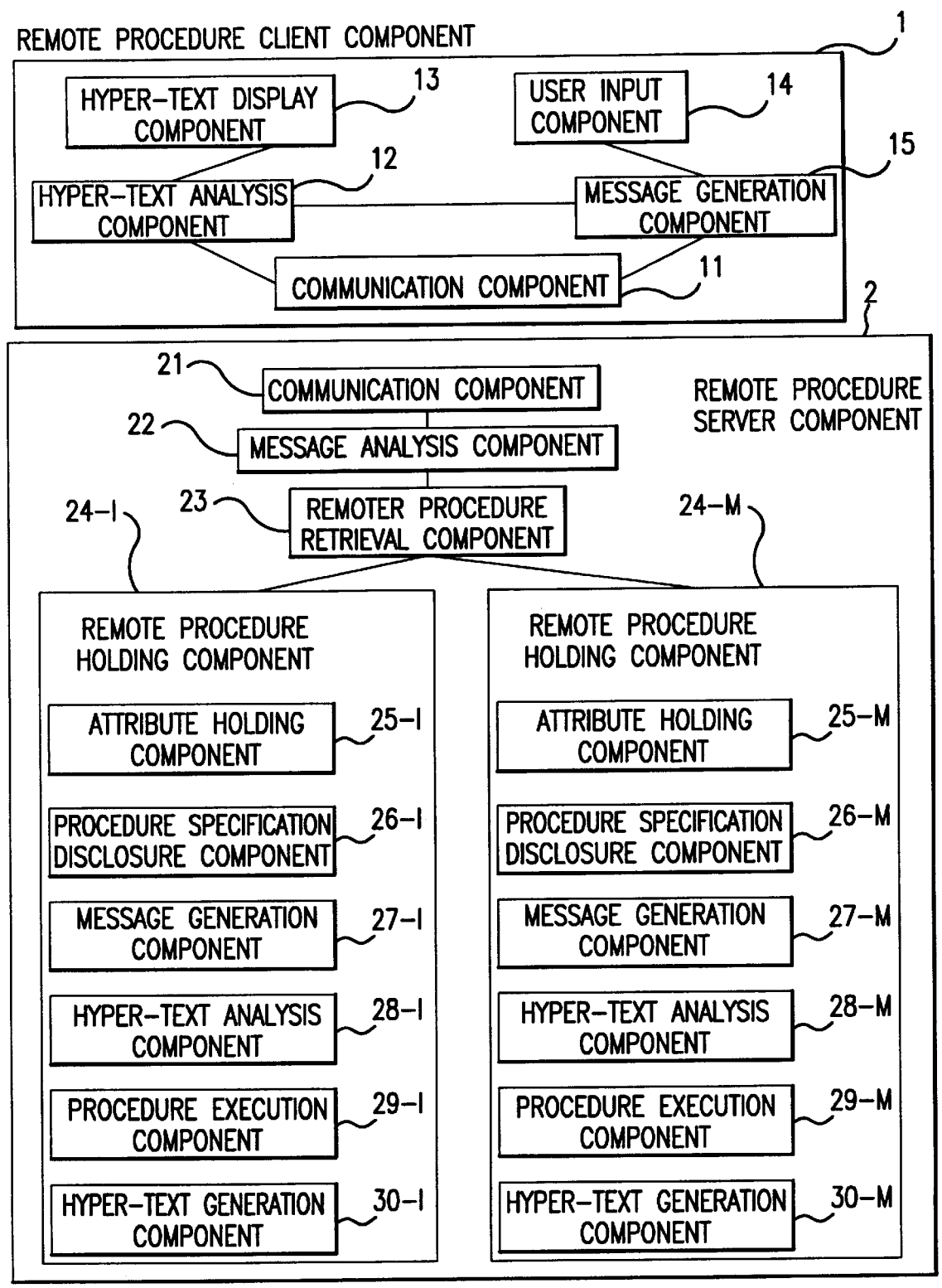
FIG. 1 is a block diagram showing the first embodiment of the device for processing remote procedures.

FIG. 1 is a block diagram showing the first embodiment of the device for processing remote procedures according to the present invention. In the drawing, there is shown a remote procedure client 1, a remote procedure server 2, a communications components 11 and 21, a hypertext analysis component 12, a hypertext display component 13, a user input component 14, a message generation component 15, a message analysis component 22, a remote procedure retrieval component 23, remote procedure holding components 24-1 through 24-M, attribute holding component 25-1 through 25-M, procedure specification disclosure components 26-1 through 26-M, message generation components 27-1 through 27-M hypertext analysis components 28-1 through 28-M, procedure execution components 29-1 through 29-M, and hypertext generation components 30-1 through 30-M.

The device for processing remote procedures described in this first embodiment has a remote procedure client 1 and a remote procedure server 2. Alternatively, the device for processing remote procedures can generally have one or ore remote procedure clients 1 and one or more remote procedure servers 2.

Remote procedure client 1 has a communication component 11, a hypertext analysis component 12, a hypertext display component 13, a user input component 14, and a message generation component 15. Communication component 11 transmits 1. messages received from message generation component 15 to another communication component, and
2. sends the hypertext received as a response to hypertext analysis component 12.

Hypertext. analysis component 12 analyzes the hypertext received from communication component 11 and requests hypertext display component 13 to display the hypertext to the user. Hypertext analysis component 12 also sends message generation data to message generation component 15 so that a message based on the user input from user input component 14 is generated. In response to the requests from the hypertext analysis component 12 and user input component 14, hypertext display component 13 displays the hypertext to the user as images and audio data. User input component 14 sends message generation requests to message generation component 15 and display requests to hypertext display component 13 based on input from a keyboard, a pointing device, and the like. In response to the requests from user input component 14, message generation component 15 generates a first message containing a retrieval expression specifying a remote procedure holding component 24 and sends this first message to communication component 11.

Remote procedure server 2 has a single communication component 21, a single message analysis component 22, a single remote procedure retrieving component 23, and M remote procedure holding components 24-1 through 24-M. Remote procedure holding components 24-1 through 24-M include an attribute holding component 25, a procedure specification disclosure component 26, a message generation component 27, a hypertext analysis component 28, a procedure execution component 29, and a hypertext generation component 30.

Communication component 21 receives messages containing retrieval expressions and sends hypertext generated by hypertext generation components 30-1 through 30-M. Message analysis component 22 analyzes a message string received from communication component 21. Message analysis component 22 extracts a retrieval expression to be sent to the remote procedure retrieval component 23, as well as a message to be sent to one of the remote procedure holding components 24-1 through 24-M. Remote procedure retrieval component 23 searches remote procedure holding components 24-1 through 24-M for a remote procedure holding component that matches the retrieval expression.

Attribute holding components 25-1 through 25-M hold identifiers that allow remote procedure retrieval component 23 to uniquely identify one of remote procedure holding components 24-1 through 24-M. The identifiers are stored in pairs having an attribute name and an attribute value. Alternatively, any number of attribute name-attribute value pairs can generally be held in attribute holding components 25-1 through 25-M so long as remote procedure retrieval component 23 can uniquely identify one of the remote procedure holding components 24-1 through 24-M when one or more attribute is specified.

Procedure specification disclosure components 26-1 through 26-M hold formal language descriptions for procedure parameters, natural language descriptions for procedure parameters, formal language descriptions for the reply to be returned for the procedure, natural language descriptions for the reply to be returned for the procedure, formal language descriptions for how the procedure was performed, natural language descriptions for how the procedure was performed, and hyperlinks indicating the remote procedure holding component. Alternatively, the procedure specification disclosure components 26-1 through 26-M can generally be used to hold subset of these descriptions.

When message generation components 27-1 through 27-M need to send a message to another remote procedures holding component while a procedure execution component 29-1 through 29-M is executing, procedure execution components 29-1 through 29-M send parameters for message generation to message generation component 27-1 through 27-M and a message is generated.

The message generated by the message generation components 27-1 through 27-M is sent from communication component 21 to another or the same communication component. The resulting hypertext is received and analyzed by hypertext analysis components 28-1 through 28-M. The results of the analysis and the extracted parameters are sent to procedure execution components 29-1 through 29-M.

Procedure execution components 29-1 through 29-M execute procedures according to the message received via message analysis component 22. If, during execution of the procedure, it is necessary to send a message to another remote procedure holding component to execute a remote procedure, the message is sent via message generation components 27-1 through 27-M and communication component 21. When the procedure is completed, procedure execution components 29-1 through 29-M send the results of the procedure to hypertext generation components 30-1 through 30-M.

Hypertext generation components 30-1 through 30-M generate hypertext based on the execution results sent from procedure execution components 29-1 through 29-M. The response is then sent to the communication component that sent the original message.

The following is a description of a specific example. In this example, attribute holding components 25-1 through 25-M hold at least a "name" attribute. The hyperlink for specifying communication component 21 of remote procedure server 2 is "http://host1/". A message requesting retrieval with the "name" attribute is formed by adding a string for the "name" attribute to the end of the hyperlink. In order to specify parameter names and their values, "?parameter_name=value&parameter_name=value" is added to the end of the string for the attribute value. If "?", "=", "&", and the like appear in the parameter name or value, the entire hyperlink can be set off with "("and")" so that the parameter name and value can be extracted as one unit. In general, any encoding method for extracting parameter name/parameter value pairs can be used. Methods involving start and end symbols, as well as escaping methods that convert a character into a different string can be used.

Attribute holding component 25-1 holds a "name" attribute with the value "plus", and the remote procedure holding component 24-1 can be specified with the hyperlink "http://host1/plus". In the procedure performed by the procedure execution component 29-1, two parameters v1, v2 are used. Parameter v1 is assigned a string representing a decimal integer or a hyperlink. Parameter v2 is assigned a string representing a decimal integer or a hyperlink. If a parameter is a string representing a decimal integer, the string is converted to an integer. If a parameter is a hyperlink, the remote procedure corresponding to the hyperlink is performed and the return value is obtained. The sum of the two parameters is returned as the result.

Attribute holding component 25-2 holds a "name" attribute with the value "times". Remote procedure holding component 24-2 can be specified with the hyperlink "http://host1/times". In the procedure performed by the procedure execution component 29-2, two parameters v1, v2 are used. Parameter v1 is assigned a string representing a decimal integer or a hyperlink. Parameter v2 is assigned a string representing a decimal integer or a hyperlink. If a parameter is a string representing a decimal integer, the string is converted to an integer. If a parameter is a hyperlink, the remote procedure corresponding to the hyperlink is performed and the return value is obtained. The product of the two parameters is returned as the result.

Attribute holding component 25-2 holds a "name" attribute with the value "power". Remote procedure holding component 24-3 can be specified with the hyperlink "http://host1/power". In the procedure performed by procedure execution component 29-3, two parameters v1, v2 are used. Parameter v1 is assigned a string representing a decimal integer or a hyperlink. Parameter v2 is assigned a string representing a decimal integer or a hyperlink. If a parameter is a string representing a decimal integer, the string is converted to an integer. If a parameter is a hyperlink, the remote procedure corresponding to the hyperlink is performed and the return value is obtained. The value of parameter v1 to the power of v2 is returned as the result.

The following is an example of how the configuration described operates. In this example, a remote procedure call represented by the following hyperlink is performed: http://host1/plus?v1=1&v2=(http:///host1/times?v1=2&v2=(http://host1/power?v1=3&v2=4)). The user enters the string "http://host1/plus?v1=1&v2=(http://host1/times?v1=2&v2=(http://host1/power?v1=3&v2=4))" via user input component 14. This string will be referred to as string 1.

Based on string 1, message generation component 15 generates a message requesting execution of a procedure: plus?v1=1&v2=(http://host1/times?v1=2&v2=(http://host1/power?v1=3&v2=4)).

This message is sent to communication component 11, to be sent to the communication component 21 indicated by "http://host1/" in string.

Communication component 11 retrieves the communication component that corresponds to the string "http://host1/", and the message plus?v1=1&v2=(http://host1/times?v1=2&v2=(http://host1/power?v1=3&v2=4)) is sent to communication component 21. This message will be referred to as message 1.

Communication component 21 receives message 1 and sends it to the message analysis component 22. When message analysis component 22 receives message 1, message analysis component 22 requests remote procedure retrieval component 23 to retrieve a remote procedure holding component that has a "name" attribute of "plus". Remote procedure retrieval component 23 searches the remote procedures holding components and returns remote procedure holding component 24-1. Message analysis component 22 sends the message v1=1&v2=(http://host1/times?v1=2&v2=(http://host1/power?v1=3&v2=4)) to remote procedure holding component 24-1. This message will be referred to as message 2.

When message 2 is received, remote procedure holding component 24-1 sends message 2 to procedure execution component 29-1. Procedure execution component 29-1 analyzes message 2, resulting in an assignment of "1" to parameter v1 and an assignment of "http://host1/times?v1=2&v2=(http://host1/power?v1=3&v2=4)" to parameter v2. Parameter v1 is evaluated, resulting in an integer 1. In order to evaluate parameter v2, the value assigned to v2, "http://host1/times?v1=2&v2=(http://host1/power?v1=3&v2=4)" is sent to message generation component 27-1, and a message is requested.

Message generation component 27-1 generates the message "times?v1=2&v2=(http://host1/power?v1=3&v2=4)" and requests communication component 21 to send the message to the communication component represented by the string "http://host1/". This message will be referred to as message 3.

Communication component 21 sends message 3 to the communication component represented by "http://host1/", i.e., communication component 21. When message 3 is received, communication component 21 sends message 3 to message analysis component 22. Message analysis component 22 receives message 3 and requests remote procedure retrieval component 23 to retrieve a remote procedures holding component that has a "name" attribute with a value of "times". Remote procedure retrieval component 23 performs the retrieval and returns remote procedure holding component 24-2. Message analysis component 22 sends the message "v1=2&v2=(http://host1/power?v1=3&v=4)" to remote procedure holding component 24-2. This message will be referred to as message 4.

When message 4 is received, remote procedure holding component 24-2 sends message 4 to procedure execution component 29-2. Procedure execution component 29-2 analyzes message 4 and assigns parameter v1 with "2" and assigns parameter v2 with "http://host1/power?v1=3&v2=4". Parameter v1 is evaluated, resulting in an integer 2. In order to evaluate parameter v2, a message is requested and the value assigned to parameter v2, "http://host1/power?v1=3&v2=4", is sent to message generation component 27-2.

Message generation component 27-2 generates the message "power?v1=3&v2=4" and requests communication component 21 to send this message to the communication component represented by "http://host1/". This message will be referred to as message 5.

Communication component 21 sends message 5 to the communication component represented by "http://host1/", i.e., communication component 21. When message 5 is received, communication component 21 sends message 5 to message analysis component 22. When message analysis component 22 receives message 5, it requests remote procedure retrieval component 23 to retrieve a remote procedures holding component that has a "name" attribute with the value "power". Remote procedure retrieval component 23 performs the retrieval and returns remote procedure holding component 24-3. Message analysis component 22 sends the message "v1=3&v2=4" to remote procedure holding component 24-3. This message will be referred to as message 6.

When message 6 is received, remote procedure holding component 24-3 sends message 6 to procedure execution component 29-3. Procedure execution component 29-3 analyzes message 6 and assigns parameter v1 with "3" and assigns parameter v2 with "4". Parameter v1 is evaluated, resulting in an integer 3, and parameter v2 is evaluated, resulting in an integer 4. Based on its execution definition, procedure execution component 29-3 calculates 3 to the 4th power, resulting in 81. Procedure execution component 29-3 request hypertext generation component 30-3 to generate hypertext indicating that parameter v1 is assigned 3, parameter v2 is assigned 4, and the result of the procedure is 81.

Hypertext generation component 30-3 generates hypertext indicating that parameter v1 is assigned 3, parameter v2 is assigned 4, and the result of the procedure is 81. This hypertext is sent back to hypertext analysis component 28-2 via communication component 21. This hypertext will be referred to as hypertext 1.

When hypertext 1 is received, hypertext analysis component 28-2 extracts 81 (the result from the execution of the remote procedure) from hypertext 1. The parameter 81 is sent to procedure execution component 29-2. Based on its execution definition, procedure execution component 29-2 calculates the product of v1, which is assigned 2, and the value returned from the hyperlink in parameter v2, which is 81. The result is 162. Procedure execution component 29-2 requests hypertext generation component 30-2 to generate a hypertext indicating that parameter v1 is assigned 2, parameter v2 is assigned the hyperlink http://host1/power?v1=3&v2=4, the evaluation result of the hyperlink is 81, and the result from the procedure is 162.

Hypertext generation component 30-2 generates a hypertext indicating that parameter v1 is assigned 2, parameter v2 is assigned the hyperlink http://host1/power?v1=3&v2=4, the evaluation result of the hyperlink is 81, and the result from the procedure is 162. This hypertext is sent back to hypertext analysis component 28-1 via communication component 21. This hypertext will be referred to as hypertext 2.

When hypertext 2 is received, hypertext analysis component 28-1 extracts 162 (the result from the execution of the remote procedure) from hypertext 2, and the parameter 162 is sent to procedure execution component 29-1. Based on its execution definition, procedure execution component 29-1 adds the value assigned to parameter v1, 1, and the value returned from the hyperlink in parameter v2, 162. The result of the calculation is 163. Procedure execution component 29-1 then request hypertext generation component 30-1 to generate hypertext indicating that parameter v1 is assigned 1, parameter v2 is assigned the hyperlink http://host1/times?v1=2&v2=(http://host1/power?v1=3&v2=4), the results from the evaluation of the hyperlink is 162, and the result from the procedure is 163. This hypertext is sent to communication component 21 and will be referred to as hypertext 3. Communication component 21 sends hypertext 3 to communication component 11.

Communication component 11 sends hypertext 3 to hypertext analysis component 12. When hypertext 3 is received from communication component 11, hypertext analysis component 12 requests hypertext display component 13 to display that parameter v1 is assigned 1, parameter v2 is assigned the hyperlink http://host1/times?v1=2&v2=(http://host1/power?v1=3&v2=4), the results from the evaluation of the hyperlink is 162, and the result from the procedure is 163. Hypertext display component 13 displays the assignments of parameters v1, v2, the evaluation results, and the results from the execution of the procedure.

FIG. 2 is a drawing describing a sample display on hypertext display component 13 from the first embodiment of the device for processing remote procedures according to the present invention. As described above, parameter v1, parameter v2, and the results from the execution of the procedure are displayed.

In this manner, a user can perform a desired procedure by combining remote procedures. In this example, the messages generated by message generation component 27-1, 2 are received by remote procedures holding components within the same remote procedure server 2. However, the present invention is not restricted to this, and these messages can be received and processed by other remote procedure servers connected via a network.

In the procedure described above, hypertext display component 13 can display the assignments of parameter v1, v2 and evaluation results in addition to the results from the execution of the procedure. When this kind of display is shown, the user may be interested in the assignment of parameter v2 of http://host1/plus. The user operates a pointing device or the like to call up via user input component 14 the remote procedure corresponding to the hyperlink assigned to parameter v2. Alternatively, the remote procedure corresponding to the assignment of parameter v2 can be indicated by a string entered from a keyboard or the like.

User input component 14 analyzes the input from the user and sends the results of the analysis to message generation component 15. Based on the results of the analysis by hypertext analysis component 12, message generation component 15 determines that the user entry is a message generation request corresponding to hyperlink http://host1/times?v1=2&v2=(http://host1/power?v1=3&v2=4). Message generation component 15 requests the communication component represented by "http://host1/" to send the message times?v1=2&v2=(http://host1/power?v1=3&v2=4). This message will be referred to as message 7. Communication component 21 sends message 7 to the communication component represented by "http://host1/", i.e. communication component 21.

When message 7 is received, communication component 21 sends message 7 to message analysis component 22. When message 7 is received, message analysis component 22 requests remote procedure retrieval component 23 to retrieve a remote procedures holding component having a "name" attribute with a value of "times". Remote procedure retrieval component 23 returns remote procedure holding component 24-2.

Message analysis component 22 sends the message v1=2&v2=(http://host1/power?v1=3&v2=4) to remote procedure holding component 24-2. This message will be referred to as message 8. When message 8 is received remote procedure holding component 24-2 sends message 8 to procedure execution component 29-2.

Procedure execution component 29-2 analyzes message 8 and obtains an assignment of "2" for parameter v1 and an assignment of http://host1/power?v1=3&v2=4 for parameter v2. Parameter v1 is evaluated, resulting in the integer 2. In order to evaluate parameter v2, a message generation request is made and the value assigned to parameter v2, "http://host1/power?v1=3&v2=4" is sent to message generation component 27-2.

Message generation component 27-2 generates the message "power?v1=3&v2=4" and requests communication component 21 to send the message to the communication component represented by "http://host1/". This message will be referred to as message 9. Communication component 21 sends message 9 to the communication component represented by "http://host1/", i.e. communication component 21. When message 9 is received, communication component 21 sends message 9 to message analysis component 22.

When message 9 is received, message analysis component 22 requests remote procedure retrieval component 23 to retrieve a remote procedure holding component having a "name" attribute with the value "power". Remote procedure retrieval component 23 performs the retrieval and returns remote procedure holding component 24-3. Message analysis 22 component 22 sends the message v1=3&v2=4 to remote procedure holding component 24-3. This message will be referred to as message 10.

When message 10 is received, remote procedure holding component 24-3 slends message 10 to procedure execution component 29-3. Procedure execution component 29-3 analyzes message 10, and obtains the assignment of "3" to parameter v1 and an assignment of "4" to parameter v2. Parameter v1 is evaluated, resulting in the integer 3. Parameter v2 is evaluated, resulting in the integer 4. Based on the execution definition, 3 to the 4th power is calculated, resulting in 81. Procedure execution component 29-3 request hypertext generation component 30-3 to generate hypertext indicating that parameter v1 is assigned 3, parameter v2 is assigned 4, and the results of the procedure is 81.

Hypertext generation component 30-3 generates hypertext indicating that parameter v1 is assigned 3, parameter v2 is assigned 4, and the results of the procedure is 81. The hypertext is sent back to hypertext analysis component 28-2 via communication component 21. This hypertext will be referred to hypertext 1.

When hypertext 1 is received, hypertext analysis component 28-2 extracts 81 (the result from the execution of the remote procedure) from hypertext 1. The parameter 81 is sent to procedure execution component 29-2. According to the execution definition in procedure execution component 29-2, 2 and 81 are multiplied, resulting in 162. Procedure execution component 29-2 requests hypertext generation component 30-2 to generate hypertext indicating that parameter v1 is assigned 2, parameter v2 is assigned the hyperlink http://host1/power?v1=3&v2=4, the evaluation result of the hyperlink is 81, and the result from executing the procedure is 162.

Hypertext generation component 30-2 generates hypertext indicating that parameter v1 is assigned 2, parameter v2 is assigned the hyperlink http://host 1/power?v1=3&v2=4, the evaluation result of the hyperlink is 81, and the result from executing the procedure is 162. The hypertext is sent back to hypertext analysis component 12 via communication component 11. This hypertext will be referred to as hypertext 2.

When hypertext 3 is received from communication component 11, hypertext analysis component 12 requests hypertext display component 13 to display information indicating that parameter v1 is assigned 2, parameter v2 is assigned the hyperlink http://host1/power?v1=3&v2=4, and the result from executing the procedure is 162.

FIG. 3 is a drawing describing a sample display from hypertext display component 13 from the first embodiment of the device for processing remote procedures of the present invention. As described above, parameter v1, parameter v2, and the result from execution of the procedures is displayed.

In this manner, the user can refer to the parameters provided to the remote procedure and the execution results. Thus, users can leave the parameters unchanged and execute the remote procedure. Here, the parameters are specified as-is, but it would also be possible to edit the displayed hypertext to perform a different remote procedure. It would also be possible to provide support for this type of remote procedure.

Figure 4:
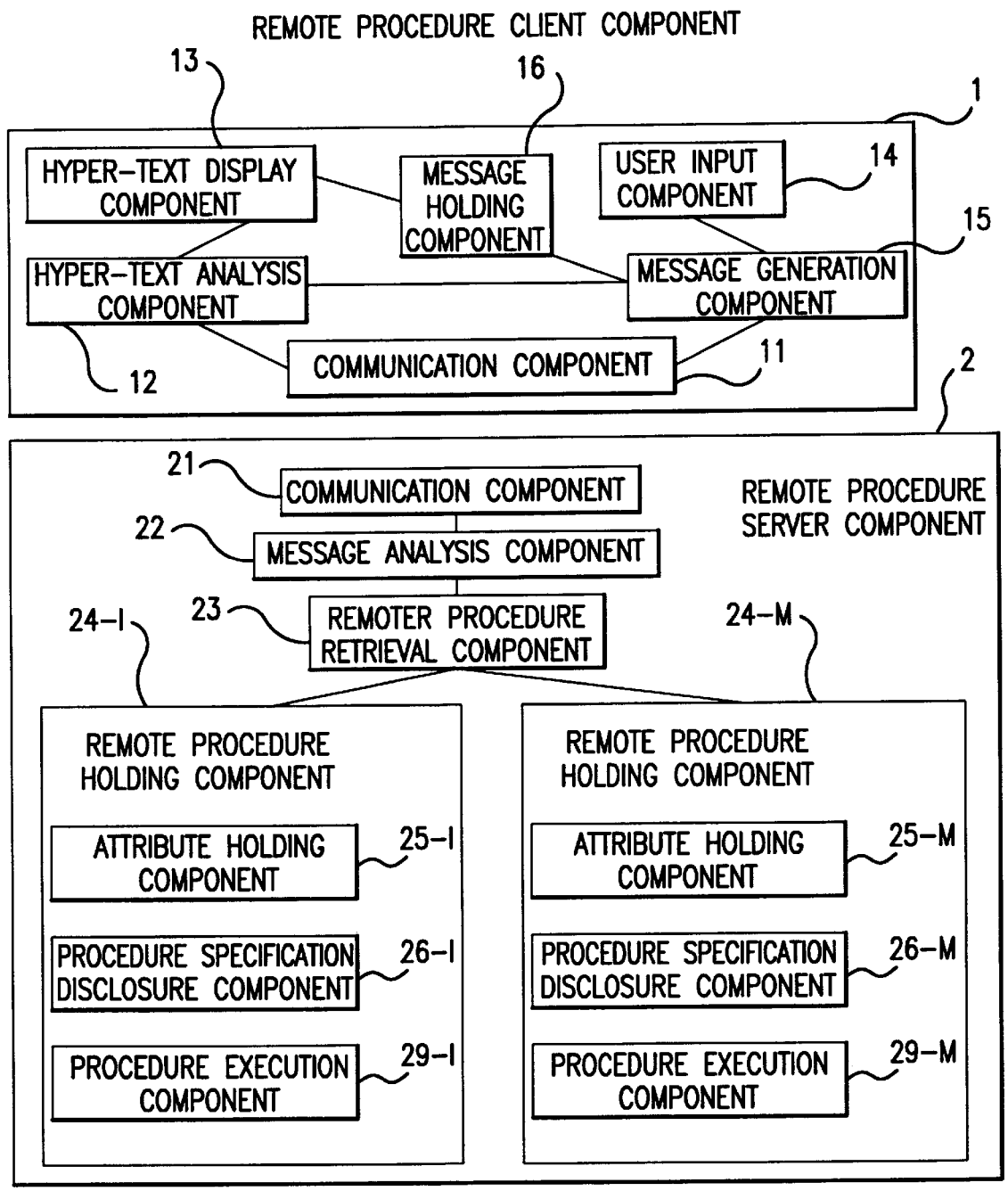
FIG. 4 is a block diagram of the second embodiment of the device for processing remote procedures.

FIG. 4 is a block diagram of the second embodiment of the device for processing remote procedures according to the present invention. In the drawing, parts that are identical to those in FIG. 1 are assigned identical numerals. The drawing shows a message holding component 16. In the second embodiment, the user can use hypertext to recursively create hyperlinks from a leaf.

The device for processing remote procedures according to the second embodiment also comprises a remote procedure client 1 and a remote procedure server 2. Alternatively, one or more remote procedure clients and one or more remote procedure servers can be used.

Remote procedure client 1 has a communication component 11, a hypertext analysis component 12, a hypertext display component 13, a user input component 14, a message generation component 15, and a message holding component 16. Communication component 11 transmits messages received from message generation component 15 to another communication component and sends the hypertext received as a response to hypertext analysis component 12. Hypertext analysis component 12 analyzes the hypertext received from communication component 11 and requests hypertext display component 13 to display the hypertext to the user. Hypertext analysis component 12 also sends message generation data to message generation component 15 so that a message based on the user input from user input component 14 is generated. The message generation data contains data related to parameters necessary for the execution of the remote procedures. In response to the requests from hypertext analysis component 12, user input component 14, and message holding component 16, hypertext display component 13 displays the hypertext to the user as character, image and audio data. User input component 14 sends message generation requests to message generation component 15 and display requests to hypertext display component 13 based on input from a keyboard, a pointing device, and the like. In response to the requests from user input component 14, message generation component 15 generates a first message containing, a retrieval expression specifying a remote procedure holding component 24 and sends this first message to communication component 11 and message holding component 16. In response to the request from user input component 14, message generation component 15 requests message holding component 16 to send a second message held in message holding component 16. Based on the results from the hypertext analysis performed by hypertext analysis component 12, a third message is sent to communication component 11 and message holding component 16. Message holding component 16 assigns a number to the received message and manages a list comprising number/message pairs. In response to a message output request, in which a number is specified, message holding component 16 retrieves the message linked to the number from the list and sends this message to message generation component 15.

Remote procedure server 2 has a single communication component 21, a single message analysis component 22, a single remote procedure retrieval component 23, and M remote procedure holding components 24-1 through 24-M. Remote procedure holding components 24-1 through 24-M have an attribute holding component 25, a procedure specification disclosure component 26, and an procedure execution component 29.

Communication component 21 receives messages containing retrieval expressions and sends hypertext generated by specification disclosure components 26-1 through 26-M. Message analysis component 22 analyzes messages (strings received from communication component 21), and sends retrieval expressions to remote procedure retrieving component 23. Message analysis component 22 also requests the specification disclosure component held by the retrieved remote procedure holding component to disclose the procedure specifications. Remote procedure retrieval component 23 retrieves the remote procedure holding component that matches the retrieval expression.

Attribute holding components 25-1 through 25-M contain attributes that represent identifiers that allows remote procedure retrieval component 23 to uniquely identify remote procedure holding components 24-1 through 24-M. These attributes are stored as a list of attribute name/attribute value pairs. Alternatively, any number of attribute name/attribute value pairs can be held in attribute holding components 25-1 through 25-M as long as specifying one or more attributes can allow remote procedure server 2 to uniquely identify a remote procedure holding component. Specific-ition disclosure components 26-1 through 26-M contain formal language descriptions for procedure parameters, natural language descriptions for procedure parameters, formal language descriptions for the reply to be returned for the procedure, natural language descriptions for the reply to be returned for the procedure, formal language descriptions for how the procedure was performed, natural language descriptions for how the procedure was performed, and hyperlinks indicating the remote procedure holding component. Alternatively, specification disclosure components 26-1 through 26-M can generally be used to hold subsets of these descriptions. Specification disclosure components 26-1 through 26-M send hypertext containing specification descriptions in response to requests from message analysis component 22. Procedure execution components 29-1 through 29-M execute the procedures disclosed by specification disclosure components 26-1 through 26-M.

The following is a description of a specific example. Attribute holding components 25-1 through 25-M holds at least a "name" attribute. The hyperlink for specifying communication component 21 of remote procedure server 2 is "http://host1/". A string for the "name" attribute is added to the end of this hyperlink in order to form a message requesting retrieval using the "name" attribute. In order to specify parameter names and their values, "?parameter_name=value& parameter_name=value" is added to the end of the string for the attribute value. If "?", "=", "&", and the like appear in the parameter name or value, the entire hyperlink can be set off with "(" and ")" so that the parameter name and value can be extracted as one unit. In general, any encoding method for extracting parameter name/parameter value pairs can be used. Methods involving start and end symbols, as well as escaping methods that convert a character into a different string can be used.

Attribute holding component 25-1 of remote procedure holding component 24-1 holds a "name" attribute with the value "plus". Remote procedure holding component 24-1 can be specified with the hyperlink "http://host1/plus". In response to a request for specification disclosure, procedure specification disclosure component 26-1 outputs hypertext containing information indicating that: there are two parameters v1, v2; parameter v1 is either a string representing an integer or a hyperlink; parameter v2 is either a string representing an integer or a hyperlink; if a parameter is a string representing an integer, the string is converted to an integer; if the parameter is a hyperlink, the remote procedure corresponding to the hyperlink is performed and the return value is obtained; the two values are added and the result is returned; and the hyperlink, which serves as the message generation data for executing procedure execution component 29-1.

Attribute holding component 25-2 of remote procedure holding component 24-2 holds a "name" attribute with the value "times". Remote procedure holding component 24-2 can be specified with the hyperlink "http://host1/plus". In response to a request for specification disclosure, procedure specification disclosure component 26-2 outputs hypertext containing information indicating that: there are two parameters v1, v2; parameter v1 is either a string representing an integer or a hyperlink; parameter v2 is either a string representing an integer or a hyperlink; if a parameter is a string representing an integer, the string is converted to an integer; if the parameter is a hyperlink, the remote procedure corresponding to the hyperlink is performed and the return value is obtained; the two values are multiplied and the result is returned; and the hyperlink, which serves as the message generation data for executing procedure execution component 29-2.

Figure 5:
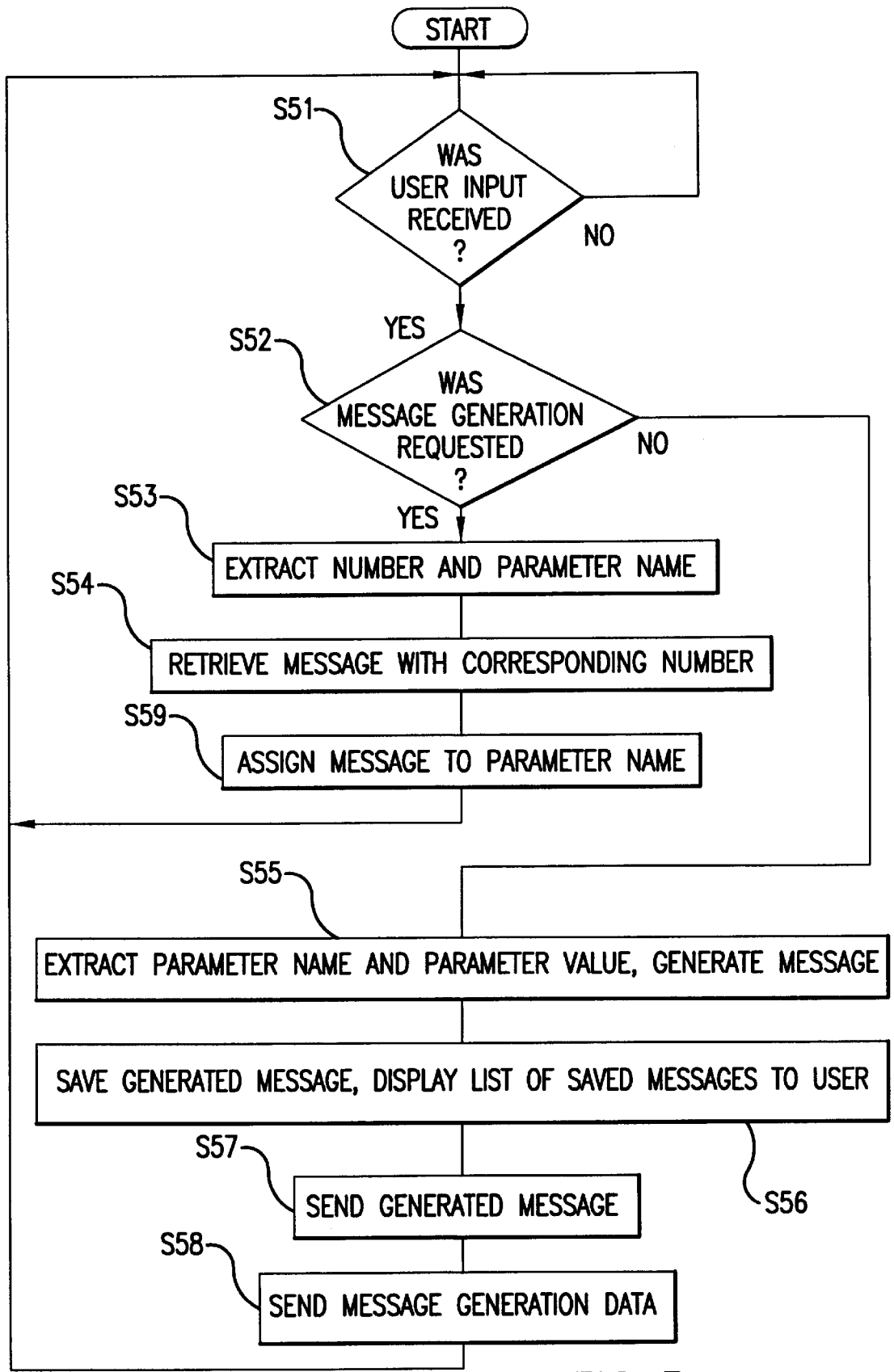
FIG. 5 is a schematic flowchart showing the procedure of remote procedure client 1 of the second embodiment of the device for processing remote procedures.

FIG. 5 is a schematic flowchart showing the procedures of remote procedure client 1 in the second embodiment of the device for processing remote procedures according to the present invention. At step S51, user input component 14 waits for input from the user. When user input is received, user input component 14 analyzes the input at step 52. The user input is evaluated to see if it is a request to generate a message. If the input is a request to generate a message, control proceeds to step S53. Otherwise, control proceeds to step S55.

At step 53, message generation component 15 extracts the message number and parameter name held in message holding component 16 from the data received from user input component 14. Then, at step S54, message generation component 15 sends the extracted number to message holding component 16 and requests the message having the corresponding number. Message holding component 16 sends the message corresponding to the received number to message generation component 15. At step S59, message generation component 15 assigns the message received from message holding component 16 to the parameter name and control returns to step S51.

At S55, message generation component 15 receives the analysis results from hypertext analysis component 12, the message sent from message holding component 16, and the input from user input component 14. Parameter names and parameter values are extracted from these. Based on the message generation data received from hypertext analysis component 12, a message for remote procedure server 2 is generated. The message is then sent to communication component 11 and message holding component 16.

At S56, message holding component 16 holds the message generated and sent by message generation component 15. Message holding component 16 requests hypertext display component 13 to display a list of messages being held to the user. In response to this request from message holding component 16, hypertext display component 13 displays to the user a list of messages in the form of character, image, and audio data.

At S57, communication component 11 sends a message to the communication component of the sending destination as specified in the message generated and sent by message generation component 15 at S55. If a reply is sent from the communication component of the sending destination as the result from the message transmission, the reply message is sent to hypertext analysis component 12.

At S58, hypertext analysis component 12 analyzes the reply message, which contains hypertext. Based on the results of the analysis, hypertext analysis component 12 requests the hypertext display components to show the user the hypertext. In response to the request from hypertext analysis component 12, hypertext display component 13 displays the hypertext to the user as character, image, and audio data. Hypertext analysis component 12 also sends message generation data to message generation component 15. Control then returns to S51.

Figure 6:
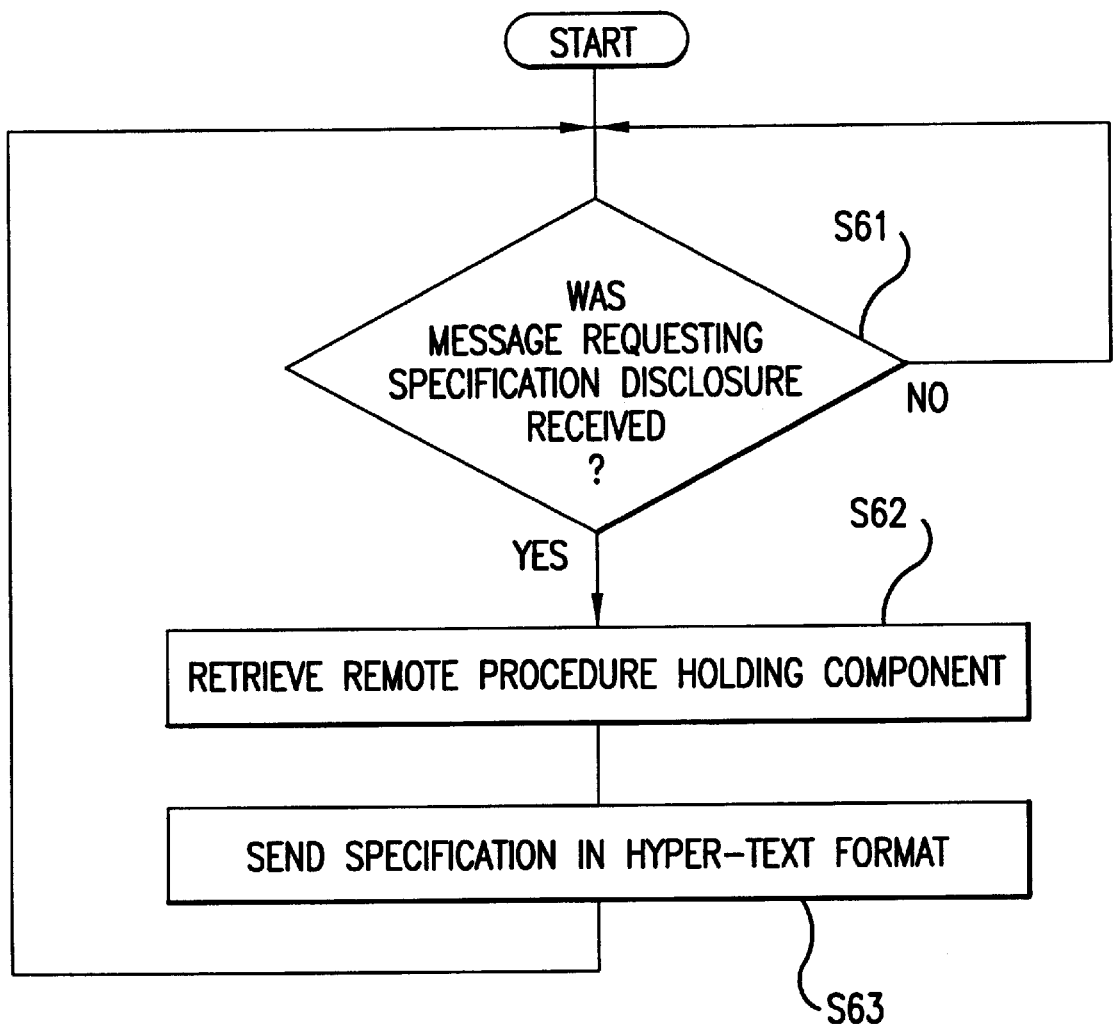
FIG. 6 is a schematic flowchart showing the flow of remote procedure server 2 of the second embodiment of the device for processing remote procedures.

FIG. 6 is a schematic flowchart showing the procedures of remote procedure server 2 in the second embodiment of the device for processing remote procedures according to the present invention. At S61 communication component 21 waits for a specification disclosure request message to arrive. If a specification disclosure request message arrives, the message is sent to message analysis component 22 and communication component 21 begins waiting for a message again.

At S62, message analysis component 22 analyzes the message received from communication component 21. Message analysis component 22 extracts a retrieval expression to be sent to remote procedure retrieval component 23 and a specification disclosure request message for disclosure from the procedure specification disclosure component held in the remote procedures holding component specified by the results from the retrieval performed by remote procedure retrieving component 23. Remote procedure retrieval component 23 then retrieves a remote procedure holding component according to the retrieval expression. Message analysis component 22 sends a specification disclosure message for the procedure specification disclosure component in the retrieved remote procedures holding component.

At S63, the procedure specification disclosure component outputs the specifications of the remote procedures holding component in hypertext format.

The following is a description of the procedures described above as they apply to a specific example. In this example, the user wants to calculate 1+2×3 using remote procedures. The remote procedure is called using the hyperlink http://host1/plus?v1=1&v2=(http://host1/times?v1=2&v2=3).

First, in order to obtain the specifications for the product, the user enters the string http://host1/times via user input component 14. This string will be referred to as string 21. Based on string 21, message generation component 15 generates a message to request from the communication component represented by http://host1/ a specification disclosure for the procedure specification disclosure component corresponding to the name attribute "times". This message is sent to communication component 11. Communication component 11 retrieves the communication component corresponding to the string http://host1/. Communication component 11 then sends a message requesting specification disclosure from a procedure specification disclosure component corresponding to the name attribute "times". This message will be referred to as message 21.

When message 21 is received, communication component 21 sends message 21 to message analysis component 22. Message analysis component 22 receives message 21 and requests remote procedure retrieval component 23 to retrieve a remote procedures holding component that has a "name" attribute of times". Remote procedure retrieval component 23 retrieves the remote procedure holding component and returns remote procedure holding component 24-2.

Message analysis component 22 sends a message to remote procedure holding component 24-2 requesting specification disclosure. This message will be referred to as message 22. When message 22 is received, remote procedure holding component 24-2 requests specification disclosure from specification disclosure component 26-2.

When the specification disclosure request is received, procedure specification disclosure component 26-2 outputs hypertext indicating: there are two parameters v1, v2; the two parameters are integers; the product of parameter v1 and parameter v2 are returned; and the hyperlink indicating procedure execution component 29-1 is http://host1/times. This output will be referred to as hypertext 21. Communication component 21 sends hypertext 21 back to communication component 11 as the response to message 21.

When hypertext 21 is received, communication component 11 sends, hypertext 21 to hypertext analysis component 12. Based on hypertext 21, hypertext analysis component 12 requests hypertext display component 13 to display information to the user indicating that: there are two parameters v1, v2; the two parameters are integers; the product of parameter v1 and parameter v2 are returned; and the hyperlink indicating procedure execution component 29-1 is http://host1/times. Hypertext display component 13 displays information to the user indicating: there are two parameters v1, v2; the two parameters are integers; the product of parameter v1 and parameter v2 are returned; and the hyperlink indicating procedure execution component 29-1 is http://host1/times.

The user specifies via user input component 14 that 2 is assigned to parameter v1 and 3 is assigned to parameter v2. When the instructions from the user are received from user input component 14, message generation component 15 generates the following message: http://host1/times?v1=2&v2=3. This message will be referred to as hyperlink 21. Message generation component 15 sends hyperlink 21 to message holding component 16. Message holding component 16 holds hyperlink 21 as the first message.

In order to obtain the specifications for the sum, the user next enters the string http:/host1/plus via user input component 14. This string will be referred to as string 22. Based on string 22, message generation component 15 will generate a message for the communication component indicated by http://host1/ requesting specification disclosure from the procedure specification disclosure component corresponding to the name attribute "plus". This message is sent to communication component 11. Communication component 11 retrieves the communication component corresponding to the string http://host1/ and sends a message requesting specification disclosure from the procedure specification disclosure component corresponding to the name attribute "pius". This message will be referred to as message 23.

When message 23 is received, communication component 21 sends message 23 to message analysis component 22. When message 23 is received, message analysis component 22 requests remote procedure retrieval component 23 to retrieve a remote procedures holding component having a name attribute of "plus". Remote procedure retrieval component 23 retrieves a remote procedures holding component, returning remote procedure holding component 24-1. Message analysis component 22 sends a message requesting specification disclosure to remote procedure holding component 24-1. This message will be referred to as message 24.

When message 24 is received, remote procedure holding component 24-1 requests specification disclosure from procedure specification disclosure component 26-1. In response, procedure specification disclosure component 26-1 outputs hypertext indicating that: there are two parameters v1, v2; the parameters are both integers; the sum of parameter v1 and parameter v2 are returned as the result; and the hyperlink indicating procedure execution component 29-1 is http://host1/plus. This output will be referred to as hypertext 22. Communication component 21 sends hypertext 22 back to communication component 11 as the response to message 23.

When hypertext 22 is received, communication component 11 sends message analysis component 22 to hypertext analysis component 12. Based on hypertext 22, hypertext analysis component 12 requests hypertext display component 13 to display information to the user indicating that: there are two parameters v1, v2; the parameters are both integers; the sum of parameter v1 and parameter v2 are returned as the result; and the hyperlink indicating procedure execution component 29-1 is http://host1/plus. The hypertext display component then displays to the user information indicating that: there are two parameters v1, v2; the parameters are both integers; the sum of parameter v1 and parameter v2 are returned as the result; and the hyperlink indicating procedure execution component 29-1 is http://host1/plus.

As described above, the user was able to find the specifications relating to the product and sum. Therefore, the user can generate hypertext for performing desired calculations. At this point, the specifications for the sum is displayed, so this will be used. The user specifies via user input component 14 an assignment of 1 to parameter v1 and an assignment of the first message held in message holding component 16 to parameter v2.

When the instructions from the user are received via user input component 14, message generation component 15 requests message holding component 16 to output the first message. Message holding component 16 retrieves the message linked to number 1: "http://host1/times?v1=2&v2=3". Since the first message retrieved from message holding component 16 contains a "?", message generation component 15 sets off the message with "("and ")", and this is assigned to parameter v2. Thus, message generation component 15 generates a message "http://plus?v1=1&v2=(http://host1/times?v1=2&v2=3)". This message will be referred to as message 25. Message generation component 15 sends message 25 to message holding component 16 and message holding component 16 holds message 25 as the second message.

In this manner, the procedure specification disclosure components return the specifications for remote procedures as hypertext. By saving the hypertext, the user can combine remote procedure specifications obtained from procedure specification disclosure components in order to generate new hypertext to perform desired remote procedures.

Figure 7:
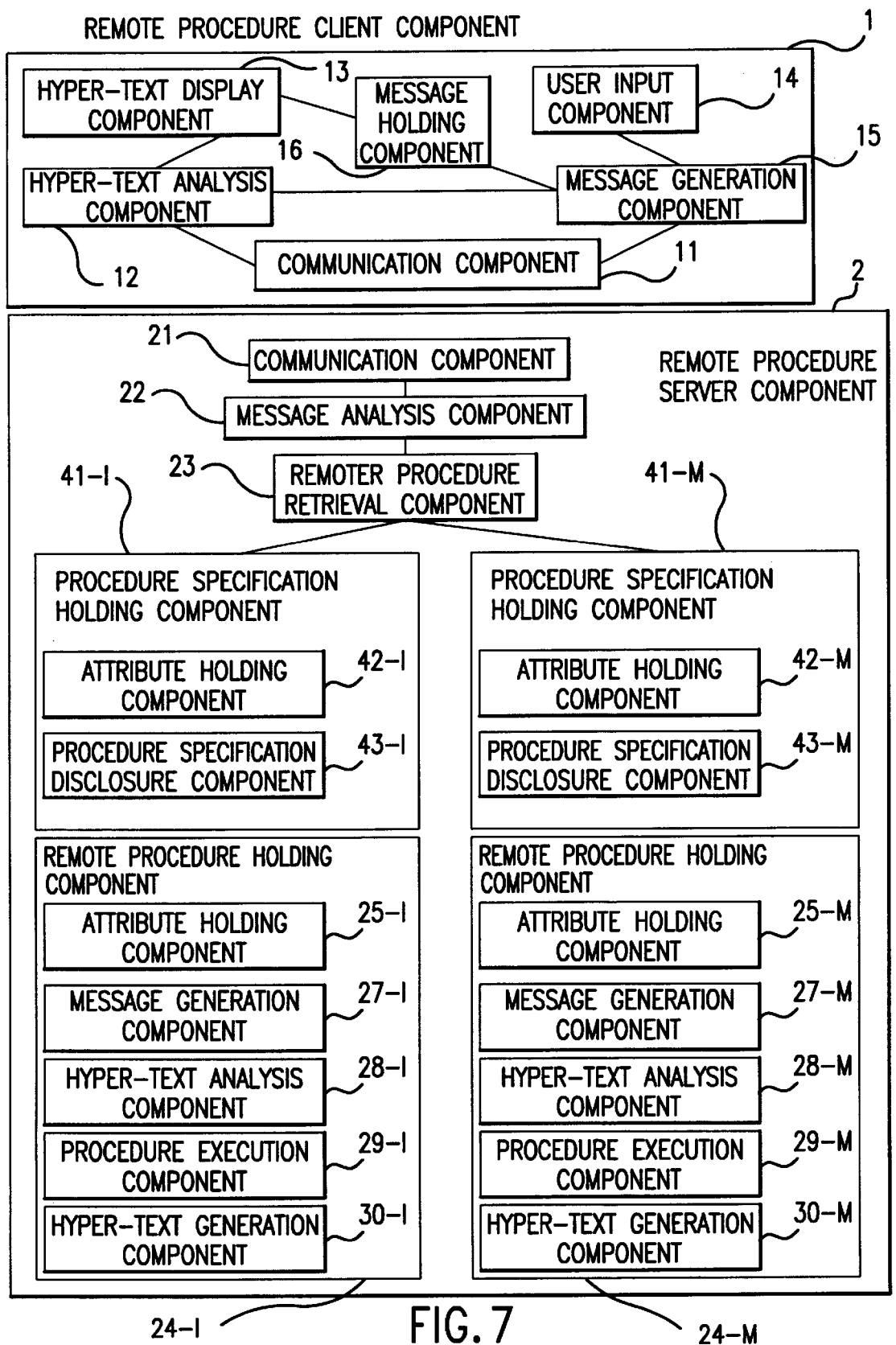
FIG. 7 is a block diagram showing the third embodiment of the device for processing remote procedures.

FIG. 7 shows a block diagram of the third embodiment of the device for processing remote procedures according to the present invention. Parts that are identical with those of FIG. 1 and FIG. 4 are assigned identical numerals. In the drawings, there is shown remote specification holding components 41-1 through 41-M, attribute holding components 42-1 through 42-M, and procedure specification disclosure components 43-1 through 43-M.

In the third embodiment, the device for processing remote procedures also comprises remote procedure client 1 and remote procedure server 2. Alternatively, the device for processing remote procedures can generally comprise one or more remote procedure client 1 and one or more remote procedure server 2.

Remote procedure client 1 has a communication component 11, a hypertext analysis component 12, a hypertext display component 13, a user input component 14, a message generation component 15, and a message holding component 16. Communication component 11 transmits messages received from message generation component 15 to another communication component ria a network and sends the hypertext received as a response to hypertext analysis component 12. The network can include a local area network that uses HIPPI (High-Performance Parallel Interface), ATM (Asynchronous Transfer Mode), Ethernet, FDDI, or ATOMIC, as well as an Internet or a wide area network that connects these types of local area networks. In the following description, sending and receiving information between communication component 11 and communication component 21 is performed via a network.

Hypertext analysis component 12 analyzes the hypertext received from communication component 11 and requests hypertext display component 13 to display the hypertext to the user in the form of characters, diagrams, images, and audio data. Hypertext analysis component 12 also sends input interpretation data and message generation data to message generation component 15. The input interpretation data provides information to determine whether the input from user input component 14 is a parameter assignment request, a message retrieval request, or a message generation request for message generation component 15, and also provides information for extracting the requested parameters. The message generation data is data for generating a message to be used in performing remote procedure calls. The message generation data includes at least header data providing format information at the start of the message. The message generation data can also include parameter data relating to the parameters included in the message.

In response to the requests from hypertext analysis component 12, user input component 14, and message holding component 16, hypertext display component 13 displays the hypertext to the user as character, image and audio data.

User input component 14 comprises a keyboard, pointing device, and the like, and receives input from the user. The input results are sent to message generation component 15 and hypertext display component 13.

In response to the input from user input component 14 and the input interpretation data from hypertext analysis component 12, message generation component 15 performs either parameter assignment, message retrieval, or message generation. If the input from the user relates to parameter assignment, parameters are assigned according to the user input. If the input from the user is a message retrieval request, the number specified by the user is sent to message holding component 16 and a request is made to output the message linked to the number. Based on the message generation data from hypertext analysis component 12, the parameter component contained in the message is generated. If the input from the user is a message generation request, a message is generated based on the message generation data sent from hypertext analysis component 12 in order to generate a message for performing a remote procedure call. The message is then sent to communication component 11.

Message holding component 16 adds a number to the received message and manages a list of number/message pairs. In response to message output requests that specify a number, message holding component 16 retrieves the message linked to the number from the list and sends it to message generation components 27-1 through 27-M.

Remote procedure server 2 has a single communication component 21, a single message analysis component 22, a single remote procedure retrieval component 23, M remote procedure specification holding components 41-1 through 41-M, and M remote procedure holding components 24-1 through 24-M. Remote procedure specification holding components 41-1 through 41-M comprise attribute holding components 42-1 through 42-M and procedure specification disclosure components 43-1 through 43-M. Remote procedure holding components 24-1 through 24-M comprise attribute holding components 25-1 through 25-M, message generation components 27-1 through 27-M, hypertext analysis components 28-1 through 28-M, procedure execution components 29-1 through 29-M, and hypertext generation components 30-1 through 30-M.

Communication component 21 receives messages containing retrieval expressions and also sends hypertext generated by remote procedure holding components 24-1 through 24-M or remote procedure specification holding components 41-1 through 41-M. Message analysis component 22 analyzes messages entered from communication component 21 and extracts retrieval expressions to be sent to remote procedure retrieval component 23 and messages to be sent to the retrieved remote procedure holding component or procedure specification holding component. Remote procedure retrieval component 23 retrieves from remote procedure server 2 the remote procedure holding component or the procedure specification holding component that matches the retrieval expression.

Attribute holding components 25-1 through 25-M and attribute holding components 42-1 through 42-M of remote procedure holding components 24-1 through 24-M or remote procedure specification holding components 41-1 through 41-M hold lists of attribute name/attribute value pairs representing identifiers used to allow remote procedure server 2 to uniquely identify remote procedure holding components 24-1 through 24-M and remote procedure specification holding components 41-1 through 41-M. Alternatively, any number of attribute/attribute value pairs can be held in attribute holding components 25-1 through 25-M and attribute holding components 42-1 through 42-M as long as specifying one or more attributes to remote procedure server 2 can be specified to uniquely identify a remote procedure holding component 24-1 through 24-M and remote procedure specification holding component 41-1 through 41-M.

Specification disclosure components 43-1 through 43-M contain formal language descriptions for procedure parameters, natural language descriptions for procedure parameters, formal language descriptions for the reply to be returned for the procedure, natural language descriptions for the reply to be returned for the procedure, formal language descriptions for how the procedure was performed, natural language descriptions for how the procedure was performed, and hyperlinks indicating the remote procedure holding component. Alternatively, procedure specification disclosure components 43-1 through 43-M can generally be used to hold subsets of these descriptions. Procedure specification disclosure components 43-1 through 43-M send hypertext containing specification descriptions in response to requests from message analysis component 22.

When procedure execution components 29-1 through 29-M is executing a procedure and a message needs to be sent to another remote procedure holding component, message generation components 27-1 through 27-M receives message generation data and parameters needed for generating messages from procedure execution components 29-1 through 29-M and a message is generated.

The message generated by message generation components 27-1 through 27-M is sent by hypertext analysis components 28-1 through 28-M through communication component 21 to another communication component or the same communication component. The hypertext received as the reply is analyzed, and the extracted parameters from the analysis are sent to procedure execution components 29-1 through 29-M.

Procedure execution components 29-1 through 29-M executes procedures according to the message received from message analysis component 22. When the procedure is being executed and a message requesting execution of a remote procedure needs to be sent to another remote procedure holding component, a message is sent to communication component 21 via message generation components 27-1 through 27-M. When the procedure is completed, procedure execution components 29-1 through 29-M sends the results of the procedure to hypertext generation components 30-1 through 30-M.

Hypertext generation components 30-1 through 30-M generates hypertext based on the execution results from procedure execution components 29-1 through 29-M. The hypertext is sent as a reply to the sender of the message via communication component 21.

The following is a description of another example. Attribute holding components 25-1 through 25-M and attribute holding components 42-1 through 42-M hold at least a "name" attribute. The hyperlink to specify communication component 21 of remote procedure server 2 is "http://host1/". A string for the "name" attribute is added to the end of this hyperlink in order to form a message requesting retrieval using the "name" attribute. In order to specify parameter names and their values, "?parameter_name=value&parameter_name=value" is added to the end of the string for the attribute value. If characters such as ":", "/", "?", "=", "&", "%" or the like appear in the parameter name or value, the ASCII code of the corresponding character is added after a "%", as set forth in the Common Gateway Interface specifications. The codes above would be expressed as "%3A", "%2F", "%3F", "%26", "%25", respectively. In order to have a parameter name/value pair extracted as a single unit, starting and stopping symbols such as "(" and ")" can be used as well as escaping methods that convert a character into a different string.

Attribute holding component 42-1 of remote procedure specification holding component 41-1 holds a "name" attribute of plus". Remote procedure specification holding component 41-1 can be uniquely specified using the hyperlink "http://host1/plus".

In response to a specification disclosure request, procedure specification disclosure component 43-1 outputs hypertext containing information indicating that: the procedure executed by procedure execution component 29-1 has two parameters v1, v2; parameter v1 is assigned a string representing a decimal integer or a hyperlink, and a parameter v2 is assigned a string representing a decimal integer or a hyperlink; if a parameter is a string representing a decimal integer, the string is converted into an integer, and if a parameter is a hyperlink, the remote procedure corresponding to the hyperlink is executed and the return value is obtained; and the sum of the two values is added as the result; and the message generation data for executing procedure execution component 29-1 is "http://host1/htbin/plus".

Attribute holding component 42-2 of remote procedure specification holding component 41-2 holds a "name" attribute of "plus". Remote procedure specification holding component 41-2 can be uniquely specified using the hyperlink "http://host1/times". In response to a specification disclosure request, specification disclosure component 43-2 outputs hypertext containing information indicating that: the procedure executed by procedure execution component 29-2 has two parameters v1, v2; parameter v1 is assigned a string representing a decimal integer or a hyperlink, and parameter v2 is assigned a string representing a decimal integer or a hyperlink; if a parameter is a string representing a decimal integer, the string is converted into an integer, and if a parameter is a hyperlink, the remote procedure corresponding to the hyperlink is executed and the return value is obtained; and the sum of the two values is added as the result; and the message generation data for executing procedure execution component 29-2 is "http://host1/htbin/times".

Attribute holding component 3-1 of remote procedure holding component 24-1 has a "name" attribute of "htbin/plus". Remote procedure holding component 24-1 can be uniquely specified with the hyperlink "http://host1/htbin/plus".

Attribute holding component 3-2 of remote procedure holding component 24-2 has a "name" attribute of "htbin/times". Remote procedure holding component 24-2 can be uniquely specified with the hyperlink "http://host1/htbin/times".

Figure 8:
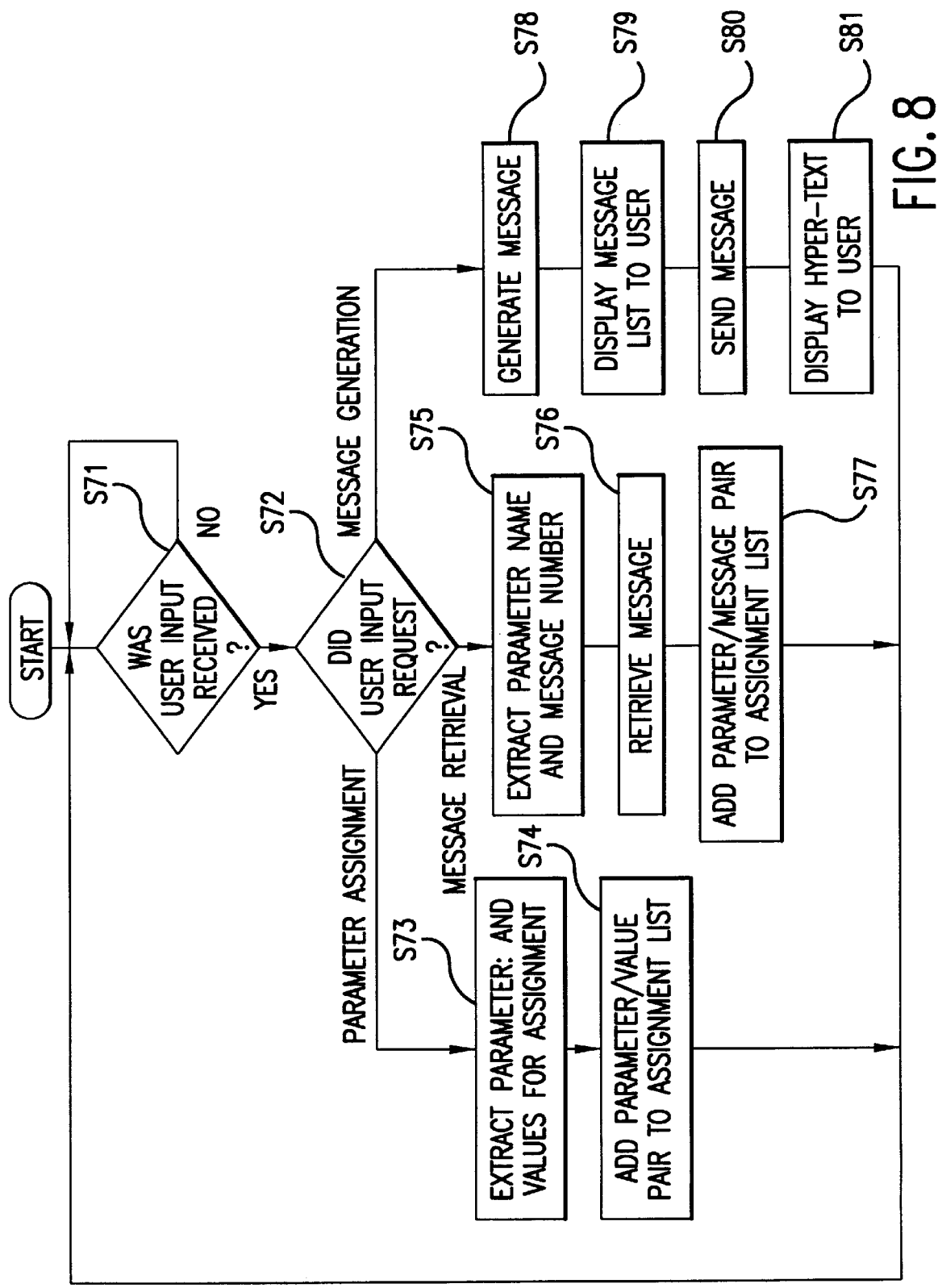
FIG. 8 is a flowchart showing a sample procedure of the remote procedure client 1 in the third embodiment of the device for processing remote procedures.

FIG. 8 is a flowchart showing one example of the remote client 1 in the third embodiment of the device for processing remote procedures according to the present invention. At S71, user input component 14 waits for input from the user. The user input is sent to message generation component 15. At S72, message generation component 15 analyzes the user input. If the user input is a request for parameter assignment, control proceeds to S73. If the user input is a request for message retrieval, control proceeds to S75. If the user input is a request for message generation, control proceeds to S79.

If the user input is a request for parameter assignment, at S73 message generation component 15 extracts the parameter and value to be assigned based on the input interpretation data and the user input. At S74, message generation component 15 adds a parameter/value pair to the assignment list. This completes the parameter assignment procedure and control returns to S71.

If the user input is a message retrieval request, at S75 message generation component 15 extracts a number and a parameter name from the input from user input component 14. Then, at S76, message generation component 15 sends the extracted number to message holding component 16 and requests that a message containing the number be sent back. Message holding component 16 sends the message linked to the received number to message generation component 15. At S77, message generation component 15 adds the parameter/message pair to the assignment list. This completes the procedures for the message retrieval request, and control returns to S71.

If the user input is a message generation request, at S78 message generation component 15 generates a message for remote procedure server 2 based on the message generation request parameter, the message generation data, and the assignment list. The message is sent to communication component 11 and message holding component 16.

???? At S199, message holding component 16 holds the message received from message generation component 15. Message holding component 16 requests hypertext display component 13 to display the list of held messages to the user. Based on the request from message holding component 16, hypertext display component 13 displays to the user the message list in the form of characters, images, and audio data.

At S80, based on the message received from message generation component 15, communication component 11 sends a message to the communication component of the destination specified in the message. If the communication component of the destination replies with the results of the sent message, the reply message is sent to hypertext analysis component 12. At S81, hypertext analysis component 12 analyzes the reply message containing hypertext. Based on the results of the analysis, hypertext analysis component 12 requests hypertext display component 13 to display the hypertext to the user and send input interpretation data and message generation data to message generation component 15. Based on the request from hypertext analysis component 12, hypertext display component 13 displays the hypertext to the user in the form of characters, images, and audio data. Control then returns to S71.

Figure 9:
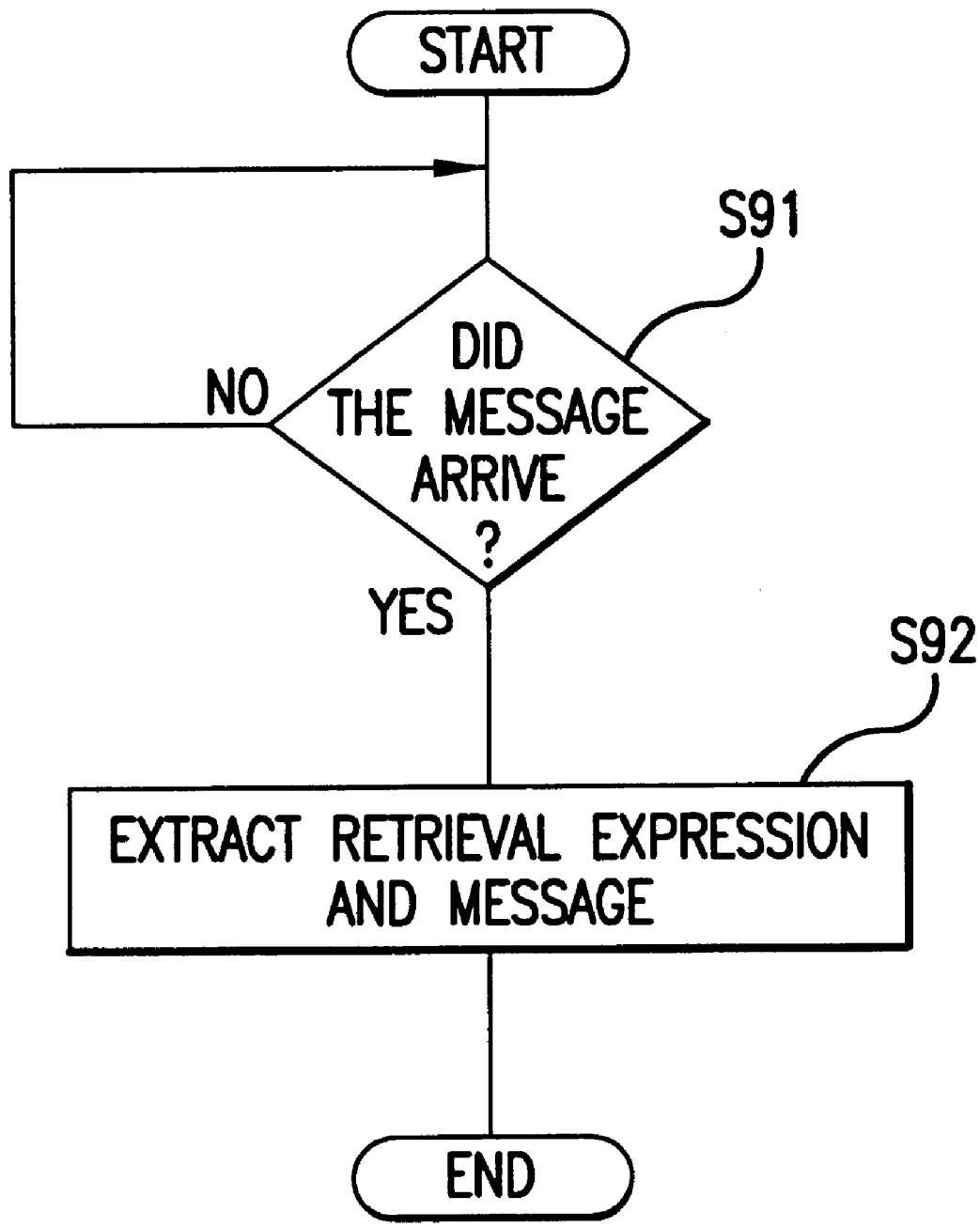
FIG. 9 is a flowchart showing a sample procedure of the remote procedure server 2 in the third embodiment of the device for processing remote procedures.

FIG. 9 is a flowchart showing an example of how remote procedure server 2 operates in the third embodiment of the device for processing remote procedures according to the present invention. At S91, communication component 21 waits for the arrival of a message. When a message arrives, the message is sent to message analysis component 22, and communication component 21 begins waiting for another message.

At S92, message analysis component 22 analyzes the first message received from communication component 21. A retrieval formula to be sent to remote procedure retrieval component 23 is extracted, as well as a second message for the remote procedure holding component or remote procedure specification holding component specified by the retrieval results from remote procedure retrieving component 23.

Figure 10:
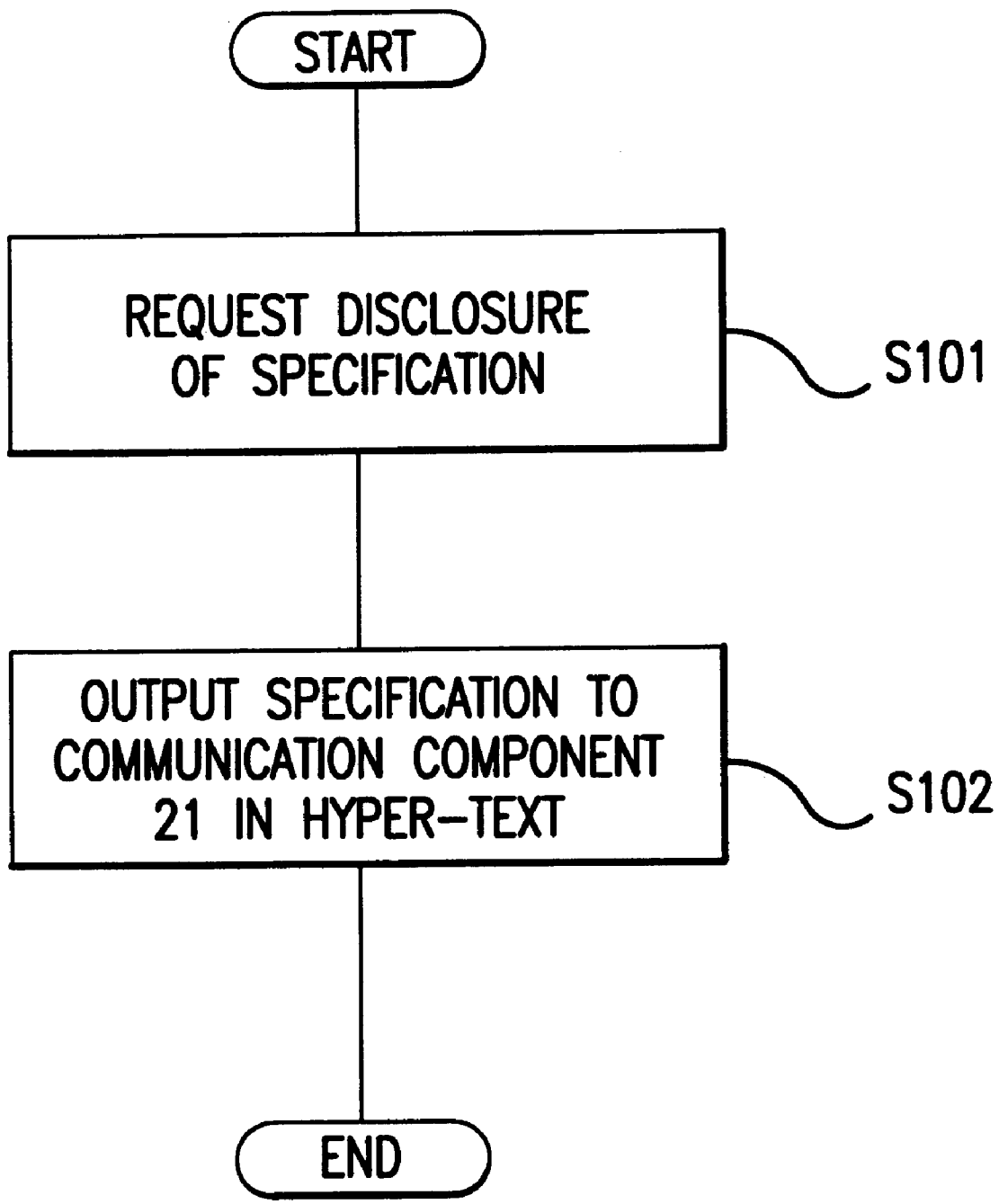
FIG. 10 is a flowchart showing a sample procedure of the remote specification holding components 41-1 through 41-M in the third embodiment of the device for processing remote procedures.

FIG. 10 is a flowchart showing an example of the procedure of remote procedure specification holding components 41-1 through 41-M of the third embodiment of the device for processing remote procedures according to the present invention. As S101, when a message arrives, remote procedure specification holding components 41-1 through 41-M requests specification disclosure components 43-1 through 43-M to disclose a specification held in remote procedure specification holding components 41-1 through 41-M. At S102, specification disclosure components 43-1 through 43-M sends the specifications in hypertext form to communication component 21.

Figure 11:
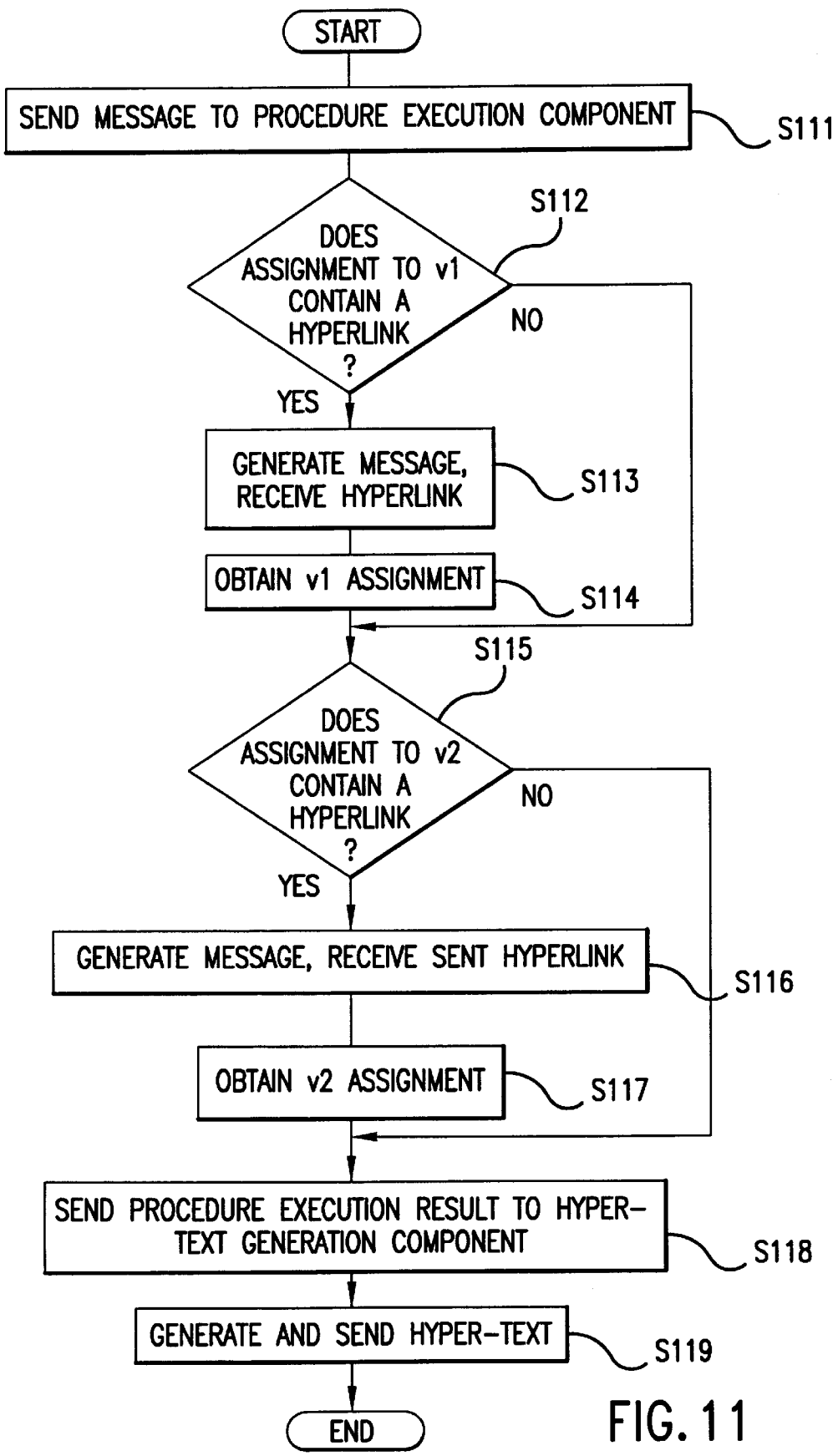
FIG. 11 is a flowchart showing a sample flow of the remote procedure holding components 24-1 through 24-M in the third embodiment of the device processing remote procedures.

FIG. 11 is a flowchart showing an example of the procedure of remote procedure holding components 24-1, 2 of the third embodiment of the device for processing remote procedures according to the present invention. The procedures of remote procedure holding component 24-1 and remote procedure holding component 24-2 are almost identical so the description will cover both together. When the first message arrives at remote procedure holding components 24-1, 2, the arrived first message is sent to procedure execution components 29-1, 2 at S111.

At S112, procedure execution components 29-1, 2 examine the assignment for parameter v1 contained in the first message. If the assignment is a string representing a decimal integer, the string is converted into an integer and parameter v1 is given a second assignment. In this case, control proceeds to S115. If the parameter is the second message containing a hyperlink, the second message is sent to message generation component 27-1, 2. Then, at S113, hypertext generation component 30-1, 2 generates a fourth message based on the second message. This message is sent to communication component 21. The resulting hypertext received from communication component 21 is sent to hypertext analysis component 28-1, 2. At S14, hypertext analysis component 28-1, 2 analyzes the received hypertext and parameter v1 is given a second assignment.

At S115, procedure execution components 29-1, 2 examine the assignment for parameter v2 contained in the first message. If the assignment is a string representing a decimal integer, the string is converted into an integer and parameter v2 is given a second assignment. In this case, control proceeds to S118. If the parameter is the third message containing a hyperlink, the third message is sent to message generation component 27-1, 2. Then, at S116, hypertext generation component 30-1, 2 generates a fifth message based on the third message. This message is sent to communication component 21. The resulting hypertext received from communication component 21 is sent to hypertext analysis component 28-1, 2. At S17, hypertext analysis component 28-1, 2 analyzes the received hypertext and parameter v2 is given a second assignment.

At S118, procedure execution component 29-1 adds the second assignments for parameter v1 and parameter v2, and the results are sent to hypertext generation component 30-1. Procedure execution component 29-2 multiplies the second assignment of parameter v1 and the second assignment of parameter v2, and the results are sent to hypertext generation component 30-2. At S119, hypertext generation component 30-1, 2 generates hypertext based on the results from procedure execution component 29-1, 2, the second message, and the third message. The resulting hypertext is sent to communication component 21.

The following is a description of a specific example of the procedures of this embodiment. FIG. 12(A) through FIG. 12(C) and FIG. 13(A) through FIG. 13(B) are drawings for the purpose of describing an example of some of the data handled in a specific example of the third embodiment of the device for processing remote procedures according to the present invention. In FIG. 12(A), a remote procedure call represented by a hyperlink is performed. In order to make the description simple, this example involves a two-step remote procedure call from remote procedure client 1. However, in this embodiment, message retrieval requests can be performed multiple times so that it is possible to perform remote procedure calls having a tree-structure of arbitrary depth.

In order to obtain the specifications relating to the multiplication, the user enters the string http://host1/times via user input component 14 and issues a message generation request. This string will be referred to as string 31.

Message generation component 15 performs message generation using string 31 as the message generation data. A message is generated for the communication component represented by http://host1/ for the procedure specification holding component or the remote procedure holding component corresponding to the name attribute "times". This message is sent to communication component 11.

Communication component 11 searches for a communication component corresponding to the string http://host1/ and retrieves communication component 21. Communication component 11 sends the message "GET /times" to communication component 21. This message will be referred to as message 31.

When message 31 is received, communication component 21 sends message 31 to message analysis component 22. When message 31 is received, message analysis component 22 requests remote procedure retrieval component 23 to retrieve a remote procedure holding component or procedure specification holding component that has a "name" attribute of "times". Remote procedure retrieval component 23 performs the retrieval, returning remote specification holding component 41-2. Message analysis component 22 sends a message requesting specification disclosure to remote specification holding component 41-2. This message will be referred to as message 32.

When message 32 is received, remote specification holding component 41-2 requests procedure specification disclosure from specification disclosure component 43-2. In response, procedure specification disclosure component 43-2 outputs hypertext as shown in FIG. 12(B) containing information indicating that: there are two parameters v1, v2; each parameter is a decimal integer or a hyperlink; the product of parameter v1 and parameter v2 is returned; and the hyperlink indicating procedure execution component 29-2 is http://host1/htbin/times. This output will be referred to as hypertext 31. Communication component 21 sends back hypertext 31 as a reply to message 31.

When hypertext 31 is received, communication component 11 sends hypertext 31 to hypertext analysis component 12. Based on hypertext 31, hypertext analysis component 12 requests hypertext display component 13 to show the user information indicating that: there are two parameters v1, v2; each parameter is a decimal integer or a hyperlink; the product of parameter v1 and parameter v2 is returned; and the hyperlink indicating procedure execution component 29-2 is http://host1/htbin/times. Hypertext display component 13 displays this procedure specification information to the user.

The user specifies an assignment of 2 to parameter v1 and an assignment of 3 to parameter v2 via user input component 14. Message generation component 15 stores the 2 assigned to parameter v1 and the 3 assigned to parameter v2 in the assignment list.

A message generation request is issued by the user via user input component 14. Message generation component 15 generates the message "http://host1/times?v1=2&v2=3" based on the assignment list and the message generation data "http://host1/htbin/times". This message will be referred to as hyperlink 31.

Message generation component 15 sends hyperlink 31 to message holding component 16. Message holding component 16 holds hyperlink 31 as the first message.

In order to obtain the specifications for the adding, the user enters the string http://host1/plus via user input component 14 and issues a message generation request. This string will be referred to as string 32.

Message generation component 15 generates a message using string 32 as the message generation data. A message is generated for the communication component represented by http://host1/ for the procedure specification holding component or the remote procedure holding component corresponding to the name attribute "plus". This message is sent to communication component 11. Communication component 11 retrieves the communication component corresponding to the string http://host1/, i.e., communication component 21. Communication component 11 sends the message "GET /plus" to communication component 21. This message will be referred to as message 33.

When message 33 is received, communication component 21 sends the message to message analysis component 22. When message 33 is received, message analysis component 22 requests remote procedure retrieval component 23 to retrieve the remote procedure holding component or the procedure specifications holding component having the name attribute "plus". Remote procedure retrieval component 23 performs the retrieval, returning remote specification holding component 41-1. Message analysis component 22 sends a message requesting specification disclosure to remote specification holding component 41-1. This message will be referred to as message 34.

When message 4 is received, remote specification holding component 41-1 requests specification disclosure from procedure specification disclosure component 43-1. In response, procedure specification disclosure component 43-1 outputs hypertext as shown in FIG. 12(C) containing information indicating that: there are two parameters v1, v2; each parameter is a decimal integer or a hyperlink; the sum of parameter v1 and parameter v2 is returned; and the hyperlink indicating procedure execution component 29-1 is http://host1/htbin/plus. This output will be referred to as hypertext 32. Communication component 21 sends back hypertext 32 to communication component 11 as a reply to message 33.

When hypertext 32 is received, communication component 11 sends hypertext 32 to hypertext analysis component 12. Based on hypertext 32, hypertext analysis component 12 requests hypertext display component 13 to show the user information indicating that: there are two parameters v1, v2; each parameter is a decimal integer or a hyperlink; the sum of parameter v1 and parameter v2 is returned; and the hyperlink indicating procedure execution component 29-2 is http://host1/htbin/plus. Hypertext display component 13 displays this procedure specification information to the user.

The user specifies an assignment of 1 to parameter v1 via user input component 14. Message generation component 15 stores the 1 assigned to parameter v1 in the assignment list. The user also specifies parameter v2 via user input component 14 and requests retrieval of the first message held in message holding component 16. This instruction is received from user input component 14 by message generation component 15, and message generation component 15 requests message holding component 16 to send the first message to message holding component 16. Message holding component 16 searches the message list and outputs the message "http://host1/htbin/times?v1=2&v2=3" linked to number 1. Message generation component 15 converts the message sent from message holding component 16 and assigns parameter v2 with "http%3A%2F%2Fhost1%2Fhtbin%2Ftimes%3Fv1%3D2%26v2%3D3".

FIG. 14 is a drawing for the purpose of describing a sample display from user input component 14 in the third embodiment of the device for processing remote procedures according to the present invention. In FIG. 14, the specifications for performing addition are extracted, parameter v1 is assigned 1 and parameter v2 is assigned the message with the number 1 held in message holding component 16. In this manner, the user is able to obtain desired specifications, and can set parameters according to these specifications. Also, when setting parameters, it is also possible to set parameters according to the specifications from other remote procedures. Procedures involving combinations of multiple remote procedures can also be specified.

The user issues a message generation request via user input component 14. Message generation component 15 generates the message "http://host1/htbin/plus?v1=1&v2=http%3A%2F%2Fhost1%2Fhtbin%2Ftimes%3Fv1%3D2%26v2%3D3". This message will be referred to as message 35. Message generation component 15 sends message 35 to message holding component 16 and communication component 11 as well. Message holding component 16 holds message 35 as the second message.

Communication component 11 searches for the communication component corresponding to the string "http://host1/" in message 35, retrieving communication component 21. Communication component 11 sends the message "GET /htbin/plus?v1=1&v2=http%3A%2F%2Fhost1%2Fhtbin%2Ftimes%3Fv1%

3D2%26v2%3D3" to communication component 21. This message will be referred to as message 34.

When message 34 is received, communication component 21 sends message 34 to message analysis component 22. Message analysis component 22 requests remote procedure retrieval component 23 to retrieve the remote procedure holding component or the procedure specification holding component having a "name" attribute of htbin/plus". Remote procedure retrieval component 23 performs the retrieval and returns remote procedure holding component 24-1. Message analysis component 22 sends the parameter list "v1=1&v2=http%3A% 2F%2Fhost1%2Fhtbin% 2Ftimes%3Fv1%3D2%26v2%3D3" to remote procedure holding component 24-1, and requests execution of the procedure.

Remote procedure holding component 24-1 sends this parameter list to procedure execution component 29-1. From the received parameter list, procedure execution component 29-1 obtains the assignment of "1" of parameter v1 and the assignment of "http://host1/htbin/times?v1=2&v2=3" to parameter v2. Since the assignment to parameter v1 is the string "1", this is converted to an integer, and the second assignment to the integer 1 is obtained. Since parameter v2 is assigned the string "http://host1/htbin/times?v1=2&v2=3", which represents a hyperlink, this string is sent to message generation component 27-1. This string will be referred to as message 36.

Message generation component 3-1 sends message 36 to communication component 21. Communication component 21 searches for the communication component to the string http://host1/ from message 36 and retrieves communication component 21. Communication component 21 sends communication component 21 the message "GET/htbin/times?v1=2&v2=3". This message will be referred to as message 37.

When message 37 is received, communication component 21 sends message 37 to message analysis component 22. When message 37 is received, message analysis component 22 requests remote procedure retrieval component 23 to retrieve the remote procedures holding component or the remote specifications holding component having a "name" attribute of "htbin/times". Remote procedure retrieval component 23 performs a retrieval and returns remote procedure holding component 24-2. Message analysis component 22 sends the parameter list "v1=2&v2=3" to remote procedure holding component 24-2, and requests execution of the procedure.

Remote procedure holding component 24-2 sends the received parameter list to procedure execution component 29-2. From the parameter list, procedure execution component 29-2 obtains an assignment of "2" of parameter v1 and an assignment of "3" to parameter v2. Since the assignment to parameter v1 is the string "2", this is converted to an integer and the second assignment to the integer 2 is obtained. Since parameter v2 is assigned the string "3", this is converted to an integer and the second assignment to the integer 3 is obtained. Then, the produce of parameter v1 and parameter v2, 6, is obtained, and 6 is sent to hypertext generation component 30-2.

Hypertext generation component 30-2 generates hypertext 33, as shown in FIG. 13(A). Hypertext 33 is sent to hypertext analysis component 28-1 of remote procedure holding component 24-1 via communication component 21.

Hypertext analysis component 28-1 analyzes hypertext 33. The result string "6" is extracted and sent to procedure execution component 29-1. Procedure execution component 29-1 obtains the integer 6 as the assignment to parameter v2.

Then, the sum of the assignments to parameter v1 and parameter v2, 7, is obtained, and 7 is sent to hypertext generation component 30-1.

Hypertext generation component 30-1 generates hypertext 34 as shown in FIG. 13(B). The hypertext is sent to communication component 11 via communication component 21.

Communication component 11 sends hypertext 34 to hypertext analysis component 12. Hypertext analysis component 12 analyzes hypertext 34 and requests hypertext display component 13 to provide a display.

In the embodiment described above, addition, multiplication, and exponents are used as examples for the remote procedures. However, the remote procedures are of course not restricted to these examples, and different procedures can be operated in a similar manner.

As the description above makes clear, the present invention allows a user using a remote procedure client application to easily obtain desired services by combining multiple remote procedure servers. Also, when remote procedure calls are combined to provide a service, the user using a client application can know the parameters and the execution results of each remote procedure. Furthermore, the present invention allows the user to easily obtain the specifications for each remote procedure. The user can then easily construct a remote procedure call based on the specifications, thus providing many advantages such as improvements in the usefulness of the remote procedures.

Figure 15:
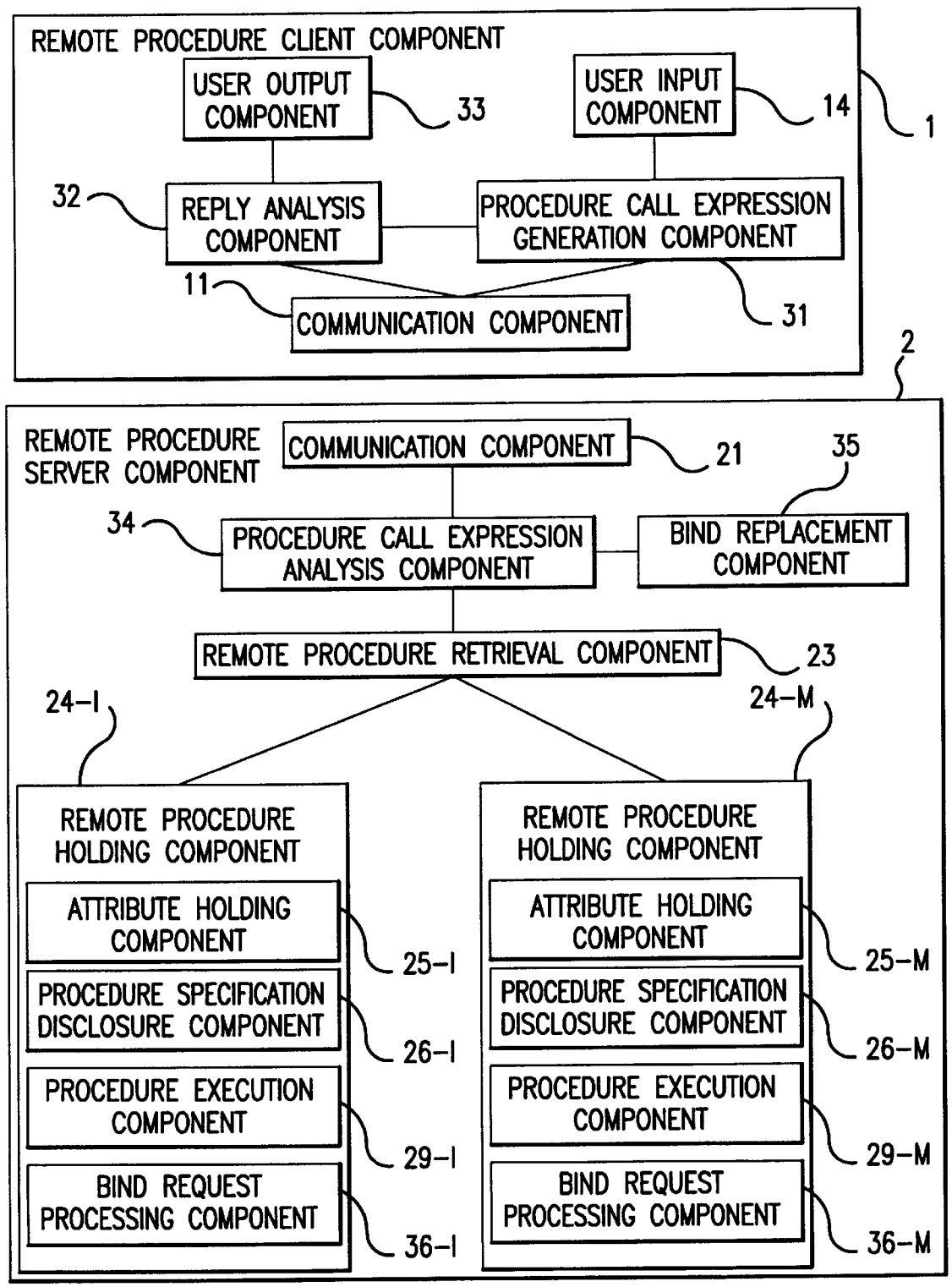
FIG. 15 shows a block diagram of the fourth embodiment of the remote procedure processing device.

FIG. 15 shows a block diagram of the fourth embodiment of the remote procedure processing device of the present invention. This fourth embodiment shows an example of a method where variables which are not bound are bound as necessary at the time of procedure execution in the procedure call expression.

The remote procedure processing device comprises the remote procedure client component 1 and the remote procedure server component 2. In general, the remote procedure processing device may have one or more remote procedure client components 1 and may have one or more remote procedure servers 2.

The remote procedure client component 1 comprises a communication component 11, a user input component 14, a procedure call expression generation component 31, a reply analysis component 32, and a user output component 33. The communication component 11 transmits the procedure call expression which is input from the procedure call expression generation component 31 to the remote communication component, and it receives the reply from the communication component of the transmission destination, and outputs the reply which is received to the reply analysis component 32. The user input component 14 may comprise the keyboard, the pointing device and other computer input devices, and initiation of the procedure call expression generation request to the procedure call expression generation component 31 by means of input from the user. The procedure call expression generation component 31, according to the request from the user input component 14, generates the procedure call expression which is then output to the communication component 11. The reply analysis component 32 analyzes the reply which is input from the communication component 11, and it gives a request to the user output component 33 to display the reply to the user, and also it puts out to the procedure call expression generation component 31 the procedure call expression generation information which is the information for generating the procedure call expression. The user output component 33 displays the execution result, for example, letters, picture image as well as sound information to the user according to the request from the reply analysis component 32.

The remote procedure server component 2 comprises communication component 21, procedure call expression analysis component 34, bind replacement component 35, remote procedure retrieval component 23, and M number of the remote procedure holding components 24-1 through 24-M. The communication component 21 receives the procedure call expression, and puts it out to the procedure call expression analysis component 34 and also transmits the execution result of the procedure. The procedure call expression analysis 34 analyzes the procedure call expression which is input from the communication component 21. In this embodiment, there are 3 types of procedure call expressions. Specifically, these are the call expressions the semi-calling expression, and the bind replacement expression. The bind replacement component 35 inputs the bind replacement expression from the procedure call expression analysis component 34, and it puts out the results of performing the bind replacement as the procedure call expression to the procedure call expression analysis component 34. The remote procedure retrieval component 24 inputs the retrieval expression from the procedure call expression analysis component 34, and it retrieves the matching remote procedure holding component to the retrieval expression from the remote procedure holding components 24-1 through 24-M which belongs to the remote procedure server component 2.

The remote procedure holding components 24-1 through 24-M comprise the attribute holding components 25-1 through 25-M, the procedure specification disclosure components 26-1 through 26-M, the procedure execution components 29-1 through 29-M, and the bind request processing components 36-1 through 36-M. In the attribute holding components 25-1 through 25-M, the attribute indicating the identifier in order to identify the remote procedure holding components 24-1 through 24-M is maintained uniformly as a pair list of an attribute name and an attribute value. In general, the attribute holding components 25-1 through 25-M may be maintained as a pair of arbitrary numbers of an attribute and an attribute value, and it may be maintained as an attribute which is able to identify uniformly the remote procedure holding component by way of designating at least one attribute.

Maintained in the procedure specification disclosure components 26-1 through 26-M are: the description by way of the formal language regarding the procedure argument, the description by way of the natural language regarding the procedure argument, the description by way of the formal language regarding reply which is returned from the procedure, the description by way of the natural language regarding reply which is returned from the procedure, the description by way of the formal language regarding the procedure operation, the description by way of the natural language regarding the procedure operation, the procedure call expression generation information in order to generate the procedure call expression, and the default value of the argument. In general, an arbitrary subset having at least one element from among these may be maintained in the procedure specification disclosure components 26-1 through 26-M.

The procedure execution components 29-1 through 29-M execute the procedure according to the assignment which is input by means of the procedure call expression analysis component 34. In the case where the procedure execution request is necessary for another remote procedure holding component in the procedure execution process, the call request is performed through the procedure call expression analysis component 34. The procedure execution components 29-1 through 29-M return the reply as the procedure execution result when the procedure is completed.

The bind request processing components 36-1 through 36-M input, from the procedure execution components 29-1 through 29-M, the reply of the bind request that is returned, generating the second bind request reply in the case where the bind request is returned as the reply which requests the procedure execution to another remote procedure holding component by the procedure execution component 29-1 through 29-M.

For example, in the fourth embodiment, the procedure call expression generation information indicated by the S expression which is the formal language, indicating by the code "bind" of the first element of the S expression that it is the procedure specification which promotes the argument assignment and indicates the necessary argument assignment and such default value by the list of the second element of the S expression, as well as indicating and it indicates the retrieval expression by the third element of the S expression. For example, (bind (v1 v2=(times v1=2 v2=undef))plus) is the reply indicating the procedure specification, the arguments which need assignment are v1 and v2, the argument v1 has no default value, and the default value of v2 is (times v1=2 v2=2 v2=undef), and plus indicates the retrieval expression.

In addition, the attribute "name" is considered to be maintained in the attribute holding components 25-1 through 25-M. Further, all of the procedure execution components 29-1 through 29-M are considered to have the arguments which are named v1, v2, and v3 and so forth for convenience. In general, the procedure execution components 29-1 through 29-M may have arguments with arbitrary names. The remote procedure holding component(s) having an attribute holding component such as the attribute value of the attribute "name" that is "fname," has arguments v1, v2, etc., and this is indicated by the procedure call expression (fname v1=a1 v2=a2 etc.) when the value a1 is assigned to the argument v1 and the value a2 is assigned to the argument v2 etc. Further, when assignments for arguments v3 and v4 do not exist, then this is indicated by v3=undef, v4=undef, etc.

Figure 16:
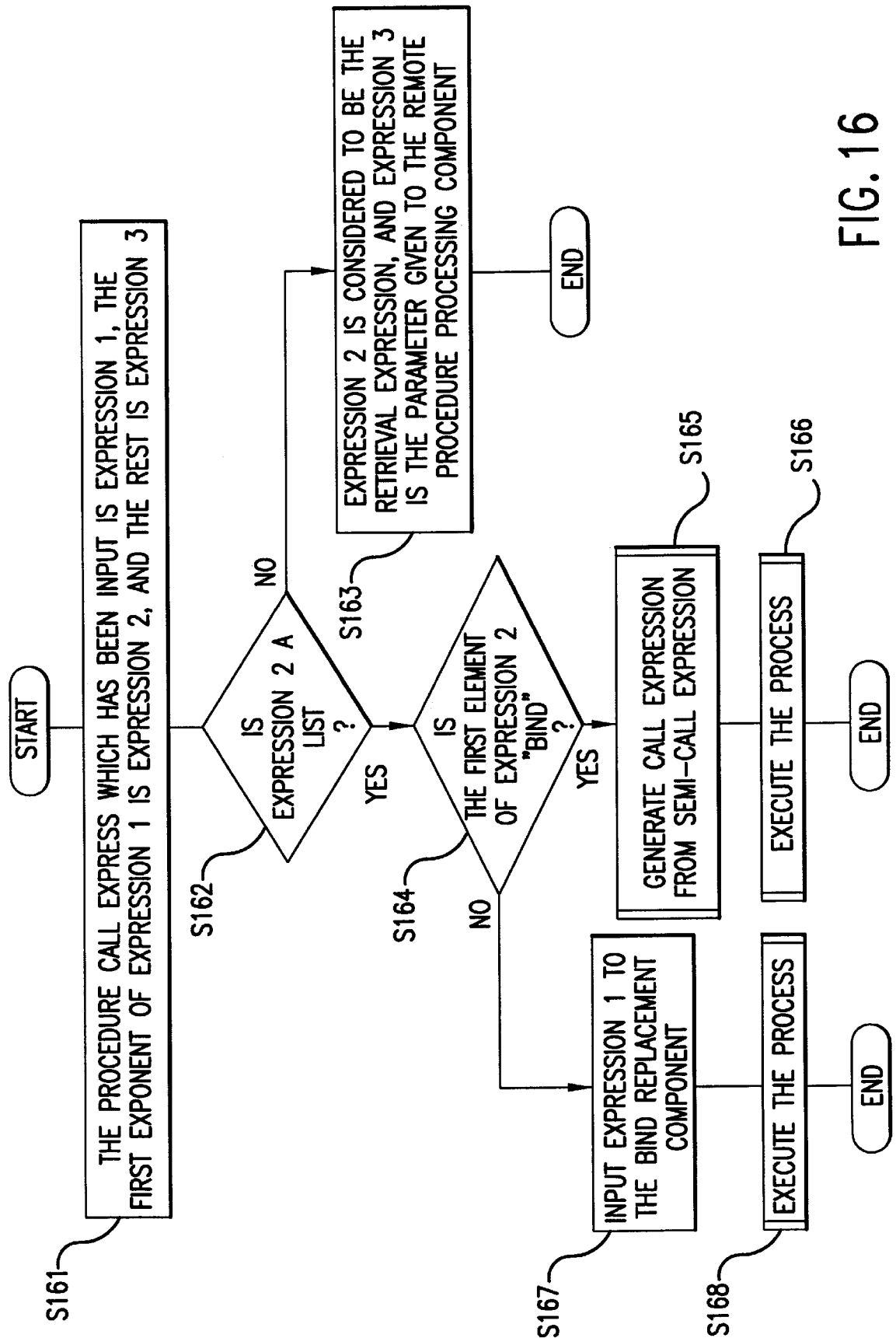
FIG. 16 is a flowchart showing one example of the operation of the procedure call expression analysis component which occurs in the fourth embodiment of the remote procedure processing device.

An explanation of examples of the operation of each component follows. FIG. 16 is a flowchart showing one example of the operation of the procedure call expression analysis component 34 which occurs in the fourth embodiment of the remote procedure processing device. Here, the a1 of the S expression (a1 . . . ai . . . an) is called the first element and ai is called the i element.

At S161, the procedure call expression which is input is regarded as expression 1. Further, the No. 1 element of expression 1 is regarded as expression 2, and the remaining expressions other than No. 1 element of expression 1 is regarded as expression 3. At S162, it is determined whether expression 2 is a list. In such case, where expression 2 is not a list, then at S163 expression 2 is regarded as the retrieval expression given to the remote procedure retrieval component 23, and the expression 3 is regarded as the parameter given to the remote procedure holding component that is retrieved, and the process is complete. In the case where expression 2 is a list, at S164, it is determined whether the first element of expression 2 is a "bind," and in the case where the first element of expression 2 is a "bind", then the process which the argument v2 etc. Further, when assignments for arguments v3 and v4 do not exist, then this is indicated by v3=undef, v4=undef, etc.

An explanation of examples of the operation of each component follows: FIG. 16 is a flowchart showing one example of the operation of the procedure call expression analysis component 34 which occurs in the fourth embodiment of the remote procedure processing device. Here, the a1 of the S expression (a1 .... ai ...an) is called the first element and ai is called the i element.

At S161, the procedure call expression which is input is regarded as expression 1. Further, the No. 1 element of expression 1 is regarded as expression 2, and the remaining expressions other than the No. 1 element of expression is regarded as expression 3. At S162, it is determined whether expression 2 is a list. In such case where expression 2 is not a list, then at S163 expression 2 is regarded as the retrieval expression given to the remote procedure retrieval component 23, and the expression 3 is regarded as the parameter given to the remote procedure holding component that is retrieved, and the process is complete. In the case where expression 2 is a list, at S164, it is determined whether the first element of expression 2 is a "bind," and in the case where the first element of expression 2 is a "bind," then the process which generates the call expression from the semi-call expression which is to be described hereafter, will be executed. This process is executed as the input for re-processing such result. In the event that this is not the case, expression 1 is input into the bind replacement component 35, thereby executing this process as the input for re-processing such result.

Figure 17:
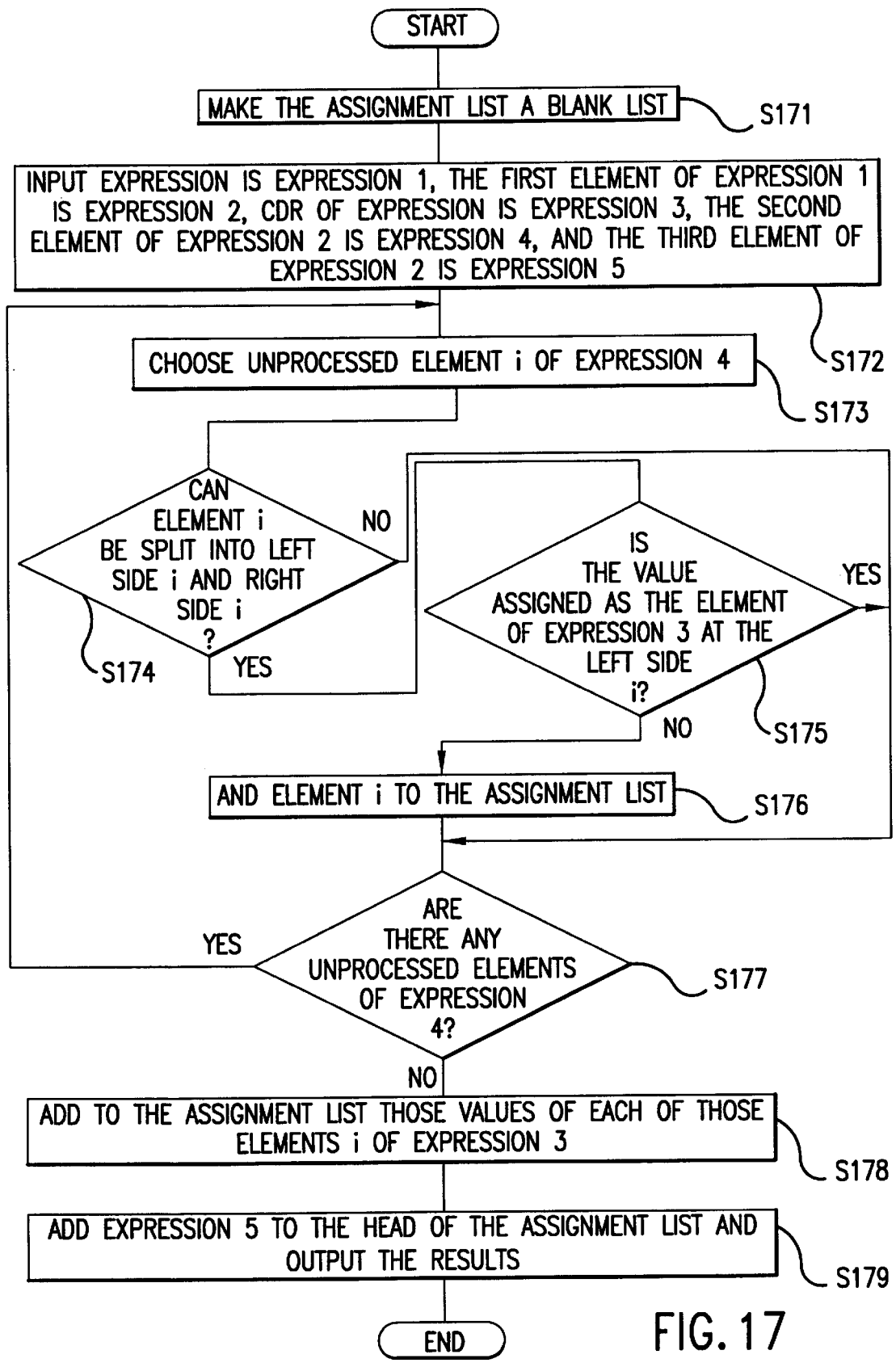
FIG. 17 is a flow chart showing one example of the process for creating the call expression from the semi-call expression which is executed by one example of the operation of the procedure call expression analysis component which occurs in the fourth embodiment of the remote procedure processing device.

FIG. 17 is a flow chart showing an example of the process for creating the call expression from the semi-call expression which is executed by one example of the operation of the procedure call expression analysis component 34 which occurs in the fourth embodiment of the remote procedure processing device. Here, the semi-call expression is the expression in which the first part of the first element is "bind," for example, an expression such ((bind (v1=1 v2) plus) v1=v2=20). The call expression is regarded as the expression indicating that the first element is assigned to the retrieval expression and the second element subsequent is assigned to the argument. This process is a process which gets a call expression, for example (plus v1=1 v2=20), from this type of semi-call expression. Moreover, the (a2 ... an) of (a1 a2 ... an) of the S expression is called cdr.

At S171, the assignment list is regarded as a blank list. At S172, the input expression is regarded as expression 1; and the first element of expression 1 is regarded as expression 2, and the cdr of expression 1 is regarded as expression 3, and the second element of expression 2 is regarded as expression 4, and the third element of expression 2 is regarded as expression 5.

At S173, the unprocessed element i of expression 4 is selected. At S174, the selected element i is split into "=" left side i which is the left side and the right side i which is the right side. In the case where a split is not possible, it proceeds to S177 to process the following element. In the event that splitting is possible, at S175, it is determined whether the value can be assigned into a split left side i as an element of expression 3. If it can be assigned, it proceeds to S177 so that processing can be performed on the following element. If it is unable to be assigned at S176, element i is added to the assignment list. At S177, it is determined whether the unprocessed element of expression 4 remains, and if it remains, then it turns to S173 to process that element.

At S178, in regards to each of the element i of the expression 3, the values that are assigned are added to the assignment list. Furthermore, at S179, expression 5 is added to the head of-the assignment list and the results are output. Through this process, the semi-call expression such as ((bind (v1=1 v2) plus) v1=v2=20) is converted to the call expression such as (plus v1=1 v2=20).

Figure 18:
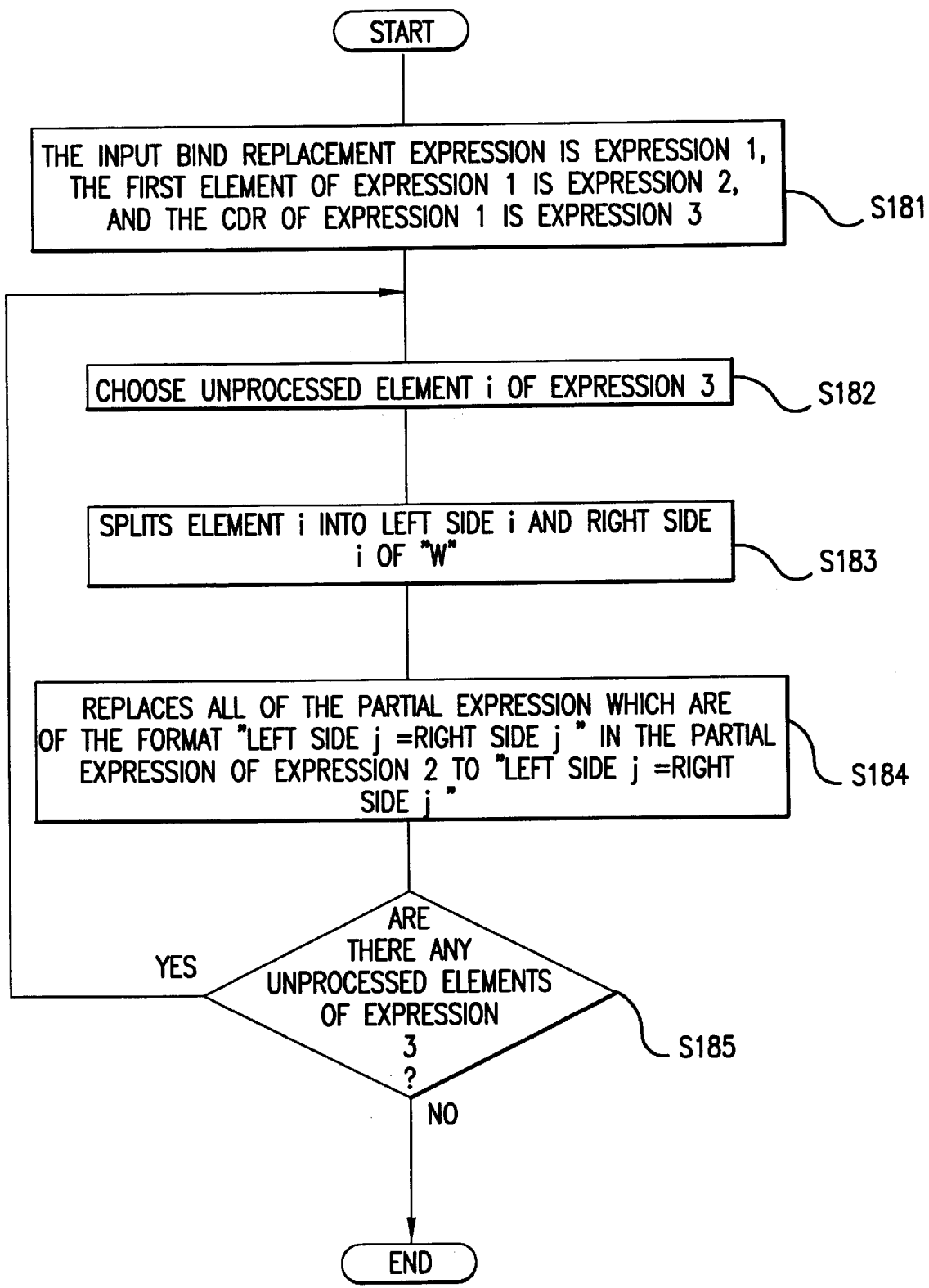
FIG. 18 is a flow chart showing one example of the operation of the bind replacement component which occurs in the fourth embodiment of the remote procedure processing device.

FIG. 18 is a flow chart showing one example of the operation of the bind replacement component 35 which occurs in the fourth embodiment of the remote procedure processing device. In the case where the bind replacement expression is given at the time of calling the procedure, the bind replacement component 35 derives the procedure call expression from the bind replacement expression according to the following process. Furthermore, the bind replacement expression is the procedure call expression when the first element is the list.

At S181, the bind replacement expression which is input is regarded as expression 1, and the first element of the expression 1 is regarded as expression 2, and the cdr of expression 1 is regarded as expression 3. At S182, the unprocessed element i of expression 3 is selected, and at S1183, that element i is split into a left side i which is the left side of the "=", and a right side i which is the right side of the "=". Further, at S184, all the partial expressions having the format of "left side j=left side i" from among the partial expressions of expression 2, are replaced with "left side j=right side i". At S185, in the case where the unprocessed element of expression 3 remains, it proceeds to S182 in order to process that element. Following processing all the elements of expression 3, the bind replacement process is complete.

Figure 19A:
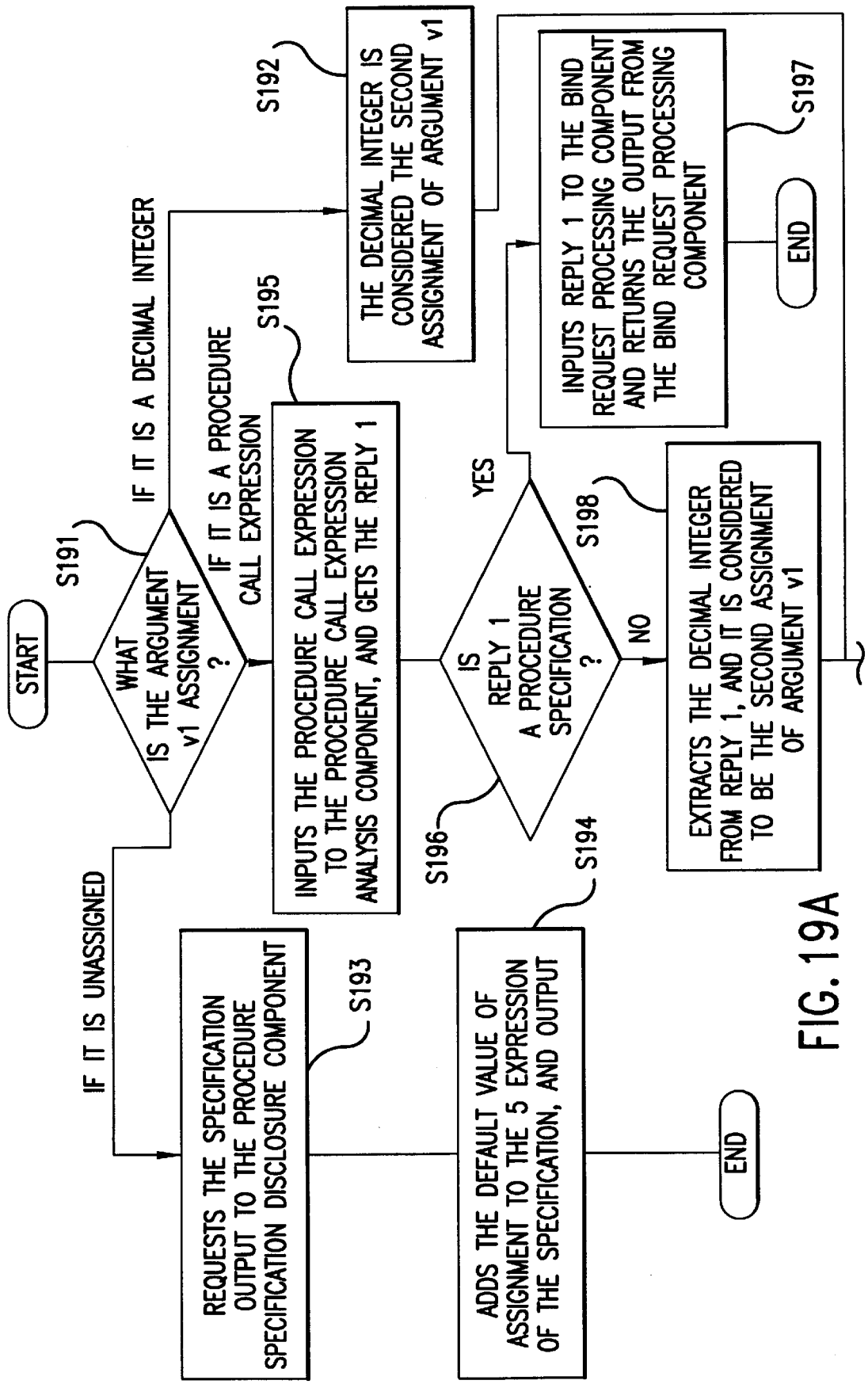
FIG. 19(A) and FIG. 19(B) is a flow chart showing one example of the operation of the procedure execution component which occurs in the fourth embodiment of the remote procedure processing device.
Figure 19B:
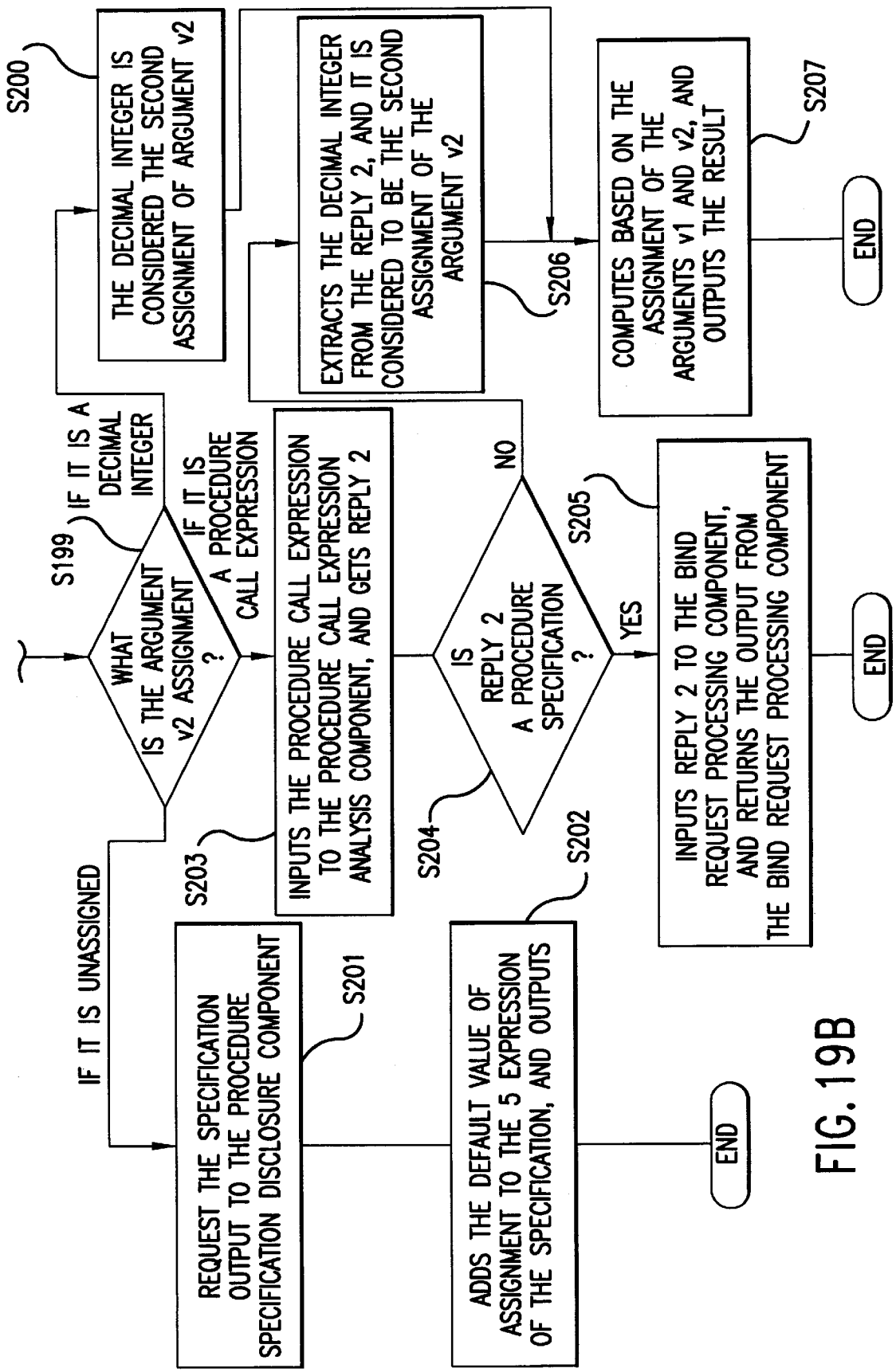

FIG. 19 is a flow chart showing one example of the operation of the procedure execution component 29-1 through 29-M which occurs in the fourth embodiment of the remote processing device. Here, procedure execution component 29-1 and 2 will be explained. Moreover, the operations of the remote procedure holding component 25-1 and the remote procedure holding component 25-2 will be described in one combined flowchart since they are nearly the same except for the variance in the computations of the remote procedure.

The attribute holding component 25-1 of the remote procedure holding component 24-1 maintains the attributes so that the value of the attribute "name" is "plus," and the procedure specification disclosure component 26-1 is that which maintains the S expression (bind (v1 v2) plus). Further, the procedure execution component 29-1 is the calculated sum of two arguments v1 and v2. The attribute holding component 26-2 of the remote procedure holding component 25-2 maintains the attribute so that the value of the attribute "name" is "times," and the procedure specification disclosure component 27-2 is that which maintains the S expression (bind (v1 v2) times). Further, the procedure execution component 28-2 is the calculated product of two arguments v1 and v2.

At S191, the assignment of the argument v1 is examined and if it is a character string indicating a decimal integer, then at S192, that character string indicating a decimal integer is converted into an integer and the converted value is regarded as the second assignment of the argument v1, and it proceeds to S199. If argument v1 is not assigned, at S191 then at S193, a request is made to output the specification to the procedure specification disclosure component(s) 26-1 and 2. At S1194, the default value of the assignment is added to the S expression of the output specification, and after outputting, the process is complete. The output specification may also be returned as it is as a reply to the call source of the corresponding procedure through the communication component, or it may also be routed once through the bind request processing component.

If the assignment of the argument v1 is a procedure call expression, then at S195, the procedure call expression is entered into the procedure call expression analysis component 34, and a reply is gotten. This reply is regarded as reply 1. At S196, it is determined whether the reply 1 is the procedure specification (bind request). If the reply 1 is the procedure specification, then at S197, the reply 1 is entered into the bind request processing component 36-1 and 2, and after the output from the bind request processing component 36-1 and 2, then the process is complete. If the reply 1 is not the procedure specification, then at S198, the character string indicating the decimal integer is extracted, and that character string is converted into an integer and the converted value is regarded as the second assignment of the argument v1.

At S199, the assignment of argument v2 is examined and if it is a character string indicating a decimal integer, then, at S200, that character string indicating a decimal integer is converted into an integer and the converted value is regarded as the second assignment of the argument v2, and it proceeds to S207. If argument v2 is not assigned, then, at S201, a request is made to output the specification to the procedure specification disclosure component(s) 26-1 and 2. At S202, the default value of the assignment is added to the S expression of the output specification, and after outputting, the process is complete.

If the assignment of the argument v2 is a procedure call expression, then at S203, the procedure call expression is entered into the procedure call expression analysis component 34, and a reply is generated. This reply is regarded as reply 2. At S204, it is determined whether the reply 2 is the procedure specification. If the reply 2 is the procedure specification, then at S205, the reply 2 is entered into the bind request processing component 36-1 and 2, and after the output from the bind request processing component 36-1 and 2, the process is complete. If the reply 2 is not the procedure specification, then at S206, the character string indicating the decimal integer is extracted, and that character string is converted into an integer and the converted value is regarded as the second assignment of the argument v1.

At S207, computation is performed based on the assignments of argument v1 and argument v2, then output. The results which add the assignments of argument v1 and the argument v2 are output at the procedure execution component 29-1. The product of the assignments of argument v1 and argument v2 are calculated at the procedure execution component 28-2 and the results are output.

Figure 20:
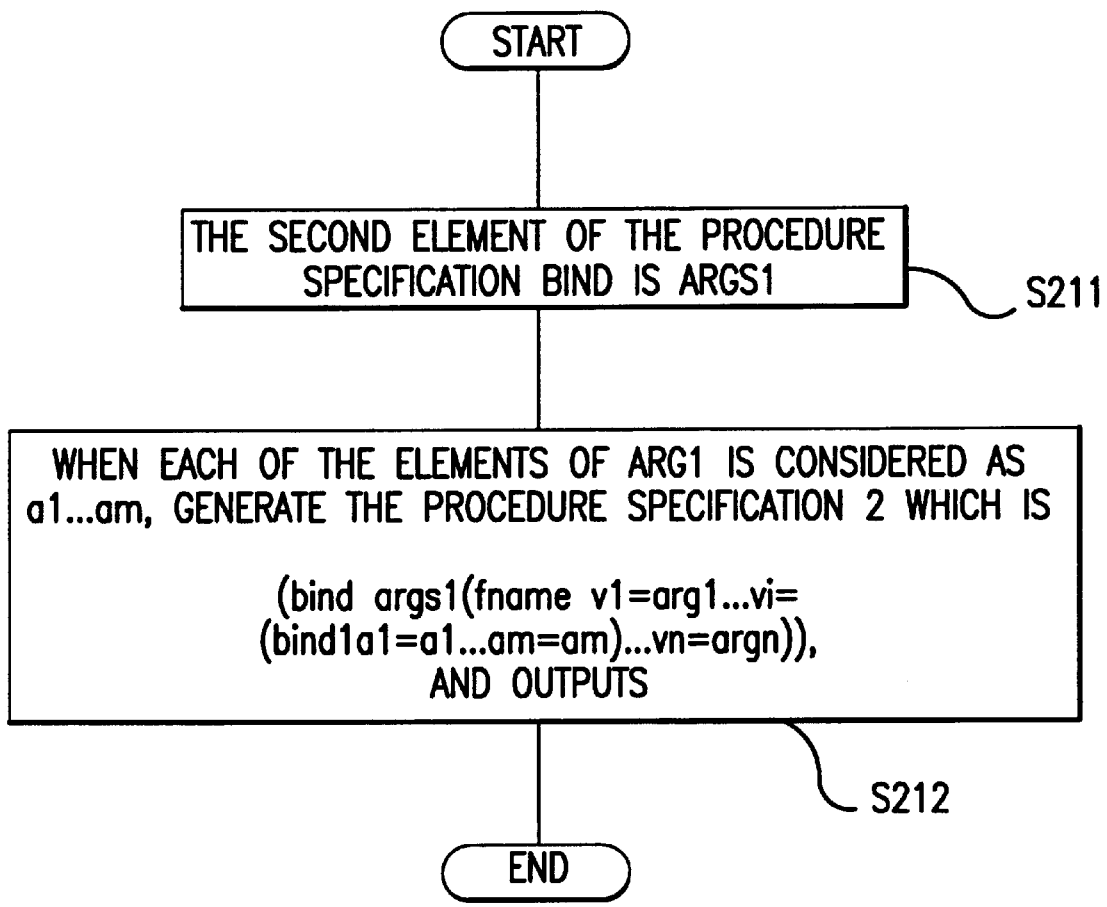
FIG. 20 is a flow chart showing one example of the operation of the bind request processing component which occurs in the fourth embodiment of the remote procedure processing device.

FIG. 20 is a flow chart showing one example of the operation of the bind request processing component 36-1 through 36-M which occurs in the fourth embodiment of the remote procedure processing device. At the bind request processing component 36-1 through 36-M, in the case where the first procedure specification bind 1 is returned as the evaluation result of the argument, the second procedure specification is synthesized. Here, the procedure execution component of the remote procedure holding component having an attribute holding component where the value of the attribute "name" is "fname," gives arg1, . . . , argn as the assignment of the argument v1, . . . , vn, then the procedure specification bind 1 will be regarded as returned by the process which evaluates the argument vi.

At S2 11, the first procedure specification bind 1 is analyzed, and second element of the procedure specification bind 1 is extracted, and this is regarded as args1.

At S212, when each of the elements of args1 are regarded as a1, . . . , am, then the procedure specification 2 consisting of (bind args1 (fname v1=arg1 . . . vi=(bind1 a1=a1 . . . am=am) . . . vn=argn) is created, and this procedure specification 2 is output.

In this way, the second procedure specification indicates which assignment to the argument is inappropriate. When evaluating a particular argument, there are times when a separate remote procedure is called. The second procedure specification is arranged so as to discern when an inappropriate argument assignment is made during execution of a remote procedure to the calling destination.

An explanation of the operation is provided based on an example. A procedure call is performed by the user indicated by the procedure call expression (plus v1=undef v2=(times v1=2 v2=undef)). This procedure call expression makes the argument v1 of the procedure 'plus' to be unassigned, and indicates that the argument v1 of the procedure 'times' has been assigned to 2, and the result of calling the argument v2 of the procedure 'times' in an unassigned state is assigned to the argument v2 of the procedure 'plus.'

The user inputs the designation of the procedure call expression by using, in accordance with the user input component 14, input devices such as the key entry device and the pointing device, and further, the user inputs that the procedure call expression is expression 1. The procedure call expression generation component 31 inputs expression 1 into the communication component 11 based on the entry of the user. The communication component 11 inputs the expression 1 into the communication component 21.

The communication component 21 inputs the expression 1 into the procedure call expression analysis component 34. The procedure call expression analysis component 34 operates according to the flowchart shown in FIG. 16. First, it analyzes expression 1, then it determines whether expression 1 is the call expression. Further, it makes a request to the remote procedure retrieval component 23 to retrieve the remote procedure holding component which has the attribute holding component where the value of the attribute "name" is "plus." The remote procedure retrieval component 23 retrieves the remote procedure server component 2 and returns the remote procedure holding component 24-1. The remote call expression analysis component 34, based on expression 1, inputs the argument assignment v1=undef, v2=(times v1=2 v2=undef) into the procedure execution component 29-1 which is related to the remote procedure holding component 24-1 that is retrieved, and makes a request to execute the procedure.

The procedure execution component 29-1 executes according to the flowchart shown in FIG. 5. The argument v1 is examined at the procedure execution component 29-1, and since the argument v1 is unassigned, a request is made to disclose the specification to the procedure specification disclosure component 26-1. The procedure specification disclosure component 26-1 generates the reply which includes the procedure specification (bind (v1 v2) plus) which is described by the formal language S expression. This procedure specification is regarded as the procedure specification 1-1. The procedure execution component 29-1 gets (bind (v1 v2=(times v1=2 v2=undef)) plus) by adding the assignment of the argument v2 as the default value to the procedure specification 1-1 at S194 of the flow chart shown in FIG. 19. This procedure specification is regarded as the procedure specification 1-2. The procedure execution component 29-1 outputs the procedure specification 1-2 to the communication component 21. The communication component 21 sends the procedure specification 1-2 to the communication component 11.

The communication component 11 inputs the procedure specification 1-2 into the reply analysis component 32. The reply analysis component 32 analyzes the procedure specification 1-2 and determines that the arguments necessary for assignment to the user output component 33 are v1 and v2, and then makes a request to indicate that the default value of the argument v2 is (times v1=2 v2=undef) while inputting the procedure call expression generation information (bind (v1 v2=(times v1=2 v2=undef) plus) into the procedure call expression generation component 31. This procedure call expression generation information is regarded as the procedure call expression generation information 1.

The user receiving the display instructs that the first argument v1 is assigned to the user input component 14, and the argument v2 performs the inputting to assign the default value. In addition, an instruction is given to the procedure call expression generation component 31 to generate the procedure call expression. The procedure call expression generation component 13 outputs the procedure call expression (plus v1=1 v2=(times v1=2 v2=undef)) to the communication component 11 based on the input from the user input component 14 and the procedure call expression generation information 1. This procedure cell expression is regarded as expression 2. The communication component 11 sends expression 2 to the communication component 21.

The communication component 21 inputs the expression 2 into the procedure call expression analysis component 34. The procedure call expression analysis component 34 analyzes expression 1, then it determines whether expression 1 is the call expression. Further, it makes a request to the remote procedure retrieval component 23 to retrieval the remote procedure holding component which has the attribute holding component where the value of the attribute "name" is "plus." The remote procedure retrieval component 23 retrieves the remote procedure server component 2 and returns the remote procedure holding component 24-1. The remote call expression analysis component 34, based on expression 2, inputs the argument assignment v1=1, v2= (times v1=2 v2=undef) into the procedure execution component 29-1 which is related to the remote procedure holding component 24-1 that is retrieved, and makes a request to execute the procedure.

The procedure execution component 29-1, according to the flowchart shown in FIG. 19, gets the integer 1 as the assignment of the argument v1. In addition, the argument v2 assignment "(times v1=2 v2=undef)" is input into the procedure call expression analysis component 34. This procedure call expression is regarded as expression 4.

The procedure call expression analysis component 34 analyzes expression 4 and makes a request to retrieval the remote procedure holding component which has the attribute holding component where the value of the attribute "name" is "times" for the remote procedure retrieval component 23. The remote procedure retrieval component 23 returns the remote procedure holding component 24-2 by performing the retrieval. The procedure call expression analysis component 34, based on expression 4, inputs the argument v1=2 and the argument v2=undef into the procedure execution component 29-2 of the remote procedure holding component 24-2 which was retrieved.

The procedure execution component 29-2 executes according to the flowchart shown in FIG. 19 and gets the integer 2 as the assignment for the argument v1. Since the argument v2 is unassigned, a request is made to disclose the specification to the procedure specification disclosure component 26-2. The procedure specification disclosure component 26-2 generates the reply which includes the procedure specification (bind (v1 v2) times) which is described by the formal language S expression. This procedure specification is regarded as the procedure specification 2-1. This procedure execution component 29-2 gets (bind (v1=2 v2) times) by adding the assignment of the argument v1 as the default value to the procedure specification 2-1. This procedure specification is regarded as the procedure specification 2-2. The procedure execution component 29-2 outputs the procedure specification 2-2 to the procedure execution component 29-1.

The procedure execution component 29-1, according to the flow chart shown in FIG. 19, inputs the procedure specification 2-2 into the bind request processing component 36-2 because the reply from the procedure execution component 29-2 is the procedure specification. The bind request processing component 36-1, according to the flow chart shown in FIG. 20, outputs to the procedure execution component 29-1 by conversion to the procedure specification (bind (v1=2 v2) (plus v1=1 v2=((bind (v1=2 v2) times) v1=v1 v2=v2))). This converted procedure specification is regarded as the procedure specification 2-3. The procedure execution component 29-1 outputs the procedure specification 2-3 to the communication component 21. The communication component 21 sends the procedure specification 2-3 to the communication component 11.

The communication component 11 outputs the procedure specification 2-3 into the reply analysis component 32. The reply analysis component 32 performs analysis when inputting the procedure specification 1-2 and determines that the arguments necessary for assignment to the user output component 33 are v1 and v2, and then makes a request to display that the default value of the argument v2 is 2 while inputting the procedure call expression generation information (bind (v1=2 v2) (plus v1=1 v2=((bind (v1=2 v2) times) v1=v1 v2=v2))) into the procedure call expression generation component 31. This procedure call expression generation information is regarded as the procedure call expression generation information 2.

The user receiving the display performs the inputting to assign 20 to argument v1 and 3 to v2 for the user input component 14. The procedure call expression generation component 31 outputs the procedure call expression ((plus v1=1 v2=((bind (v1=2 v2) times) v1=v1 v2=v2)) v1=20 v2=3) to the communication component 11 based on the input from the user input component 14 and the procedure call expression generation information 2. This procedure call expression is regarded as expression 5. The communication component 11 sends expression 5 to the communication component 21.

The communication component 21 inputs expression 5 into the procedure call expression analysis component 34. The procedure call expression analysis component 34, according to the flowchart shown in FIG. 16, regards the expression 5 as a bind replacement expression since the first element of expression 5 is a list and the first element of such list is not "bind," and hence it inputs the expression 5 into the bind replacement component 35.

The bind replacement component 35, according to the flowchart shown in FIG. 18, performs the replacement regarding v1=20, resulting in (plus v1=1 v2=((bind (v1=2 v2) times) v1=20 v2=v2)). In addition, the replacement regarding v2=3 results in (plus v1=1 v2=((bind (v1=2 v2) times) v1=20 v2=3)). This procedure call expression is regarded as expression 6. The bind replacement component 35 inputs expression 6 into the procedure call expression analysis component 34.

The procedure call expression analysis component 34 analyzes expression 6, and makes a request to the remote procedure retrieval component 23 to retrieval the remote procedure holding component which has the attribute holding component where the value of the attribute "name" is "plus." The remote procedure retrieval component 23 retrieves the remote procedure server component 2 and returns the remote procedure holding component 24-1. The remote call expression analysis component 34, based on expression 6, inputs the argument v1=1, v2=(bind (v1=2 v2) times) v1=20 v2=3) into the procedure execution component 29-1 of the remote procedure holding component 24-1 that is retrieved.

The procedure execution component 29-1, according to the flowchart shown in FIG. 19, inputs "((bind (v1=2 v2) times) v1=20 v2=3)" into the procedure call expression analysis component 34 because the assignment of the argument v2 is the procedure call expression, resulting in expression 7.

The procedure call expression analysis component 34, according to the flowchart shown in FIG. 16, analyzes the expression 7; and in addition, according to the flowchart shown in FIG. 17, "(times v1=20 v2=3)" is generated. This expression is regarded as expression 8.

The procedure call expression analysis component 34 analyzes expression 8 and makes a request to the remote procedure retrieval component 23 to retrieval the remote procedure processing component which has the attribute holding component where the value of the attribute "name" is "times." The remote procedure retrieval component 23 retrieves the remote procedure server component 2 and returns the remote procedure holding component 24-2. The remote call expression analysis component 34, based on expression 8, inputs the argument v1=20 and the argument v2=3 into the procedure execution component 29-2 of the remote procedure holding component 25-2 that is retrieved. The procedure execution component 29-2 returns as the reply to the procedure execution component 29-1, (the number) 60 which is the product of 20 and 3.

The procedure execution component 29-1 assigns the reply from the procedure execution component 28-2 to the argument v2, and, as a reply, returns to the communication component 21, the number 61, which is the sum of 1 and 60. The communication component 21 sends the "61" to the communication component 11.

The communication component 11 returns the "61" to the reply analysis component 32. The reply analysis component 32 makes a request to the user output component 33 to display that the 61 was gotten as the evaluation result of expression 3. Through this means, the 61 is displayed as the result of the remote procedure according to expression 3.

In this way, it is possible to execute a remote procedure without establishing parameters from the outset and yet expression a desired remote procedure while interactively determining the parameters.

Figure 21:
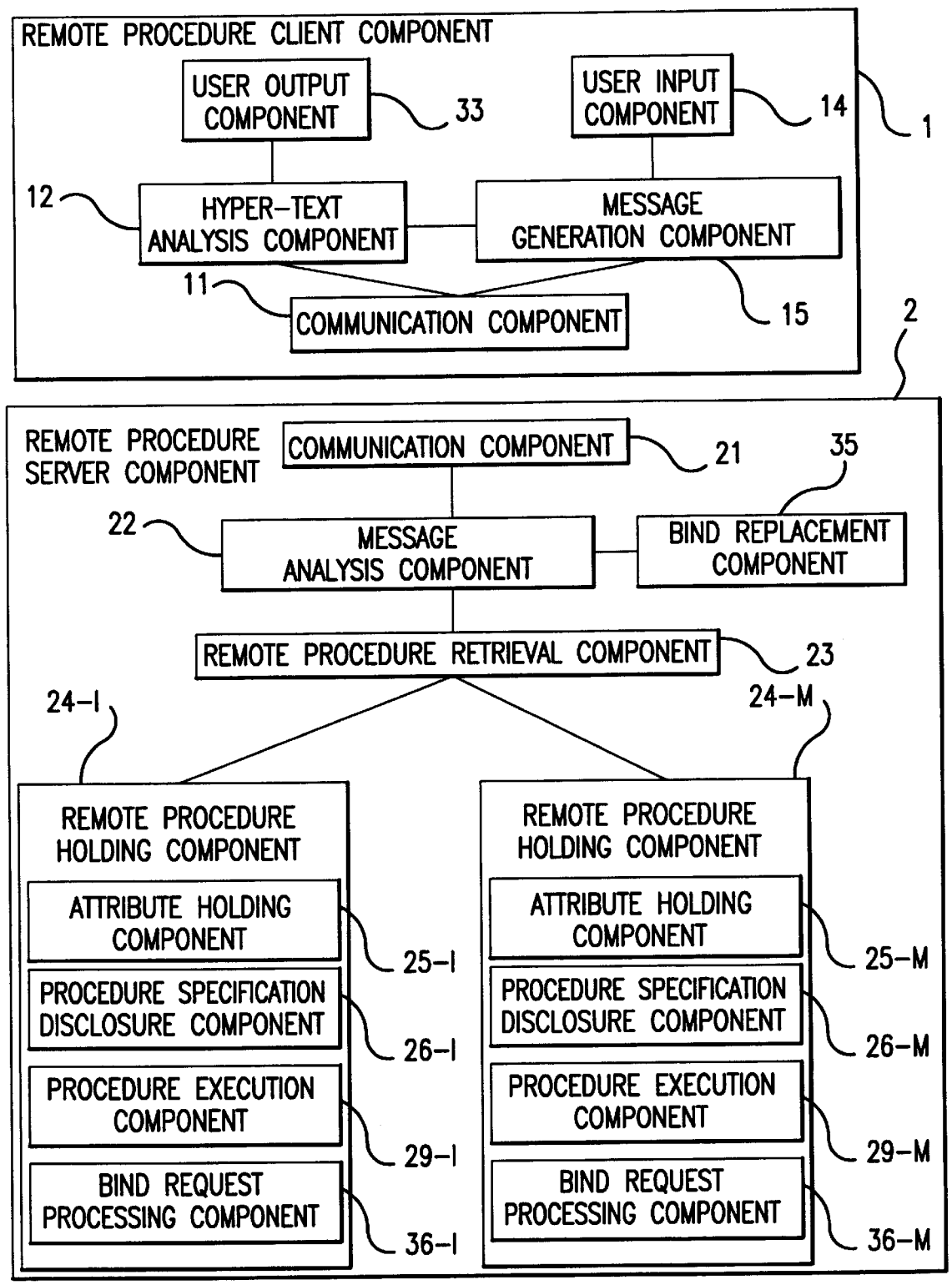
FIG. 21 shows a block diagram of the fifth embodiment of the remote procedure processing device.

FIG. 21 shows a block diagram of the fifth embodiment of the remote procedure processing device. In the figure, the same numeral numbers are given in the same components with FIG. 15. Numeral 15 indicates the message generation component, 12 indicates the hyper-text analysis component, and 22 indicates the message analysis component. In this embodiment, a description will be given regarding by way of a message instead of the procedure call expression, and getting the hyper-text as the reply.

The remote procedure processing device comprises the remote procedure client component 1 and the remote procedure server component 2. In general, the remote procedure processing device may comprise one or more remote procedure client components, and one or more remote procedure servers.

The remote procedure client component 1 comprises the communication component 11, the user input component 14, the message generation component 15, the hyper-text analysis component 12, and the user output component 33. The communication component 11 transmits the message which is input from the message generation component 15 to the remote communication component, and it receives the hyper-text from the remote communication component, and outputs the received hyper-text to the hyper-text analysis component 12. The user input component 14 includes the input devices such as the keyboard, the pointing device and so forth, and it performs the message generation request to the message generation component 15 by means of input from the user. The message generation component 15 generates the message and puts it out to the communication component 11 according to the message generation information which is input from the user input component 14 as well as from the hyper-text analysis component 12. The hyper-text analysis component 12 analyzes the hyper-text which is input from the communication component 11, and it requests to the user output component 33 to display the hyper-text to the user, and also it puts out to the message generation component 15 the message generation information which is the information for generating the message. The user output component 33 displays, for example, letters, picture image as well as the sound information, as the execution result to the user according to the request from the hyper-text analysis component 12.

The remote procedure server component 2 comprises one communication component 21, and one message analysis component 22, one bind replacement component 35, one remote procedure retrieval component 23, and M numbers of the remote procedure holding components 24-1 through 24-M. The communication component 21 receives the message from the remote location, or client, and puts it out to the message analysis component 22 and also transmits the hyper-text to the remote location or client. The message analysis 22 analyzes the message which is input from the communication component 21, and it extracts the retrieval expression to input to the remote procedure retrieval component 23 as well as the argument list which is the argument list to input to the retrieved remote procedure holding component. In addition, the message analysis component 22 also extracts the preliminary information when the input message includes the preliminary information. After the message analysis component 22 analyzes the message, when the specific retrieval expression is extracted, the bind replacement component 35 is designated and given the argument list as well as the preliminary information. The bind replacement component 35 inputs the message to the preliminary information, and it puts out the result of performing the bind replacement process which will be described later as the second message to the message analysis component 22. The remote procedure retrieval component 23 inputs the retrieval expression from the message analysis component 22, and it retrieves the matching remote procedure holding component to the retrieval expression from the remote procedure holding component which belongs to the remote procedure server component 2.

The remote procedure holding components 24-1 through 24-M are comprised of the attribute holding components 25-1 through 25-M, the procedure specification disclosure components 26-1 through 26-M, the procedure execution components 29-1 through 29-M, and the bind request processing components 36-1 through 36-M. In the attribute holding components 25-1 through 25-M, the attribute indicating the identifier in order to identify the remote procedure holding components 24-1 through 24-M is maintained uniformly as a pair list of an attribute name and an attribute value. In general, an arbitrary number of pairs of an attribute and an attribute value may be maintained in the attribute holding components 25-1 through 25-M, and it may be maintained in an attribute which is able to identify uniformly the remote procedure holding component by means of designating one or more attributes.

Maintained in the procedure specification disclosure components 26-1 through 26-M are the description by way of the formal language regarding: the procedure argument, the description by way of the natural language regarding the procedure argument, the description by way of the formal language regarding hypertext which is returned from the procedure, the description by way of the natural language regarding hyper-text which is returned from the procedure, the description by way of the formal language regarding the procedure operation, the description by way of the natural language regarding the procedure operation, the message generation information in order to generate the message, and a default value of the argument, and it puts out the specification information as the hyper-text to request of the specification disclosure. In general, an arbitrary subset having one or more elements from among these may be maintained in the procedure specification disclosure components 26-1 through 26-M.

FIG. 22 shows one of the illustrations of the hyper-text which is output by the procedure specification disclosure component which occurs in the fifth embodiment of the remote procedure processing device. The example which is shown in FIG. 22 is an example of the hyper-text based on HTML indicating the procedure specification. The arguments which require the assignment are v1 and v2, argument v1 has no default value, the default value of argument v2 is 1, and "http://host1/bin/plus" indicates the retrieval expression of the remote procedure processing component.

Returning to FIG. 21, the procedure execution components 29-1 through 29-M execute the procedure according to the argument list which is input by means of the message analysis component 22. In the case where the procedure execution request towards another remote procedure holding component occurs during the process of the procedure execution, it performs the message sending through the message analysis component 22. The procedure execution components 29-1 through 29-M output the procedure execution result as the hyper-text according to the argument list. In the case where a required argument is undetermined or an argument is an inappropriate combination, the request will be made to output the procedure specification to the procedure specification disclosure component.

When the procedure specification is returned as the reply which requests the procedure execution to another remote procedure holding component by the procedure execution components 29-1 through 29-M, the bind request processing components 36-1 through 36-M input the hyper-text which is such procedure specification, from the procedure execution components 29-1 through 29-M, and it creates the second procedure specification hyper-text.

Figure 23:
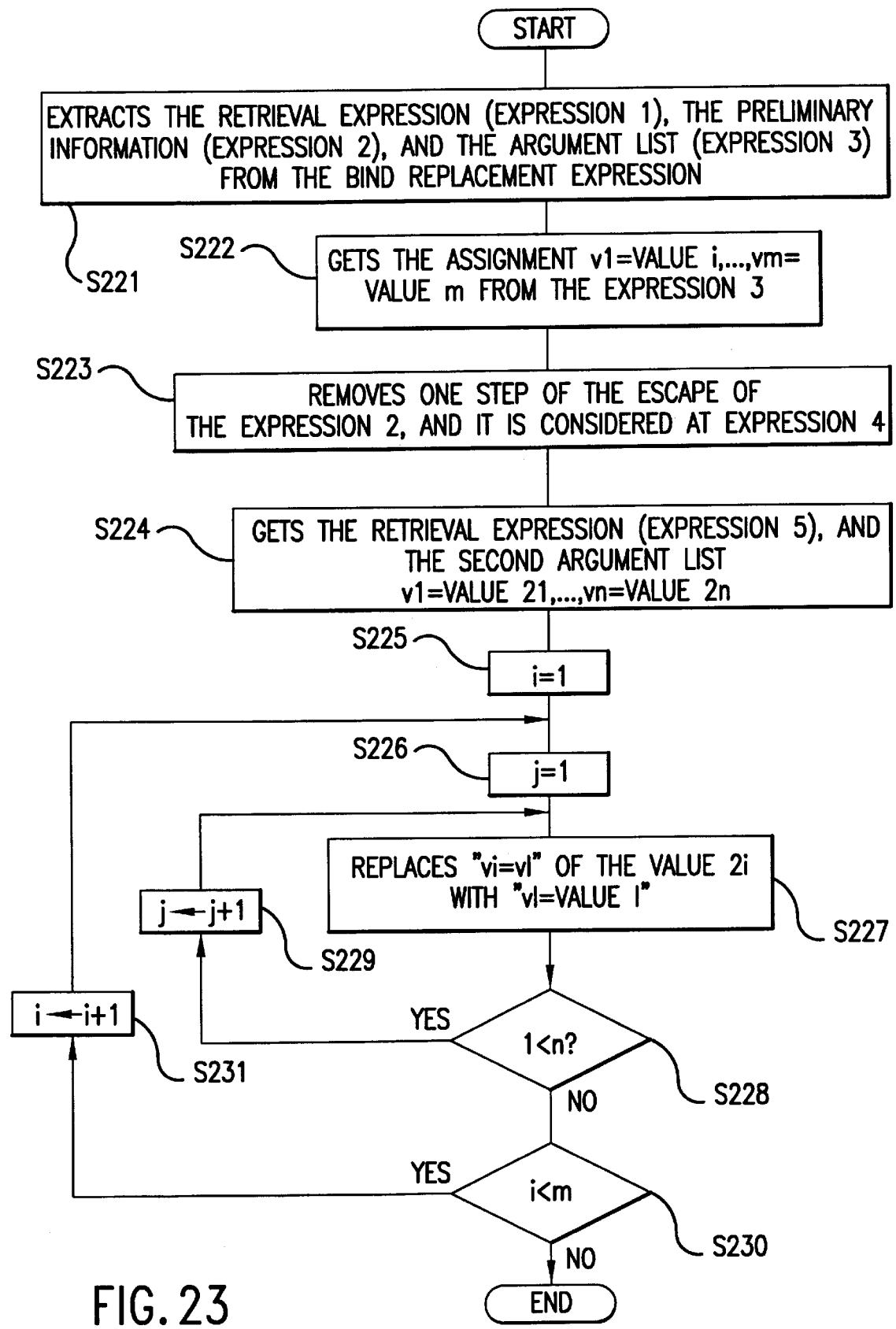
FIG. 23 is a flowchart indicating one operation example of the bind replacement component in the fifth embodiment of the remote procedure processing device.

FIG. 23 is a flowchart indicating one operation example of the bind replacement component 35 in the fifth embodiment of the remote procedure processing device. At S221 extracted from the input bind replacement expression include: the retrieval expression to be given to the remote procedure retrieval component 23 (expression 1), preliminary information (expression 2), and the argument list (expression 3).

At S222, it gets the assignment v1=value, ..., vm=value m from expression 3 that is the argument list. At S223, it removes one step of the escape of expression 2, and this is regarded to be expression 4. At S224, it gets from expression 4, expression 5 which is the retrieval expression to be given to the remote procedure retrieval component 23, as well as getting the second argument list v1=value 21, ..., vn=value 2n.

It changes i from 1 to m by means of S225, S230 and S231, and processes S226 through S229 regarding each of the elements v1 from arguments v1 through vm.

In addition, it changes j from 1 to n by means of S226, S228 and S229, and at S227, replaces "vi=vi" of the value 2j with "vi=value i".

Figure 24A:
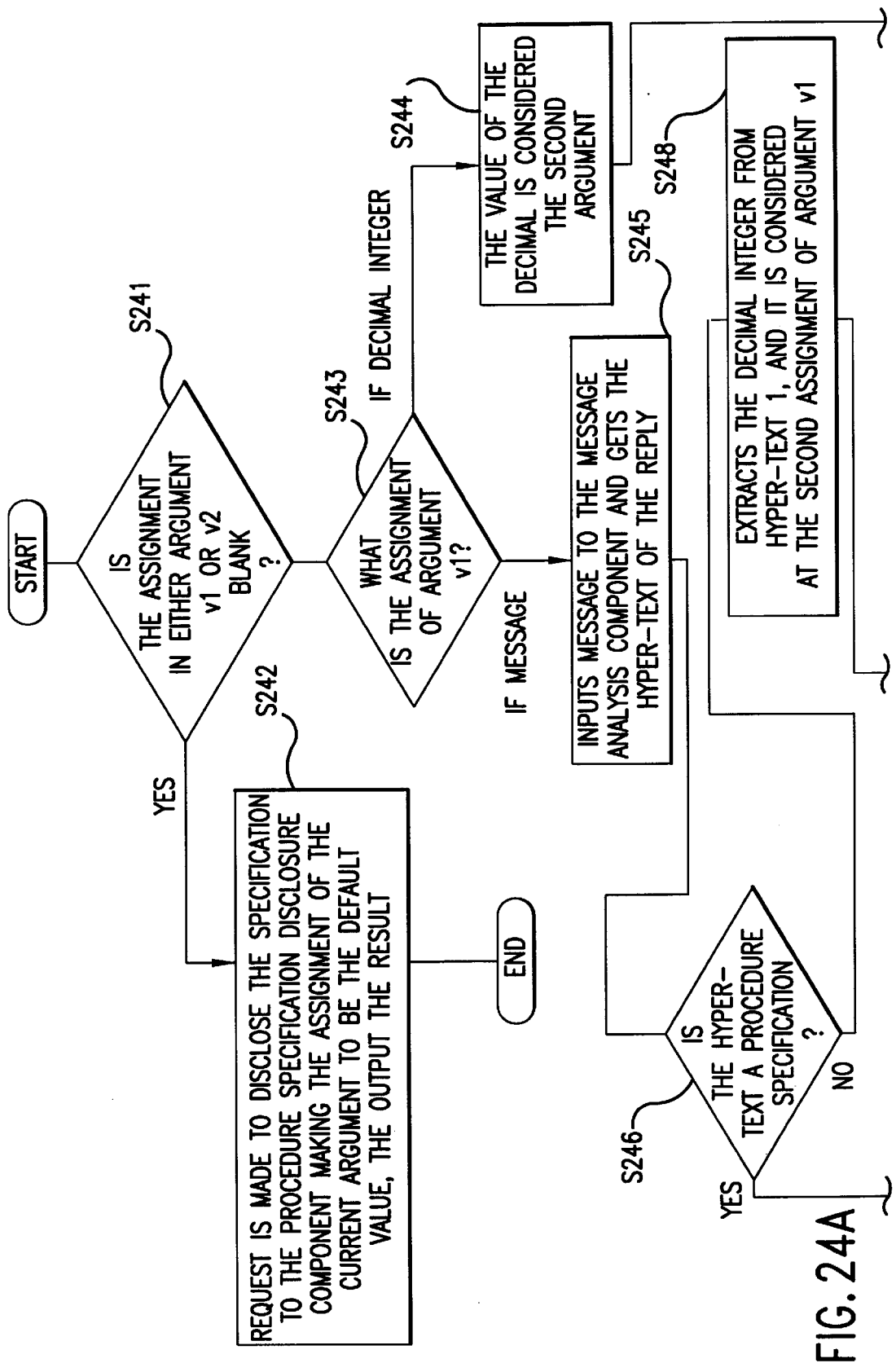
FIG. 24(A) and FIG. 24(B) is a flowchart showing one example of the operation of the procedure execution component which occurs in the fifth embodiment of the remote procedure processing device.
Figure 24B:
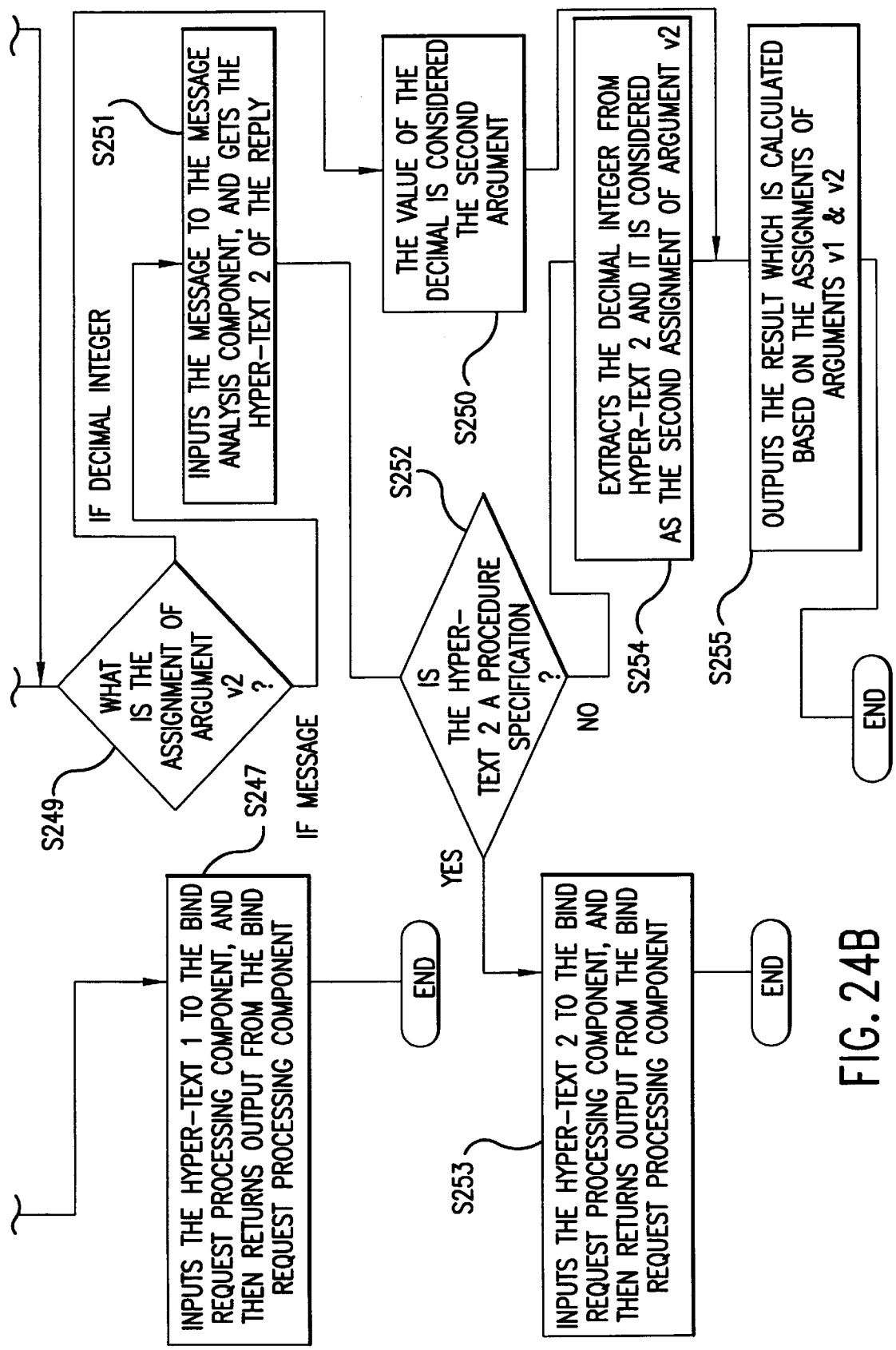

FIG. 24 is a flowchart showing one example of the operation of the procedure execution component 29-1 through 29-M which occurs in the fourth embodiment of the remote processing device. Here, procedure execution component 29-1 and 2 will be explained as one example using a specific example. Moreover, the operations of the remote procedure holding component 24-1 and the remote procedure holding component 25-2 will be described in one combined flowchart since they are nearly the same except for the variance in the computations of the remote procedure.

The procedure execution component 29-1 is the calculated sum of the two arguments v1 and v2. Further, the procedure execution component 29-2 is the calculated product of the two arguments v1 and v2.

At S241, it is judged whether either of the assignments of the argument v1 or the argument v2 are blank, and if blank, then at S242, a request is made to disclose the specification to the procedure specification disclosure component 26-1 and 2 making the assignment of the current argument to be the default value, and after the output of the result, the process is complete.

If the assignment of both arguments v1 and v2 are blank, then at S243, it is determined whether the assignment of argument v1 is a decimal integer or a message. If it is a character string indicating a decimal integer, then, at S244, that character string indicating a decimal integer is converted into an integer and the converted value is regarded as the second assignment, and it proceeds to S249. If the assignment of the argument v1 is a message, then at S245, the message is entered into the message analysis component 22 and a reply hyper-text is retrieved. The hyper-text that is retrieved is regarded as hyper-text 1. At S246, it is determined whether the hyper-text 1 is the procedure specification, and if it is the procedure specification, then at S247, the hyper-text 1 is entered into the bind request processing component 36-1 and 2, and after returning the output from the bind request processing component 36-1 and 2, the process is complete. If the hyper-text 1 is not the procedure specification, then at S248, the character string indicating the decimal integer is extracted, and that character string is converted into an integer and the converted value is regarded as the second assignment of argument v1.

At S249, if the assignment of the argument v2 is not a character string indicating a decimal integer, then at S250, that character string indicating a decimal integer is converted into an integer and the converted value is regarded as the second assignment, and it proceeds to S255. If the assignment of the argument v2 is a message, then at S25 1 the message is entered into the message analysis component 22 and a reply hyper-text is retrieved. The hyper-text that is retrieved is regarded as hyper-text 2. At S252, it is determined whether the hyper-text 2 is the procedure specification, and if it is the procedure specification, then at S253, the hyper-text 2 is entered into the bind request processing component 36-1 and 2, and after returning the output from the bind request processing component 36-1 and 2, the process is complete. If the hyper-text 2 is not the procedure specification, then at S254, the character string indicating the decimal integer is extracted, and that character string is converted into an integer and the converted value is regarded as the second assignment of argument v2.

At S255, computation is performed based on the assignments of argument v1 and argument v2 and then it is output. The results which add the assignments of argument v1 and argument v2 are output at the procedure execution component 29-1. Further, the product of the assignments of argument v1 and argument v2 are calculated at the procedure execution component 29-2 and the results are output.

Figure 25:
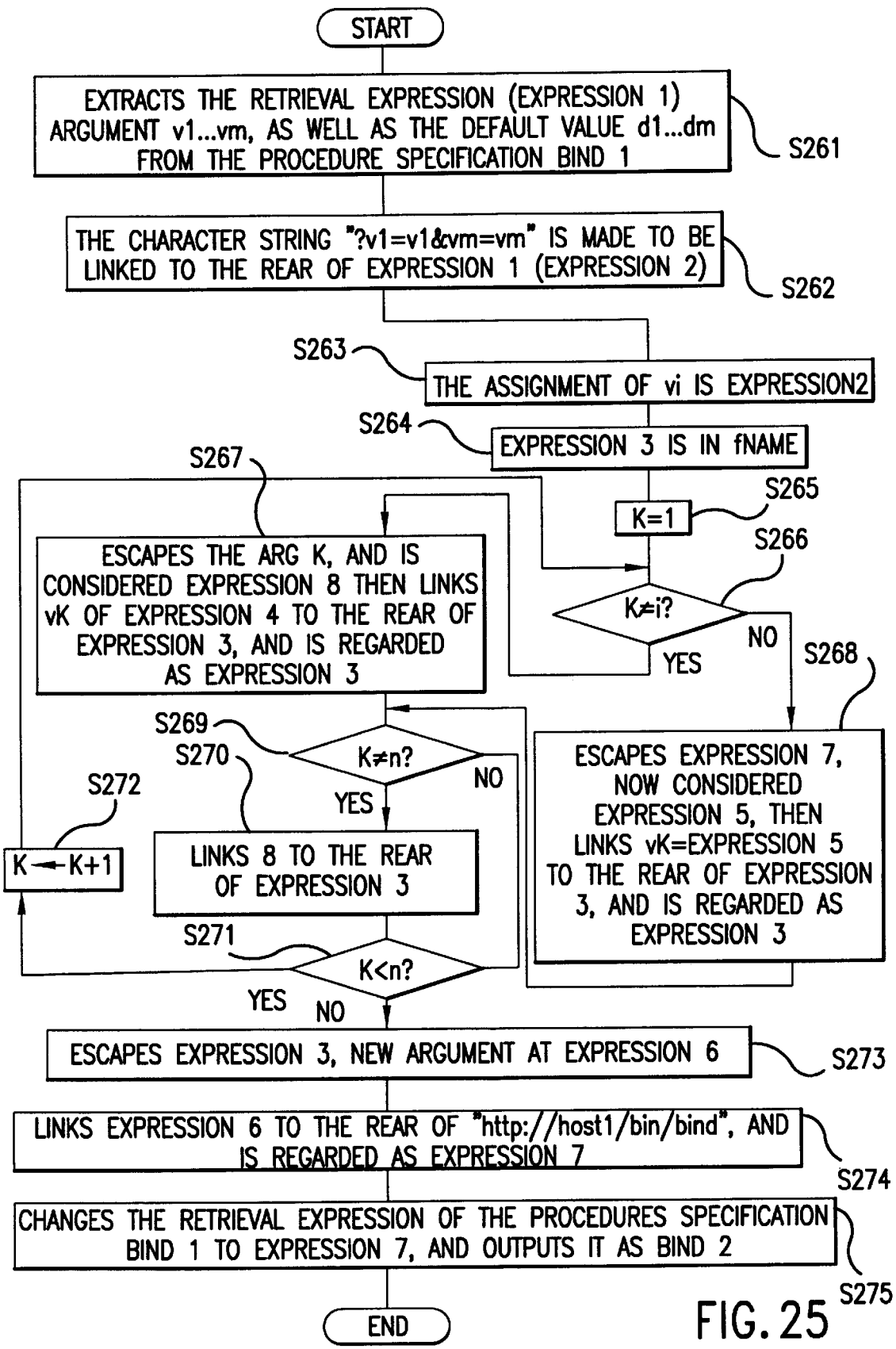
FIG. 25 is a flow chart showing one example of the operation of the bind request processing component which occurs in the fifth embodiment of the remote procedure processing device.

FIG. 25 is a flowchart showing one example of the operation of the bind request processing component 36-1 through 36-M which occurs in the fourth embodiment of the remote procedure processing device. At the bind request processing component 36-1 through 36-M, in the case where the first procedure specification bind 1 is returned as the evaluation result of the argument, the second procedure specification is synthesized. Here, the procedure execution component of the remote procedure holding component having an attribute holding component where the value of the attribute "name" is "fname," gives arg1, . . . , argn as the assignment of the argument v1, . . . , vn, then the procedure specification bind 1 will be regarded as returned by the process which evaluates the argument vi. In addition, the bind replacement component 35 is that which is designated by the retrieval expression "http://host1/bin/bind". In general, the retrieval expression which designates the bind replacement component 35 may be anything that can be distinguished from other retrieval expressions.

At S261, the retrieval expression given to the remote procedure retrieval component 23 is extracted from the procedure specification bind 1, and this is regarded as expression 1. In addition, the argument v1, . . . , vm and the default value d1, . . . , dm are extracted. At S262, the expression that links the first character string "?v1=v1& . . . &vm=vm" from the rear is regarded as expression 2. Furthermore, at S263, the assignment of vi is regarded as expression 2. In addition, at S264, expression 3 is regarded as fname.

The variable k is changed from 1 to n by means of S265, S271 and S272, and the process from S266 through S270 is repeated. At S266, if k and i are not equal, then at S267, escape argk and regard as expression 4; and after linking vk=expression 4 to expression 3 from the rear, regard as expression 3. Furthermore, if k and i are equal, at S268, escape expression 2 and regard as expression 5; and after linking vk=expression 5 to expression 3 from the rear, regard as expression 3. In addition, at S269, if k and n are not equal, then at S270, link the character "&" to the expression 3 from the rear and regard as expression 3.

At S273, escape expression 3 and regard as expression 6. In addition, at S274, link from the rear "http://host1/bin/bind" to expression 6 and regard as expression 7. Further, at S275, change the retrieval expression given to the remote procedure retrieval component 23 of the procedure specification bind 1 to expression 7 and output this as bind 2.

In the following example of the operation, the remote procedure server 2 is designated by the retrieval expression "http://host1". In addition, the bind replacement component 35 is designated by the retrieval expression "http://host1/bind". In general, the retrieval expression which designate the remote procedure server component 2 and the bind replacement component 35 and so forth may be anything that can be distinguished from other retrieval expressions.

Further, the attribute holding component 25-1 through 25-M has at least the attribute "name," and the attribute holding component 25-1 maintains the attributes where the value of the attribute "name" is "/bin/plus", and the attribute holding component 25-2 maintains the attributes where the value of the attribute "name" is "/bin/times".

For convenience, all of the procedure execution components are regarded as having arguments of the names v1, v2, v3, etc. In general, the procedure execution component may have arguments with arbitrary names. The remote procedure holding component(s) having an attribute holding component such as the attribute value of the attribute "name" that is "fiame," has arguments v1, v2, etc., and this is indicated by the message http://host1/fname?v1=a1&v2=a2& . . . when the value a1 is assigned to the argument v1 and the value a2 is assigned to the argument v2 etc. Further, when assignments for arguments v3 and v4 do not exist, then this is indicated by v3=& v4=&, etc. Here, as a specific example, the procedure execution component 29-1 has the argument v1 and the argument v2, and it is designated by the message "http://host1/bin/plus?v1=a1&v2=a2". In addition, the procedure execution component 28-2 has the arguments v1 and v2, and it is designated by the message "http://host1/bin/times?v1=a1&v2=a2".

Moreover, when characters such as ":", "/", "?", "=", "&", "%" and so forth appear, as with the same stipulations used in the Common Gateway Interface, the characters appearing as the value of the assigned argument will be each expressed by linking the ASCII code for each character to the rear of the "%", therefore they will become "%3A", "%2F", "%3F", "%3D", "%26", "%25", etc. In order to uniformly extract the pair of argument name and value, generally, methods using begin and end codes such as "("to ")", or escape methods which convert characters to other character strings may also be used.

FIG. 26 is an illustration of one example of the hyper-text which is maintained by the procedure specification disclosure component 26-1 in the fifth embodiment of the remote procedure processing device. In the description hereafter, the procedure specification disclosure component 26-1 maintains the hyper-text as the procedure specification which is indicated in FIG. 26.

The description will be provided hereafter using a specific example from inputting the message by a user to get the result of the remote procedure. FIG. 27(A) through FIG. 29(D) are illustrations of one example of a portion of the data which exchanges in an example of the specific operations in the fifth embodiment of the remote procedure processing device. The specific example shows the operation in the case where procedure calling which is expressed in the message shown in FIG. 27(A) is performed by the user. This message indicates that argument v1 of the procedure http://host1/bin/plus is regarded to be unassigned, and then, 2 is assigned to the argument v1 of the procedure http://host1/bin/times, and it indicates that the result called argument v2 of the procedure 'times' to be unassigned is assigned to argument v2 of the procedure http://host1/bin/plus. This message is regarded as expression 1.

The user enters (inputs) that the user directly designates the message and that the message is expression 1 by using input devices such as a key input device, pointing device, and so forth for the user input component 14. The message generation component 15 inputs expression 1 to the communication component 11 according to the input by the user. The communication component 11 retrieves the communication component 21 as the communication component which corresponds to "http://host1" of expression 1, and inputs expression 1 to the communication component 21.

The communication component 21 inputs expression 1 to the message analysis component 22. The message analysis component 22 analyzes expression 1, and determines that expression 1 is the call expression. Subsequently, it requests to the remote procedure retrieval component 23, to retrieval the remote procedure holding component having the attribute holding component where the value of the attribute "name" is "/bin/plus". The remote procedure retrieval component 23 retrieves the remote procedure server component 2, and returns the remote procedure holding component 24-1. The message analysis component 22, based on expression 1 inputs the assignment of argument v1=, v2=http://host1/bin/times?v1=2&v2=to the procedure execution component 29-1 which belongs to the retrieval remote procedure holding component 24-1, and requests the execution of the procedure.

The procedure execution component 29-1 examines argument v1 according to the flowchart which is shown in FIG. 24. Since argument v1 is unassigned, a request is made to disclose the specification to the procedure specification disclosure component 26-1. The procedure specification disclosure component 26-1 creates the hyper-text including the procedure specification which is described in the formal language which is indicated in FIG. 27(B). This procedure specification is regarded as the procedure 1-1. The procedure execution component 29-1 outputs the procedure specification 1-1 to the communication component 21. The communication component 21 transmits the procedure specification 1-1 to the communication component 11.

The communication component 11 inputs the procedure specification 1-1 to the hyper-text analysis component 12. The hyper-text analysis component 12 analyzes the procedure specification 1-1, and the arguments requiring assignment for the user output component 33 are v1 and v2, and it make a request to display that the default value of argument v2 is http://host1/bin/times?v1=2&v2=, and it also inputs the message generation information "http://host1/bin/plus" to the message generation component 15. This message generation information is regarded as the message generation information 1.

The user who received the display instructs the message generation component 15 to generate the message while performing the input to assign the default value at argument v2 by assigning 1 to the first argument v1 for the user input component 14. The message generation component 15 outputs the message such as that shown in FIG. 27(C) to the communication component 11 based on the entry from the user input component 14 as well as the message generation information 1. This message is regarded as expression 2. The communication component 11 retrieves the communication component which corresponds to "http://host1" of expression 2, and gets the communication component 21 and sends expression 2 to the communication component 21.

The communication component 21 inputs expression 2 into the message analysis component 22. The message analysis component 22 analyzes expression 2, then it judges whether expression 2 is the call expression. Further, it makes a request to the remote procedure retrieval component 23 to retrieval the remote procedure holding component which has the attribute holding component where the value of the attribute "name" is "/bin/plus." The remote procedure retrieval component 23 retrieves the remote procedure server component 2 and returns the remote procedure holding component 24-1. The message analysis component 22, based on expression 2, inputs the argument assignment v1=1, v2=http://host1bin/times?v1=2&v2=into the procedure execution component 29-1 which belongs to the remote procedure holding component 24-1 that is retrieved, and makes a request to execute the procedure.

As shown in FIG. 27(D), the procedure execution component 29-1, according to the flowchart shown in FIG. 24, gets the integer 1 as the assignment of the argument v1. In addition, the argument v2 assignment "http://host1/bin/times?v1=2&v2" is input into the message analysis component 22. This message of the assignment of the argument v2 is regarded as expression 4.

The message analysis component 22 analyzes the expression 4 and makes a request to retrieval the remote procedure holding component which has the attribute holding component where the value of the attribute "name" is "/bin/times" for the remote procedure retrieval component 23. The remote procedure retrieval component 23 returns the remote procedure holding component 24-2 by performing the retrieval. The message analysis component 22, based on expression 4, inputs the argument v1=2, v2=into the procedure execution component 29-2 of the remote procedure holding component 24-2 which was retrieved.

The procedure execution component 29-2 executes according to the flowchart shown in FIG. 24 and gets the integer 2 as the assignment for the argument v1. Since the argument v2 is unassigned, a request is made to disclose the specification to the procedure specification disclosure component 26-2. The procedure specification disclosure component 26-2 generates the hyper-text which includes the procedure specification which is described by the formal language such as that shown in FIG. 27(D). This procedure specification is regarded as the procedure specification 2-2. The procedure execution component 29-2 outputs the procedure specification 2-2 to the procedure execution component 29-1.

The procedure execution component 29-1, according to the flowchart shown in FIG. 24, inputs the procedure specification 2-2 into the bind request processing component 36-1 because the hyper-text accepted from the procedure execution component 36-2 is the procedure specification. The bind request processing component 36-1, according to the flowchart shown in FIG. 25, outputs the procedure specification 2-3 that is shown in FIG. 28(A) to the procedure execution component 29-1. The procedure execution component 29-1 outputs the procedure specification 2-3 to the communication component 21 according to the flowchart shown in FIG. 24. The communication component 21 sends the procedure specification 2-3 to the communication component 11.

The communication component 11 outputs the procedure specification 2-3 to the hyper-text analysis component 12. The hyper-text analysis component 12 performs analysis when inputting the procedure specification 2-3 and determines that the arguments necessary for assignment to the user output component 33 are v1 and v2, and then makes a request to display that the default value of the argument v2 is 2 while inputting the message generation information into the message generation component 15 as indicated in FIG. 28(B). This message generation information is regarded as the message generation information 2.

The user receiving the display performs the inputting to assign, for example, 20 to argument v1 and 3 to v2 for the user input component 14. The message generation component 15 outputs the message such as that shown in FIG. 28(C) to the communication component 11 based on the input from the user input component 14 and the message generation information 2. This message is regarded as expression 5. The communication component 1 1 gets the communication component 21 by retrieving the communicatioi component that corresponds to "http://host1" of expression 5. The communication component 11 sends expression 5 to the communication component 21.

The communication component 21 inputs expression 5 into the message analysis component 22. The message analysis component 22 regards expression 5 as a bind replacement expression since the retrieval element that was extracted from expression 5 is "/bin/bind", therefore it inputs the expression 5 into the bind replacement component 35.

The bind replacement component 35, according to the flowchart shown in FIG. 23, extracts from expression 5 the http://host1/bin/bind as the retrieval expression, and it extracts the information shown in FIG. 28(D) as the preliminary information, and it extracts v1=20&v2=3 as the argument list. This argument list is regarded as the argument list 1.

Next, the bind replacement component 35 gets the information shown in FIG. 29(A) removing one step of the escape of the preliminary information. This expression is regarded as the expression 6. In addition, the bind replacement component 35 gets v1=1, v2=http://host1/bin/times?v1=v1&v2=v2 as the assignment for the expression 6. This assignment is regarded as assignment 1.

In addition, the bind replacement component 35 replaces the assignment 1 using the argument list 1. In other words, it gets assignment v1=1, v2=http://host1/bin/times?v1=20&v2=3. This assignment is regarded as assignment 2. The bind replacement component 35, according to assignment 2, gets from expression 6 the message shown in FIG. 29(B). This message is regarded as expression 7. The bind replacement component 35 inputs expression 7 into the message analysis component 22.

The message analysis component 22 analyzes expression 7, and makes a request to the remote procedure retrieval component 23 to retrieval the remote procedure holding component which has the attribute holding component where the value of the attribute "name" is "/bin/plus." The remote procedure retrieval component 23 retrieves the remote procedure server component 2 and returns the remote procedure holding component 24-1. The message analysis component 1, based on expression 7, inputs the argument v1=1, v2=http://host1/bin/times?v1=20&v2=3 into the procedure execution component 29-1 of the remote procedure holding component 24-1 that is retrieved.

The procedure execution component 29-1, according to the flowchart shown in FIG. 24, inputs "v1=1,v2=http://host1/bin/times?v1=20&v2=3" into the message analysis component 22 because the assignment of the argument v2 is the message. This expression is regarded as expression 8.

The message analysis component 22 extracts from expression 8 the retrieval expression "/bin/times" which is input into the remote procedure retrieval component, and it makes a request to the remote procedure retrieval component 23 to retrieval the remote procedure holding component which has the attribute holding component where the value of the attribute "name" is "/bin/times." The remote procedure retrieval component 23 retrieves the remote procedure server component 2 and returns the remote procedure holding component 25-2. The message analysis component 22, based on expression 8, inputs the argument v1=20 and the argument v2=3 into the procedure execution component 28-2 of the remote procedure holding component 25-2 that is retrieved.

The procedure execution component 29-2 calculates 60, that is, the product of 20 and 3 according to a flowchart which is indicated in FIG. 24, and returns it to the procedure execution component 29-1 as the hyper-text that is shown in FIG. 29(C).

As shown in FIG. 29(D), the procedure execution component 29-1 analyzes hyper-text 1, and extracts the character string "60" from a line where it has the character string "result:", and gets integer 60 as the assignment of argument v2. Further, the procedure execution component 29-1 calculates 61, that is, the sum of 1 and 60, and returns hyper-text 2 that is shown in FIG. 27(D) to the communication component 21. The communication component 21 transmits hyper-text 2 to the communication component 11.

The communication component 11 returns hyper-text 2 to the hyper-text analysis communication 12. The hyper-text analysis component 12 makes a request to the user output component 33 for displaying the result that 61 is retrieved as the evaluation result of expression 3.

In this manner, with the remote procedure call by using a hyper-link, it is possible to determine the argument interactively and execution the remote procedure without setting the argument in advance.

Moreover, the examples of the remote procedure call operation including undefined arguments has been described in the aforementioned examples, however, even though when a wrong remote procedure call is performed, for example, in the case where the setting method of an argument is uncertain, the procedure specification will be displayed, and the user is able to perform the argument setting or so forth according to the displayed procedure specification, and the remote procedure is able to be simply utilized.

From the above description, according to the present invention, in the case where the remote procedure is executed without determining the argument, or when the remote procedure is executed with an improper argument, the user is able to give the argument interactively, and the remote procedure is able to be re-executed. Therefore, even though the user is not integrally familiar of the specification of desired remote procedure in advance, its remote procedure is able to be executed, and it has the effect of improving the utility.

What is claimed is:

1. A remote procedure processing device for processing remote procedures, the remote procedures performed by at least two linked computer systems, comprising:

communication means for receiving remote procedure execution requests and transmitting execution results;

means for holding said remote procedures and executing said remote procedures in response to said execution requests;

means for analyzing said execution requests received by said communication means and extracting a retrieval expression and a parameter to be used in the execution of said requested procedures; and means for retrieving said remote procedures from said remote procedure holding means corresponding to said retrieval expression extracted by said analyzing means and sending said parameter to a first remote procedure holding means;

wherein said first remote procedure holding means executes a first procedure using said parameter received from said remote procedure retrieving means; and a message containing a retrieval expression and a parameter for another remote procedure holding means is generated during execution of said first procedure by said remote procedure holding means, said message being transmitted to said remote procedure retrieving means, said remote procedure retrieving means sending a reply to said message, said reply to said message being received by said first remote procedure holding means, and said execution of said first procedure being continued.

2. The device for processing remote procedures according to claim 1, wherein said remote procedure holding means generates a message, said message transmitted by said communication means to another device for processing remote procedures, and wherein said communication means can also receive replies sent from said other device for processing remote procedures.

3. The device for processing remote procedures according to claim 1, wherein said remote procedure holding means comprises:

means for storing attributes;

means for executing procedures and generating results from said execution;

means for generating hypertext messages requesting a second remote procedure holding means to execute a second procedure if said second remote procedure holding means is to be used during said execution of said second procedure, said hypertext message containing said parameter needed for the execution of said requested procedures;

means for analyzing hypertext messages, wherein said reply from said remote procedure retrieving means is in hypertext and contains execution results from said second remote procedure holding means, and extracting parameters needed for the execution of the original procedure holding means from said hypertext; and means for generating hypertext containing execution results from said remote procedure executing means.

4. The device for processing remote procedures of claim 3, said remote procedure holding means further comprising:

means for disclosing procedure specifications for remote procedures containing at least one of: a formal language description relating to a parameter for said remote procedure, a natural language description relating to said parameter, a formal language description relating to a reply sent back from said remote procedure, a natural language description relating to said reply, a formal language description of the procedures of said remote procedures, a natural language description of said procedures, a hyperlink for executing said remote procedures, and generating a hypertext in response to a request containing said specifications of said remote procedures, and means for controlling remote procedures activating either said specification disclosing means or said procedure executing means based on said parameter sent from said remote procedure retrieving means.

5. The device for processing remote procedures of claim 3, wherein:

said message generating means generates a message containing said hyperlink if said parameter includes a hyperlink indicating execution of another remote procedure.

6. The device for processing remote procedures of claim 3, wherein:

said hypertext generating means generates a hypertext containing a parameter extracted from said message analyzing means in the form of a hyperlink.

7. The device for processing remote procedures of claim 1, further comprising:

means for holding procedure specifications, said procedure specification holding means comprising: means for storing attributes attached to said procedure specifications holding means, and means for disclosing specifications for remote procedures containing one or more of the following: a formal language description relating to a parameter for said remote procedure, a natural language description relating to said parameter, a formal language description relating to a reply sent back from said remote procedure, a natural language description relating to said reply, a formal language description of the procedures of said remote procedure, a natural language description of said procedures, a hyperlink for executing said remote procedure, and generating a hypertext in response to a request containing said specifications of said remote procedures.

8. A remote procedure processing device for processing remote procedures, the remote procedures performed by at least two linked computer systems, comprising:

at least one remote procedure server and at least one remote procedure client;

wherein:

said remote procedure server further comprising a means for disclosing specifications of a remote procedure, including parameter data that can be specified remotely via a network;

means for generating hypertext containing said specifications of said remote procedure in response to a request, said hypertext linked to an attribute;

first communications means for receiving a message containing a retrieval expression and sending hypertext generated by said specification disclosing means;

means for analyzing messages received from said first communications means and extracting a retrieval expression;

means for retrieving remote procedures, retrieving said specification disclosing means that matches said retrieval expression extracted by said message analyzing means and requesting said retrieved specification disclosing means to generate hypertext; and wherein said remote procedure client comprises:

means for requesting specification disclosure, receiving a retrieval expression for specifying said specification disclosing means;

means for generating messages, said message generating means generating a first message containing said retrieval expression received by said specification disclosure requesting means, generating a second message for requesting a procedure call, and generating a third message in which said second message is substituted for the parameter value;

second communications means for sending said first message generated by said message generating means and receiving hypertext sent from said first communications means of said remote procedure server in response to said message;

means for analyzing hypertext received from said second communications means and extracting parameter data contained in the specifications of said remote procedures; and means for storing messages generated by said message means.

9. The device for processing remote procedures of claim 8, further comprising:

means for displaying hypertext containing a parameter substitution component that allows a user to substitute values for parameters based on said parameter data extracted by said hypertext analyzing means.

10. The device for processing remote procedures of claim 8, wherein:

said remote procedure server sends and receives messages via the Internet;

said message storing means stores a URL; and said message generating means substitutes said URL stored by said message storing means for the value of a parameter extracted by said hypertext analyzing means, and generates a second URL containing said substituted URL, in a nested manner, in said parameter.

11. The device for processing remote procedures of claim 8, wherein:

said remote procedure server sends and receives messages via the Internet;

said message storing means stores a protocol message in an HTTP; and said message generating means substitutes said protocol message stored by said message storing means for the value of a parameter extracted by said hypertext analyzing means, and generates a second protocol message containing said substituted protocol, in a nested manner, in said parameter.

12. A remote procedure processing device for processing remote procedures, the remote procedures performed by a network information system having a plurality of computer systems performing information processing linked via a network, comprising:

communication means for receiving a first procedure call expression, the first procedure call expression further comprises a first bind expression, the first bind expression having a first argument value and a first argument assignment;

second procedure call expression, the second procedure call expression further comprises a second bind expression having a second argument value and a second argument assignment;

bind replacement means wherein the second argument value and the second argument assignment are replaced by the first argument value from the first procedure call expression, and generates the second procedure call expression indicating the replacement of the second argument assignment;

procedure call expression analysis means for accepting the second procedure call expression and deriving from said second procedure call expression the values assigned to the second argument and generating a remote procedure expression;

at least one remote procedure holding means;

remote procedure retrieval means for searching the remote procedure holding means, the remote procedure means inputting the value assigned to the second argument based on the remote procedure expression created by the procedure call expression analysis means, the remote means accepts the value assigned to the second argument by the procedure call expression analysis means;

said remote procedure means further comprises: procedure specification disclosure means for storing at least one specification of the remote procedures, said at least one specification including information of arguments required for the remote procedure, the procedure specification disclosure means outputting a specification after accepting the specification disclosure request from the procedure execution means; procedure execution means for inputting an assigned argument from the procedure call expression analysis means and executing the procedure according to the assigned argument and outputting a specification disclosure request when the argument is unassigned; and bind request processing means for outputting a new specification which includes the assignment of any unassigned argument.

13. A remote procedure processing device for processing remote procedures, the remote procedures performed by a network information system having a plurality of computer systems performing information processing linked via a network, comprising:

at least one remote procedure client and at least one remote procedure server;

first communication means, said first communication receiving a first procedure call expression, the first procedure call expression further comprises a first bind expression, the first bind expression having a first argument value and a first argument assignment;

second procedure call expression, the second procedure call expression further comprises a second bind expression having a second argument value and a second argument assignment;

bind replacement means wherein the second argument value and the second argument assignment are replaced by the first argument value from the first procedure call expression, and generates the second procedure call expression indicating the replacement of the second argument assignment;

procedure call expression analysis means for accepting the second procedure call expression and deriving from said second procedure call expression the values assigned to the second argument and generating a remote procedure retrieval expression;

remote procedure means for retrieving the remote procedure means, the remote procedure means inputting the value assigned to the second argument based on the remote procedure expression created by the procedure call expression analysis means, the remote means accepts the value assigned to the second argument by the procedure call expression analysis means;

said remote procedure means further comprising: procedure specification disclosure means; procedure execution means; and bind request processing means;

the procedure execution means inputs an assigned argument from the procedure call expression analysis means and executes the procedure according to the assigned argument and outputs either first reply to the first communication means a specification disclosure request when the argument is unassigned; and the procedure specification disclosure means stores at least one specification of the remote procedures, said at least one specification including information of arguments required for the remote procedure, the procedure specification disclosure means outputting a specification after accepting the specification disclosure request from the procedure execution means, and the bind request processing means outputs to the first communication means a new specification which includes the assignment of any unassigned argument, and whereby said first communication means transmits the first reply put out by said procedure execution means as well as being that which transmits the new specification put out by the bind request processing means;

said remote procedure client further comprising:
  second communication means said second communication means receiving the first reply and the new specification from said remote procedure server while sending the procedure call expression to said remote procedure server;
  reply analysis means said reply analysis means analyzing and outputting procedure call expression generating a proposed second procedure call expression based on the new specification when receiving the new specification from the second communication means;
  user output means for displaying the first reply and the new specification received by said second communication means;
  the reply analysis means requests the display of the reply to the user according to the user output means;
  user input means which accepts an entry from the user in orer to create the second procedure call expression; and
  procedure call expression generation means which creates the second procedure call expression based upon the entry from the user input means as well as the procedure call expression generation information from the reply analysis means.

14. The remote procedure processing device according to claim 13 wherein said second procedure call expression is a bind expression and said first communication means sends said bind expression to the second communication means.

15. A remote procedure processing device for processing remote procedures, the remote procedures performed by a network information system having a plurality of computer systems performing information processing linked via a network, comprising:
  at least one remote procedure client and at least one remote procedure server;
  the remote procedure server further comprising:
    first communication means said first communication means for receiving a message;
    message analysis means for analyzing the received message and generating a remote procedure expression, the message analysis means derives values to be assigned to the remote procedure expression and values to be assigned to assignment arguments;
    bind replacement means said bind replacement means replacing the value of the assignment argument in a replacement message when said received message is the replacement message indicating the replacement of the argument assignment;
    at least one remote procedure means;
    remote procedure means for searching the remote procedure maintenance means, the remote procedure means inputting the value assigned to the argument based on the remote procedure expression derived by the message analysis means;
    said remote procedure means further comprising: procedure specification disclosure means; procedure execution means; and bind request processing means;
    the remote procedure means accepts the value assigned to the argument;
    wherein the procedure execution means executes the remote procedure and outputs a first hyper-text indicating results of the execution;
    and wherein the procedure execution means outputs a specification disclosure request when the argument is unassigned, and
    wherein the procedure execution means accepts a second hyper-text, the second hyper-text resulting from the calling the remote procedure based on the message when the value assigned to the argument is the specification, and
    the procedure specification disclosure means stores a third hyper-text, the third hyper-text including a specification of the remote procedures, said specification including information of arguments required for the remote procedure, the procedure specification disclosure means outputting the third hyper-text after accepting the specification disclosure request from the procedure execution means, and
    the bind request processing means outputs a fifth hyper-text indicating the specification which includes the assignment of any unassigned argument according to either the third hyper-text stored by the specification disclosure means or the second hyper-text when the second hyper-text accepted by the procedure execution means is the specification, and
    said first communication means transmits the first hypertext and the fifth hyper-text;
  said remote procedure client further comprising:
    second communication means said second communication means receiving as reply to the message the first hyper-text and the fifth hyper-text from the first communication;
    hyper-text analysis means said hyper-text analysis means outputting message retrieval information used to generate a second message based on the fifth hyper-text;
    user output means for displaying the first hyper-text and the fifth hyper-text received by the second communication means;
    user input means for accepting entry of instructions from a user in order to create the second message; and
    message generation means which creates the second message based upon the entry of instructions from the user input means as well as the message generation information from the hyper-text analysis means.

16. The remote procedure processing device according to claim 15, wherein said second message is the replacement message, and said first communication means transmits said replacement message to said second communication means.

17. The remote procedure processing device according to claim 15, wherein said second message is the replacement message, and said first communication means transmits said replacement message to said second communication means.

18. A remote procedure processing device for processing remote procedures, the remote procedures performed by a network information system having a plurality of computer systems performing information processing linked via a network, comprising:
  communication means for receiving a first procedure call expression, the first procedure call expression further comprises a first bind expression, the first bind expression having a first argument value and a first argument assignment;
  second procedure call expression, the second procedure call expression further comprises a second bind expression having a second argument value and a second argument assignment;
  bind replacement means wherein the second argument value and the second argument assignment are replaced by the first argument value from the first procedure call expression, and generates the second procedure call expression indicating the replacement of the second argument assignment;

procedure call expression analysis means for accepting the second procedure call expression and deriving from said second procedure call expression the values assigned to the second argument and generating a remote procedure expression;

at least one remote procedure holding means;

remote procedure retrieval means for retrieving the remote procedure holding means, the remote procedure retrieval means inputting the value assigned to the second argument based on the remote procedure retrieval expression created by the procedure call expression analysis means, the remote holding means accepts the value assigned to the second argument by the procedure call expression analysis means;

said remote procedure holding means further comprises: procedure specification disclosure means; procedure execution means; and bind request processing means;

the procedure execution means inputs an assigned argument from the procedure call expression analysis means and executes the procedure according to the assigned argument and outputs a specification disclosure request when the argument is unassigned; and the procedure specification disclosure means stores at least one specification of the remote procedures, said at least one specification including information of arguments required for the remote procedure, the procedure specification disclosure means outputting a specification after accepting the specification disclosure request from the procedure execution means, and the bind request processing means outputs a new specification which includes the assignment of any unassigned argument.

19. A remote procedure processing device for processing remote procedures, the remote procedures performed by a network information system having a plurality of computer systems performing information processing linked via a network, comprising:

at least one remote procedure client and at least one remote procedure server;

first communication means, said first communication means receiving for accepting a first procedure call expression, the first procedure call expression further comprises a first bind expression, the first bind expression having a first argument value and a first argument assignment;

a second procedure call expression, the second procedure call expression further comprises a second bind expression having a second argument value and a second argument assignment;

bind replacement means wherein the second argument value and the second argument assignment are replaced by the first argument value from the first procedure call expression, and generates the second procedure call expression indicating the replacement of the second argument assignment;

procedure call expression analysis means for accepting the second procedure call expression and deriving from said second procedure call expression the values assigned to the second argument and generating a remote procedure retrieval expression;

at least one remote procedure processing means;

remote procedure retrieval means for retrieving the remote procedure holding means, the remote procedure retrieval means inputting the value assigned to the second argument based on the remote procedure retrieval expression created by the procedure call expression analysis means, the remote holding means accepts the value assigned to the second argument by the procedure call expression analysis means;

said remote procedure holding means further comprising: procedure specification disclosure means; procedure execution means; and bind request processing means;

the procedure execution means inputs an assigned argument from the procedure call expression analysis means and executes the procedure according to the assigned argument and outputs either a first reply to the first communication means a specification disclosure request when the argument is unassigned; and the procedure specification disclosure means stores at least one specification of the remote procedures, said at least one specification including information of arguments required for the remote procedure, the procedure specification disclosure means outputting a specification after accepting the specification disclosure request from the procedure execution means, and the bind request processing means outputs to the first communication means a new specification which includes the assignment of any unassigned argument; and said first communication means transmitting the first reply transmits the new specification put out by the bind request processing means;

said remote procedure client further comprising:
second communication means said second communication means receiving the first reply and the new specification from said remote procedure server while sending the procedure call expression to said remote procedure server;

reply analysis means said reply analysis means analyzing and outputting procedure call expression generation information and generating approved the second procedure call expression based on the new specification when receiving the new specification from the second communication means;

user output means for displaying the first reply and the new specification received by said second communication means;

the reply analysis means requests the display of the reply to the user according to the user output means;

user input means which accepts an entry from the user in order to create the second procedure call expression; and procedure call expression generation means for generating the second procedure call expression based upon the entry from the user input means as well as the procedure call expression generation information from the reply analysis means.

20. The remote procedure processing device according to claim 13, wherein said second procedure call expression is a bind expression and said first communication means sends said bind expression to the second communication means.

21. A remote procedure processing device for processing remote procedures, the remote procedures performed by a network information system having a plurality of computer systems performing information processing linked via a network, comprising:

at least one remote procedure client and at least one remote procedure server;

the remote procedure server further comprising:

first communication means said first communication means receiving a message;

message analysis means for analyzing the received message and generating a remote procedure retrieval expression, the message analysis means derives values to be assigned to the remote procedure retrieval expression and values to be assigned to assignment arguments;

bind replacement means said bind replacement means replacing the value of the assignment argument in a replacement message when said received message is the replacement message indicating the replacement of the argument assignment;

at least one remote procedure holding means;

remote procedure retrieval means for retrieving the remote procedure holding means, the remote procedure retrieval means inputting the value assigned to the argument based into the remote procedure retrieval expression derived by the message analysis means;

said remote procedure holding means further comprising: procedure specification disclosure means; procedure execution means; and bind request processing means;

the remote procedure holding means accepts the value assigned to the argument;

wherein the procedure execution means executes the remote procedure and outputs a first hyper-text indicating results of the execution;

and wherein the procedure execution means outputs a specification disclosure request when the argument is unassigned, and wherein the procedure execution means accepts a second hyper-text, the second hyper-text resulting from the calling the remote procedure based on the message when the value assigned to the argument is the specification, and the procedure specification disclosure means stores a third hyper-text, the third hyper-text including a at least one specification of the remote procedures, said specification including information of arguments required for the remote procedure, the procedure specification disclosure means outputting the third hyper-text after accepting the specification disclosure request from the procedure execution means, and the bind request processing means outputs a fifth hyper-text indicating the specification which includes the assignment of any unassigned argument according to either the third hyper-text stored by the specification disclosure means or the second hyper-text when the second hyper-text accepted by the procedure execution means is the specification, and said first communication means transmits the first hyper-text and the fifth hyper-text;

said remote procedure client further comprising:

second communication means said second communication means receiving as reply to the message the first hyper-text and the fifth hyper-text from the first communication means;

hyper-text analysis means, said hyper-text analysis means outputting message retrieval information used to generate a second message based on the fifth hyper-text;

user output means for displaying the first hyper-text and the fifth hyper-text received by the second communication means for a user;

user input means for accepting entry of instructions from a user in order to create the second message; and message generation means which creates the second message based upon the entry of instruction from the user input means as well as the message generation information from the hyper-text analysis means.

* * * * *